(12) United States Patent
Bito

(10) Patent No.: US 7,708,311 B2
(45) Date of Patent: *May 4, 2010

(54) AIRBAG FOR FRONT PASSENGER'S SEAT

(75) Inventor: Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/285,911

(22) Filed: Oct. 16, 2008

(65) Prior Publication Data

US 2009/0085331 A1 Apr. 2, 2009

Related U.S. Application Data

(63) Continuation of application No. 11/218,735, filed on Sep. 6, 2005, now Pat. No. 7,455,317.

(30) Foreign Application Priority Data

| Sep. 9, 2004 | (JP) | 2004-262788 |
| Sep. 9, 2004 | (JP) | 2004-262795 |
| Dec. 21, 2004 | (JP) | 2004-369181 |
| Dec. 22, 2004 | (JP) | 2004-372072 |
| Dec. 22, 2004 | (JP) | 2004-372081 |
| Dec. 24, 2004 | (JP) | 2004-374237 |

(51) Int. Cl.
*B60R 21/16* (2006.01)

(52) U.S. Cl. .................. 280/732; 280/743.1; 280/743.2

(58) Field of Classification Search ................ 280/732, 280/743.1, 743.2, 728.2, 731, 730.1
See application file for complete search history.

(56) References Cited

U.S. PATENT DOCUMENTS

| 6,536,801 B2 | 3/2003 | Frisch | |
| 6,540,254 B2 * | 4/2003 | Bieber et al. | 280/732 |
| 6,554,317 B2 * | 4/2003 | Lorenz et al. | 280/743.1 |
| 6,595,549 B2 * | 7/2003 | Bohn et al. | 280/743.1 |
| 6,726,245 B2 * | 4/2004 | Fellhauer et al. | 280/743.2 |
| 6,802,534 B2 * | 10/2004 | Neupert | 280/743.1 |
| 6,969,086 B2 * | 11/2005 | Hasebe et al. | 280/743.1 |
| 7,000,943 B2 * | 2/2006 | Hasebe et al. | 280/729 |

(Continued)

FOREIGN PATENT DOCUMENTS

JP A-11-129843 5/1999

(Continued)

OTHER PUBLICATIONS

Office Action issued from the Japanese Patent Office on Feb. 24, 2009 in the corresponding Japanese patent application No. 2004-372072.

*Primary Examiner*—Toan C To
(74) *Attorney, Agent, or Firm*—Posz Law Group, PLC

(57) ABSTRACT

The airbag of the present invention, when completely inflated, is formed into a generally square conical shape whose top is in a front end of the airbag. A protection portion to be located in rear side of the airbag upon airbag inflation includes shoulder restraining portions disposed generally side by side in left-right orientation in an area from upper part to rear part of the completely inflated airbag. Each of the shoulder restraining portions continuously projects in upper part to rear part of the airbag.

18 Claims, 50 Drawing Sheets

U.S. PATENT DOCUMENTS

| | | | |
|---|---|---|---|
| 7,093,853 B2 * | 8/2006 | Hasebe et al. | 280/743.1 |
| 7,108,282 B2 * | 9/2006 | Hasebe et al. | 280/743.1 |
| 7,152,877 B2 * | 12/2006 | Hasebe et al. | 280/743.1 |
| 7,163,229 B2 * | 1/2007 | Hasebe et al. | 280/730.1 |
| 7,267,366 B2 * | 9/2007 | Hasebe et al. | 280/743.1 |
| 7,455,317 B2 * | 11/2008 | Bito | 280/732 |
| 2002/0084631 A1 | 7/2002 | Lorenz et al. | |
| 2002/0084638 A1 | 7/2002 | Neupert | |
| 2003/0230883 A1 | 12/2003 | Heym | |

FOREIGN PATENT DOCUMENTS

| | | |
|---|---|---|
| JP | A-2002-079904 | 3/2002 |
| JP | A-2003-335203 | 11/2003 |
| JP | A-2004-314933 | 11/2004 |

* cited by examiner

AIRBAG FOR FRONT PASSENGER'S SEAT

The present application is a continuation of U.S. patent application Ser. No. 11/218,735, filed on Sep. 6, 2005, and claims priority from Japanese Patent Application No. 2004-262788 of Bito, filed on Sep. 9, 2004, Japanese Patent Application No. 2004-262795 of Bito, filed on Sep. 9, 2004, Japanese Patent Application No. 2004-369181 of Bito, filed on Dec. 21, 2004, Japanese Patent Application No. 2004-372072 of Bito, filed on Dec. 22, 2004, Japanese Patent Application No. 2004-372081 of Bito, filed on Dec. 22, 2004, and Japanese Patent Application No. 2004-374237 filed on Dec. 24, 2004, the disclosures of which are hereby incorporated into the present application by reference.

BACKGROUND OF THE INVENTION

1. Field of the Invention

The present invention relates to an airbag used for a top-mount type airbag device for front passenger's seat, which is mountable on top face side of instrument panel (as will be called "dashboard") in front of front passenger's seat.

2. Description of Related Art

In the prior art, Japanese Patent Laid-Open No. 2003-335203, in FIGS. 17 to 28, discloses an airbag for front passenger's seat. This airbag includes: a gas inlet port for introducing inflation gas in the vicinity of front end thereof as completely inflated; and a protection portion adapted to be thrown against a passenger seated in front passenger's seat, in a rear side thereof as completely inflated. The protection portion includes two inflatable portions which are disposed side by side in left-right direction, and communicated with each other in the vicinity of the gas inlet port. In this airbag for front passenger's seat, the two inflatable portions are joined by a joint panel proximate to rear ends thereof. The joint panel is arranged along left-right direction and is adapted to receive and protect the passenger.

In the airbag for front passenger's seat in the prior art, however, since the joint panel for receiving a passenger is formed into a generally planar shape upon airbag deployment, there is a room for improvement in properly protecting the passenger while suppressing a reaction force applied to the passenger, when the joint panel is thrown against the passenger upon airbag inflation. Especially, in order to protect the passenger, there is a challenge in suppressing a reaction force applied to a passenger's head that is small in mass.

In the meantime, in the airbag for front passenger's seat in the prior art, the two inflatable portions constituting the protection portion are communicated with each other only in a small area in the vicinity of the gas inlet port. With this construction, it is difficult for the two inflatable portions to be inflated uniformly when the protection portion inflates with inflation gas from an inflator, which may slant the joint panel, and may lead to failure in protecting the passenger properly.

SUMMARY OF THE INVENTION

A first object of the present invention is to provide an airbag for front passenger's seat which is capable of, when the completely inflated airbag is thrown against a passenger's head, protecting the head properly by suppressing reaction force.

A second object of the present invention is to provide an airbag for front passenger's seat which is capable of protecting an approaching passenger properly by inflating two projecting parts of a protection portion thereof uniformly.

The first object of the present invention is attained by an airbag for front passenger's seat constructed as follows:

The airbag is folded and housed in a top face of instrument panel in front of front passenger's seat, and upon inflow of inflation gas, the airbag protrudes upward and deploys rearward of vehicle in such a manner as to occupy a space between the top face of the instrument panel and a wind shield located above the instrument panel. The airbag is, when completely inflated, formed into a generally square conical shape whose top is located in a front end. The airbag includes:

an inlet port for introducing inflation gas, in the front end vicinity of the airbag as completely inflated;

a protection portion contactable with a front seat passenger, in a rear side of the airbag as completely inflated; and a left side wall and a right side wall each arranged generally along front-rear orientation in left and right sides, an upper side wall and a lower side wall each arranged generally along left-right orientation in upper and lower sides, and a rear side wall arranged generally along left-right orientation to confront a passenger, in such a manner as to connect the upper side wall and the lower side wall. The airbag is formed by joining edges of a plurality of base cloths, and includes:

an outer panel constituting the left side wall and the right side wall; and an inner panel constituting the upper side wall, the lower side wall and the rear side wall. The inner panel consists of a pair of inner panel base cloths having the same shapes. The inner panel base cloths have such a construction, upon airbag inflation, as to divide an area of the inner panel into two in left-right orientation. Each of the inner panel base cloths has a band shape curved in a generally C-shape, and an outer edge thereof has generally the same shape as an outer edge of a portion of the outer panel constituting the left/right side wall. The inner panel is formed by joining the outer edges of the inner panel base cloths to the outer edges of the portions of the outer panel constituting the left and right side walls, and by joining inner edges of the inner panel base cloths to each other. The protection portion includes shoulder restraining portions disposed generally side by side in left-right orientation in an area from upper part to rear part of the completely inflated airbag, and each of the shoulder restraining portions continuously project from upper part to rear part.

With the airbag for front passenger's seat thus constructed, upon airbag inflation, the protection portion completes in such a shape as is recessed in a transverse center thereof or between the shoulder restraining portions. When the inflated airbag is thrown against a passenger, the left and right shoulder restraining portions projecting rearward firstly bump against the vicinities of left and right shoulders of the passenger, so that forward kinetic energy of the passenger is reduced. Thereafter, ahead of the passenger whose shoulders are restrained by the shoulder restraining portions enters into a recessed area provided between the shoulder restraining portions, and then is restrained and suppressed from moving forward. Accordingly, the airbag is capable of receiving the passenger's head softly by suppressing reaction force, in a condition that kinetic energy is reduced by the shoulder restraining portions.

Therefore, the airbag for front passenger seat thus constructed is capable of, when completely inflated and contacting the passenger's head, protecting the head properly by suppressing reaction force.

In the meantime, in the airbag having above construction, since each of the shoulder restraining portions is arranged from upper side to rear side of the inflated airbag in a continuously protruding manner, thereby providing a continuous recess between the shoulder restraining portions also from upper end of the protection portion generally in vertical orientation. Accordingly, even if a position of the passenger's head varies in vertical orientation according to a build or sitting posture of the passenger, the airbag receives the head softly while suppressing reaction force.

Moreover, a sewn portion which sews up the inner edges of the inner panel base cloths constituting the inner panel is arranged generally all over the front-rear oriented circumference of the airbag, in generally transverse center of the inflated airbag. Since the inner edge of the inner panel base cloth defining the sewn portion has a shorter length than the outer edge of the inner panel base cloth, the sewn portion is positioned inward of an outline of the airbag as completely inflated and viewed from side. Accordingly, the whole base cloths of the airbag is regulated in developing direction by the sewn portion when developed and inflated, so that the rear wall to be deployed toward passenger is prevented from protruding toward passenger upon airbag inflation, and a shape of the completely inflated airbag body is regulated. As a result, the airbag no longer needs a tether or the like which would pull the rear wall forward i.e., in a direction opposite to passenger, and regulate the shape of the airbag body as completely inflated, so that number of parts of the airbag is reduced.

Moreover, the above airbag desirably includes, inside thereof, a flow regulating cloth having following constructions: the cloth is arranged to cover the gas inlet port from upper side;

the flow regulating cloth is formed into a generally cylindrical shape, and has openings at front and rear ends thereof, so that inflation gas flown in via the inlet port is guided forward and rearward; and upon airbag inflation, at least upper parts of the front and rear openings of the flow regulating cloth are located in higher level than the top face of instrument panel inside the airbag.

With this airbag for front passenger's seat, upon airbag inflation, the inflation gas flown in via the inlet port is supplied into the airbag from the front and rear openings of the flow regulating cloth along front-rear orientation. That is, inflation gas flows into the airbag along front-rear direction, i.e., along the dashboard top face, so that a lower part of the airbag body, especially rear lower part of the airbag is developed along the dashboard. As a result, the airbag is prevented from unnecessarily protruding toward the passenger.

In the airbag as constructed above, if the flow regulating cloth is provided, in a laterally symmetric position thereon, with a through hole whose opening area is smaller than an opening area of the front or rear opening, a small amount of inflation gas supplied from the inlet port is released therefrom. The through hole helps stabilize orientation of the front and rear openings, and further stabilize direction of the inflation gas flowing into the airbag, by releasing a small portion of the inflation gas therefrom. As a result, the shoulder restraining portions are supplied with inflation gas properly and generally equally, so that left and right portions of the airbag are developed and inflated evenly in stable manner.

In the airbag for front passenger's seat constructed as above, it is desired that: in each of the shoulder restraining portions, a joint of the outer edge of the portion of the outer panel constituting the left/right side wall and the outer edge of the inner panel base cloth defines a projecting top of the shoulder restraining portion;

the airbag is folded firstly through a preparatory folding step, and then through a transverse folding step and a vertical folding step, before being housed; and the preparatory folding is conducted, from a condition that the shoulder restraining portions are lapped with each other in left-right orientation, by holding the projecting tops of the shoulder restraining portions and opening the shoulder restraining portions left and rightwards with respect to an inner joint provided in the inner edges of the left and right inner panel base cloths, while the inner joint is arranged generally along front-rear orientation and is made to confront the gas inlet port, and by folding each of the outer panel portions constituting the left and right side walls on a fold extending along front-rear orientation; and thereby a preparatorily folded airbag has a generally symmetric shape.

With this construction, the portion of the outer panel defining the left and right side walls is folded on folds extending along front-rear orientation in a generally laterally symmetric manner, while the inner joint provided in the inner edges of the left and right inner panel base cloths is arranged generally along front-rear orientation and made to confront the gas inlet port. Inner sides of the flattened left and right shoulder restraining portions up to the projecting tops are located in left and right sides of the inner joint.

Accordingly, when the airbag unfolds from preparatorily folded state upon deployment, the portion around the inner joint confronting the inlet port swiftly shifts toward a passenger, and then the left and right shoulder restraining portions inflate in a well-balanced manner. That is, since the inner joint vicinity swiftly shifts toward a passenger, even if the shoulder restraining portions are still not inflated enough, the inner sides of the left and right shoulder restraining portions up to the projecting tops, including the inner joint, moves toward the passenger, while securing a generally vertical, wide and flat plane that is integral in left-right direction. Accordingly, even if a passenger seated proximate to the dashboard advances toward the airbag, the airbag does not unnecessarily apply a partial pressure to the passenger.

The airbag includes the shoulder restraining portions in left and right parts thereof that project rearward upon airbag inflation. Since the shoulder restraining portions inflate in a well-balanced manner after the inner joint vicinity moves toward a passenger, a stable deployment is secured from airbag to airbag, with no anxiety of unbalanced inflation.

In the airbag for front passenger's seat constructed as above, moreover, it will also be appreciated that the protection portion includes a recess arranged from upper side to rear side of and between the shoulder restraining portions, and that the airbag includes a communication portion communicating the left and right shoulder restraining portions in left-right orientation, proximate to the gas inlet port, and that an opening area of the communication portion, in a section of the completely inflated airbag taken along front-rear orientation at the center of the gas inlet port, is $\frac{1}{5}$ or greater of a projected area of a side view of the whole airbag as completely inflated.

With this construction, inflation gas smoothly passes through the communication portion, and prevents one of the shoulder restraining portions from inflating more than the other, so that the left and right shoulder restraining portions inflate generally evenly. If the opening area of the communication portion is less than $\frac{1}{5}$ of the projected area of the whole airbag, it is likely that only one of the shoulder restraining portions inflates more than the other, upon airbag inflation.

The airbag for front passenger's seat constructed as above desirably includes a vent hole for exhausting extra inflation gas, in each of the left side wall and right side wall, each of the vent holes being located in a position within an area of the communication portion communicating the left and right shoulder restraining portions in left-right orientation, in a side view of the completely inflated airbag.

With this construction, the left and right shoulder restraining portions inflate and develop generally evenly. If the vent hole is located out of the area of the communication portion in a side view of the completely inflated airbag, it is likely that an even inflated condition of the both shoulder restraining portions is not maintained because of decrease of internal pressure in either one of the shoulder restraining portions.

Moreover, in the airbag constructed as above, it will also be appreciated that the protection portion includes a recess recessed obliquely forward and downward between the shoulder restraining portions and in the transverse center of the airbag, and that, in a sectional view of the airbag mounted on vehicle and completely inflated, taken along front-rear orientation at the center of the gas inlet port, a tangent line of a rear plane of the recess is, in major part thereof except upper and lower ends, slant, while having upper end thereof located forward and lower end thereof located rearward, so that the rear plane is directed obliquely upward for restraining a passenger's head.

With this construction, when the inflated airbag is thrown against a passenger, the left and right shoulder restraining portions projecting rearward firstly bump against the vicinities of passenger's shoulders, so that forward kinetic energy of the passenger is reduced. Thereafter, a head of the passenger whose shoulders are restrained by the shoulder restraining portions enters into a recess provided between the shoulder restraining portions, and then is restrained and suppressed from moving forward. When the head of the passenger bumps against the recess rear plane, since the rear plane has such construction as the tangent line of the rear plane is slant having its upper end located forward and lower end located rearward, the airbag softly receives the passenger's head while keeping the head slanted, with the smooth and slant rear plane of the recess, which is generally parallel to an upper body of the passenger advancing while leaning forward.

In addition, since the recess rear plane has such construction as the tangent line of the rear plane is slant in its major part while having its upper end located forward and lower end located rearward, the airbag is capable of receiving the passenger's head with a slant portion of the recess rear plane, even if a level of the head of seated passenger is changed. Accordingly, the airbag is capable of protecting the passenger's head softly regardless of passenger's physique.

In the above airbag for front passenger's seat, it will be appreciated that, in a sectional view of the airbag mounted on vehicle and completely inflated, taken along front-rear direction at the center of the gas inlet port, a lower end part of the recess rear plane branches off from an outline of the airbag as viewed from side, and that a branching point of the lower end part of the recess rear plane is positioned in a higher level than a lower end of an airbag portion located in higher level than the instrument panel, and in a side of a passenger with respect to the lower end of the airbag portion.

With this construction, a lower end portion of the inflated airbag deployed between the dashboard and a passenger's abdomen inflates in a thick manner, so that the passenger's abdomen is protected by the airbag portion in a stable manner.

It will also be appreciated that, in a sectional view of the airbag mounted on vehicle and completely inflated, taken along front-rear direction at the center of the gas inlet port, an upper end part of the recess rear plane branches off from an outline of the airbag, and that a branching point of the upper end part of the recess rear plane is positioned in a lower level than an upper end of the airbag, and in a side of the wind shield with respect to the airbag upper end.

With this construction, when the airbag is completely inflated, the recess is so formed that the rear plane in an upper end part thereof is recessed more deeply. In other words, a distance between rear planes of the shoulder restraining portions and the recess rear plane becomes greater as it goes from lower end to upper end. With this construction, when a small build passenger is seated, a head of the small build passenger is to be protected by a portion of the recess rear plane where the distance between the rear planes of the shoulder restraining portions and the recess rear plane is small. However, since a moving distance of the head from shoulders upon collision is small, in case of the small build passenger, even if the distance between the rear planes of the shoulder restraining portions and the recess rear plane is small, it is prevented that the head bumps against the airbag prior to the shoulders. That is, the head is restrained by the recess rear plane after the shoulders are restrained by the shoulder restraining portions, so that impact to the neck is reduced, and the head is softly protected. On the contrary, when a large build passenger is seated, a moving distance of his head from shoulders upon collision is greater in comparison with a case of a small build passenger. However, the head of the large build passenger is protected by a portion of the recess rear plane located upper than the portion to restrain the head of a small build passenger, where the distance between the rear planes of the shoulder restraining portions and the recess rear plane is greater. Accordingly, it is prevented that the head bumps against the airbag prior to the shoulders. That is, the head is restrained by the recess rear plane after the shoulders are restrained by the shoulder restraining portions, as in a case of the small build passenger, so that impact to the neck is reduced, and the head is softly protected. Consequently, the airbag is capable of protecting a passenger's head softly in accordance with passenger's physique.

It will be further appreciated that, in a sectional view of the airbag mounted on vehicle and completely inflated, taken along front-rear direction at the center of the gas inlet port, an upper end part and the lower end part of the recess rear plane branch off from the outline of the airbag as viewed from side, that the branching point of the lower end part of the recess rear plane is positioned in a higher level than the lower end of an airbag portion located in higher level than the instrument panel, and in a side of a passenger with respect to the lower end of the airbag portion, and that the branching point of the upper end part of the recess rear plane is positioned in a lower level than the upper end of the airbag, and in a side of the wind shield with respect to the airbag upper end.

With this construction, when the airbag is inflated and thrown against a passenger, the passenger's abdomen is protected by the lower end portion of the airbag deployed between the dashboard and a passenger's abdomen in a stable manner. In addition, the passenger's head is also protected softly by the recess, in accordance with passenger's physique, since the upper end portion of the recess rear plane is deeply recessed forward.

Furthermore, in the airbag for front passenger's seat constructed as above, it will be appreciated that the protection portion includes, vertically between the left and right shoulder restraining portions, a center restraining portion recessed forward for protecting a portion of a passenger between shoulders including at least a head, and that, in a condition that the airbag is mounted on vehicle and completely inflated, a disposition of the center restraining portion is adjustable in front-rear orientation.

With this construction, when the inflated airbag is thrown against a passenger, the left and right shoulder restraining portions projecting rearward firstly bump against the vicinities of left and right shoulders of the passenger, so that forward kinetic energy of the passenger is reduced. Thereafter, a passenger's head enters into the center restraining portion recessed between the shoulder restraining portions, and then is restrained and suppressed from moving forward by the center restraining portion. Accordingly, the airbag receives the passenger's head softly by suppressing reaction force, after kinetic energy is reduced by the shoulder restraining portions.

Since the disposition of the center restraining portion is adjustable in front-rear orientation in a condition that the airbag is mounted on vehicle and completely inflated, for example, if a passenger seated in front passenger's seat is of large build, the center restraining portion is disposed in a rearmost position so as to be less recessed from the shoulder restraining portions. This means that the airbag comes to have more volume when inflated, so that it may take the airbag longer time to complete inflation. However, under a circumstance that the large build passenger is seated farther rearward from the airbag, the shoulder restraining portions of the completely inflated airbag restrain left and right shoulders properly, and then the center restraining portion receives passenger's head softly.

When disposed in the rearmost position, the center restraining portion is more proximate to the passenger's head, in comparison with a case the center restraining portion is located in a forward position. However, since the shoulder restraining portions are inflated thick enough in left-right orientation, a forward kinetic energy of the large build passenger is absorbed by the shoulder restraining portions smoothly, so that the passenger's head is received softly, by the center restraining portion.

If a passenger seated in front passenger's seat is of small build, the passenger is seated more forward. The center restraining portion is disposed in a foremost position so as to be more recessed from the shoulder restraining portions. This means that the airbag comes to have less volume when inflated, and it takes the airbag less time to complete inflation. With this construction, the left and right shoulder restraining portions restrain shoulders of the small build passenger moving forward firstly, and then the center restraining portion receives a head of the small build passenger softly by its rear plane.

In this case, since the center restraining portion is disposed more forward, or deeply recessed, than when disposed in a rear position, the airbag properly restrains the passenger's head by the rear plane of the center restraining portion, after restraining the shoulders by the shoulder restraining portions, even if the passenger is seated proximate to the airbag. In this case, even if a passenger seated proximate to the airbag is of large build, the shoulder restraining portions restrain the shoulders of the large build passenger and absorb enough kinetic energy of the passenger because of long absorbing stroke, before protecting a head by the rear plane of the center restraining portion deeply recessed forward. Accordingly, the head of the large build passenger is received softly, too, by the rear plane of the center restraining portion.

The disposition of the center restraining portion may be adjusted by adjusting length of a tether which is connected to an inner edge of the center restraining portion and extends forward inside the airbag. If the airbag is provided with more than one tethers disposed along the inner edge of the center restraining portion, not only a position in front-rear direction, but also a slant angle of the center restraining portion from horizontal orientation can be adjusted by changing lengths of each of the tethers.

The disposition of the center restraining portion may also be adjusted by adjusting length of a string member disposed through the vertical inner edge of the center restraining portion generally all along the inner edge. When the length of the string member is adjusted, the inner edge of the center restraining portion is contracted or slacked. Accordingly, side-viewed shapes of the center restraining portions located in various positions upon airbag inflation are generally similar to one another. In addition, unlike the tether, the string member is not disposed to go across an inner space of the airbag. Accordingly, the airbag may be, at the same time, provided with a flow regulating cloth for guiding inflation gas flown in the airbag forward and rearward, since it is not likely that the flow regulating cloth engages the string member.

Moreover, the length of the tether or string member released into the airbag may be adjusted by a predetermined release adjusting mechanism which is connected to ends of the tether or string member taken out of the airbag, and controlled by a control circuit responding to various sensors mounted on a dashboard, a roof, a seat or the like of vehicle for monitoring seating position or weight of a passenger. When the airbag can be mounted on various kinds of vehicle in which seating position or physique of a passenger is supposed in a generally limited range, the airbag for front passenger's seat may be mounted on vehicle with a tether or a string member whose length is fixed. In this case, although the length of a tether or string member may be adjusted only until the airbag is mounted on vehicle, but not after being mounted, it is advantageous that one kind of airbag may be applied to various kinds of vehicle.

The second object of the present invention is attained by an airbag for front passenger's seat having following constructions:

The airbag is folded and housed in a top face of instrument panel in front of front passenger's seat, and upon inflow of inflation gas, the airbag protruding upward and deploying rearward of vehicle in such a manner as to occupy a space between the top face of the instrument panel and a wind shield located above the instrument panel. The airbag includes: an inlet port for introducing inflation gas, in the front end vicinity of lower side of, and in the vicinity of transverse center of, the airbag as completely inflated; and a protection portion contactable with a front seat passenger, in a rear side of the airbag as completely inflated. Upon airbag inflation, the protection portion includes: left and right shoulder restraining portions disposed generally side by side in left-right orientation, the shoulder restraining portions projecting rearward in such a manner as to contact passenger's shoulders; and a recess arranged from upper side to rear side of and between the shoulder restraining portions. The airbag includes a communication portion communicating the left and right shoulder restraining portions in left-right orientation, proximate to the gas inlet port. An opening area of the communication portion, in a section of the completely inflated airbag taken along front-rear orientation at the center of the gas inlet port, is ⅕ or greater of a projected area of a side view of the whole airbag as completely inflated.

With this construction, inflation gas smoothly passes through the communication portion, and prevents one of the shoulder restraining portions from inflating more than the other, so that the left and right shoulder restraining portions inflate generally evenly. If the opening area of the communication portion is less than ⅕ of the projected area of the whole airbag, it is likely that only one of the shoulder restraining portions inflates more than the other, upon airbag inflation.

Therefore, in the airbag for front passenger's seat constructed as above, the shoulder restraining portions as projecting portion constituting the protection portion inflate evenly, so that an approaching passenger is properly protected.

Moreover, in the airbag constructed as above, the protection portion includes left and right shoulder restraining portions which are disposed generally side by side in left-right orientation, and project rearward, and a recess arranged from upper side to rear side of and between the shoulder restraining portions. Accordingly, when the inflated airbag is thrown against a passenger, the left and right shoulder restraining portions projecting rearward firstly bump against the vicinities of left and right shoulders of the passenger. Thereafter, a passenger's head enters into the recess provided between the shoulder restraining portions, and then is restrained and suppressed from moving forward. Accordingly, the airbag receives the passenger's head softly by suppressing reaction force. Moreover, the opening area of the communication portion, which also constitutes the recess, is predetermined 1/5 or greater of the projected area of a side view of the whole airbag as completely inflated. With this great setting of the communication portion, the recess has a good cushioning property. Even if a head of a passenger is thrown against the recess rear plane, therefore, the head is protected by the recess rear plane properly.

In addition, in the airbag constructed as above, the recess is disposed from upper side to rear side of and between the shoulder restraining portions. Accordingly, even if a level of the passenger's head is changed in vertical orientation, the recess rear plane receives the head softly while suppressing reaction force from the airbag. In order to protect the passenger's head softly, the opening area of the communication portion constituting the recess is desirably less than 4/5 of the projected area of the completely inflated airbag.

It is desired that the airbag constructed as above is formed by sewing up edges of a plurality of predetermined shaped base cloths, and that the recess is formed by sewing up edges of base cloths constituting the left and right shoulder restraining portions.

With this construction, the recess is formed by sewing up edges of base cloths constituting the left and right shoulder restraining portions. Accordingly, the recess provided between the left and right shoulder restraining portions can be deeper or shallower by changing a length of the sewn portion. At the same time, an opening area of the communication portion communicating the left and right shoulder restraining portions can be changed by changing the length of the sewn portion. That is, a shape of the recess is easily changed without changing an outer contour of the airbag.

More specifically, it is desired that: the airbag for front passenger's seat, when completely inflated, is formed into a generally square conical shape in which a top of the square conical shape is in a front end of the airbag, and a rear side constituting the protection portion is in a bottom side of the airbag;

the airbag upon inflation includes:

an outer panel constituting areas of left and right side walls of the square conical shape, and an inner panel constituting areas from an upper side wall to a lower side wall via a rear side wall of the square conical shape, between the left and right side walls;

the inner panel consists of a pair of inner panel base cloths having the same shapes, the inner panel base cloths has such a construction, upon airbag inflation, as to divide the inner panel into two in left-right orientation;

each of the inner panel base cloths has a band shape curved in a generally C-shape, and an outer edge of each of the inner panel base cloths has generally the same shape as an outer edge of a portion of the outer panel constituting the left/right side wall;

the inner panel is formed by joining the outer edges of the inner panel base cloths to the outer edges of the portions of the outer panel constituting the left and right side walls, and by joining inner edges of the inner panel base cloths to each other; and the recess is defined by a joint of the inner edges of the inner panel base cloths.

It will also be appreciated that: the airbag for front passenger's seat, when completely inflated, is formed into a generally square conical shape in which a top of the square conical shape is in a front end of the airbag, and a rear side constituting the protection portion is in a bottom side of the airbag;

the airbag upon inflation includes:

an upper panel constituting areas of left and right side walls and an area from upper side wall to rear side wall, of the square conical shape, and a lower panel constituting an area of a lower side wall of the square conical shape;

the upper panel consists of a pair of upper panel base cloths having the same shapes, the upper panel base cloths has such a construction, upon airbag inflation, as to divide the upper panel into two in left-right orientation;

the upper panel is formed by joining inner edges of the upper panel base cloths to each other; and the recess is defined by a joint of the inner edges of the upper panel base cloths.

It will also be appreciated that: the airbag for front passenger's seat, when completely inflated, is formed into a generally square conical shape in which a top of the square conical shape is in a front end of the airbag, and a rear side constituting the protection portion is in a bottom side of the airbag;

the airbag upon inflation includes:

a front panel constituting areas of left and right side walls and an area from upper side wall to lower side wall, of the square conical shape, and a rear panel constituting an area of a rear side wall of the square conical shape;

the rear panel consists of a pair of rear panel base cloths having the same shapes, the rear panel base cloths has such a construction, upon airbag inflation, as to divide the rear panel into two in left-right orientation;

the rear panel is formed by joining inner edges of the rear panel base cloths to each other; and the recess is defined by a joint of the inner edges of the rear panel base cloths.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims. Up-down, front-rear, and left-right directions in this specification correspond to up-down, front-rear, and left-right directions of a vehicle being steered straight forward.

Firstly, a first embodiment of the present invention is described, by which the first and second object of the present invention are attainable.

Figure 1:
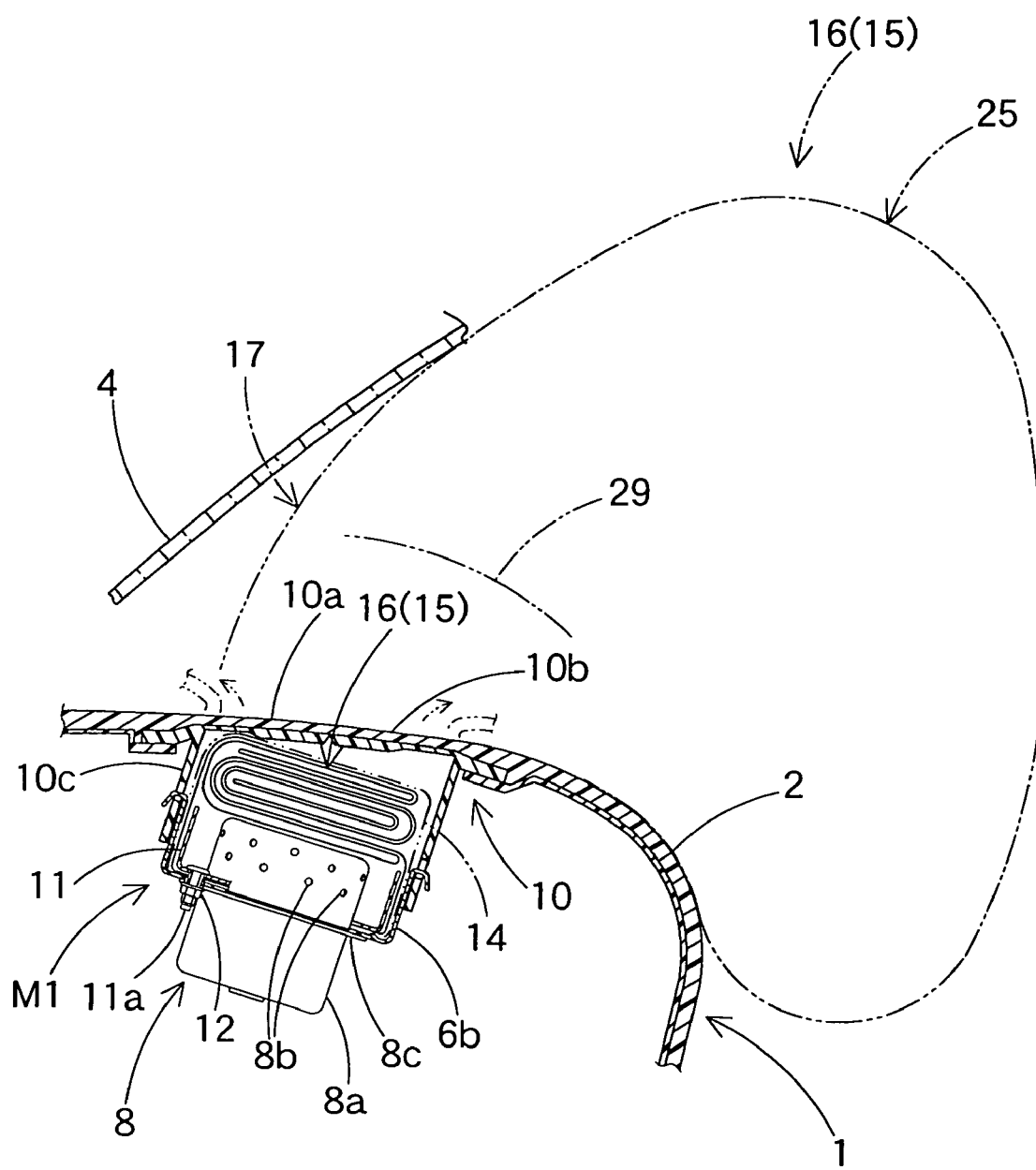
FIG. 1 is a schematic vertical section of an airbag device for front passenger's seat employing an airbag according to a first embodiment of the present invention, taken along front-rear orientation of vehicle.

FIG. 1 illustrates an airbag 15 for front passenger's seat used for an airbag device M1 for front passenger's seat. The airbag device M1 for front passenger's seat is a top-mount type that is disposed in interior of a top face 2 of instrument panel 1. The airbag device M1 includes a folded airbag 15, an inflator 8 for supplying the airbag 15 with inflation gas, a case 6 for housing and holding the airbag 15 and the inflator 8, a retainer 11 for attaching the airbag 15 to the case 6, and an airbag cover 10 for covering the folded airbag 15.

The airbag cover 10 is integral with the dashboard 1 made from synthetic resin, and is adapted to open two front and rear doors 10a and 10b when pushed by the inflating airbag 15. The airbag cover 10 includes a joint wall 10c by which the airbag cover 10 is attached to the case 6. The joint wall 10c is arranged around the doors 10a and 10b of the airbag cover 10.

The inflator 8 includes a body portion 8a having a generally columnar shape and provided with gas discharge ports 8b, and a flange 8c for attaching the inflator 8 to the case 6.

The case 6 is made of sheet metal into a generally rectangular parallelepiped shape, and has a rectangular opening at the top. The case 6 includes a bottom wall 6a of a generally rectangular plate shape, and a side wall 6b extending upward from outer edge of the bottom wall 6a. The inflator 8 is set in an insert hole of the bottom wall 6a from lower side. The side wall 6b retains the joint wall 10c of the airbag cover 10. The case 6 is further provided with unillustrated brackets, in the bottom wall 6a, for attachment of the case 6 to vehicle body.

The airbag 15 and the inflator 8 are secured to the case 6 by attaching an annular retainer 11 inside the airbag 15 such that bolts 11a of the retainer 11 are put through the airbag 15, the flange 8c of the inflator 8, and the case bottom wall 6a, and then fastened into nuts 12.

Referring to FIGS. 1 to 5, the airbag 15 includes an airbag body 16 and a flow regulating cloth 29 disposed inside the airbag body 16. The airbag body 16 is formed into a generally square conical shape whose top is in a front end of the airbag body 16. The airbag body 16 includes an upper side wall 16a and a lower side wall 16b arranged generally along left-right direction in upper and lower sides, a left side wall 16c and a right side wall 16d arranged generally along front-rear direction in left and right sides, and a rear wall 16e arranged generally along left-right direction to confront a passenger, in such a manner as to connect the upper side wall 16a and the lower side wall 16b. The airbag body 16 includes a protection portion 25 to be arranged in a rear side to face toward a passenger upon airbag inflation, and a vehicle body side portion 17 to be arranged between the dashboard 1 and a wind shield 4 forward of the protection portion 25 upon airbag inflation. The vehicle body side portion 17 has a generally cylindrical shape closed at a front end thereof. The airbag body 16 further includes a round gas inlet port 19 for introducing inflation gas, in the vicinity of transverse center of the vehicle body side portion 17 and proximate to a front end of the lower side wall 16b of the airbag body 16 as completely inflated. In a periphery 18 of the inlet port 19 are mounting holes 20 for inserting the bolts 11a of the retainer 11 to attach the inlet port periphery 18 to the bottom wall 6a of the case 6.

Figure 2:
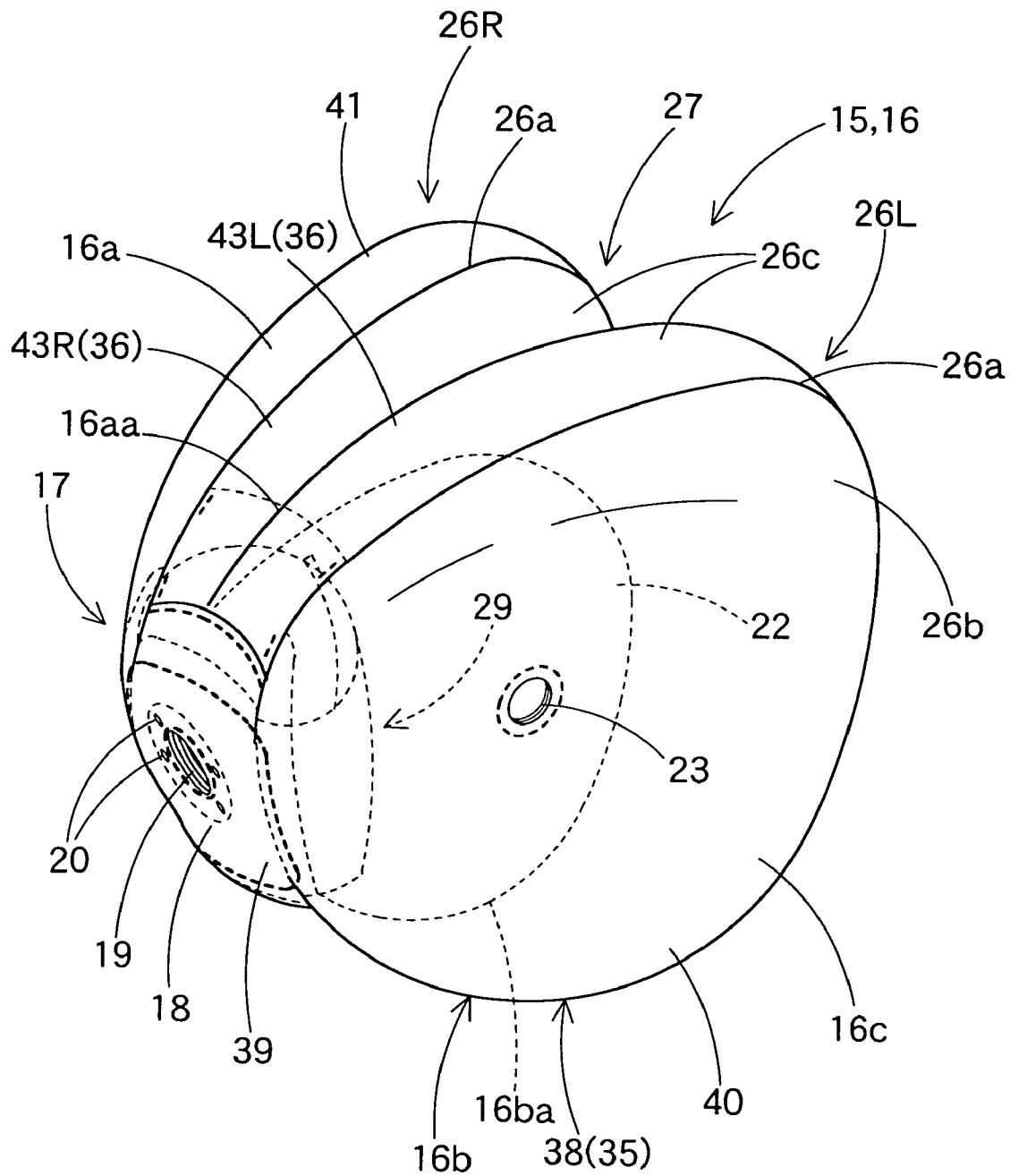
FIG. 2 is a perspective view of the airbag of the first embodiment inflating by itself, as viewed from front.

The protection portion 25 includes shoulder restraining portions 26L and 26R, as projecting portions, disposed side by side in left-right direction, and a recess 27 recessed from upper side to rear side between the left and right shoulder restraining portions 26L and 26R. Each of the shoulder restraining portions 26L and 26R is arranged vertically and project rearward. In the illustrated embodiment, rise of the left and right shoulder restraining portions 26L and 26R, and recess of the recess 27 continue forward from the rear side wall 16e of the airbag body 16, in such a manner as to enter within areas of the upper and lower side walls 16a and 16b, up to the vicinity of the gas inlet port 19 of the vehicle body side wall 17, but this unevenness stops in a lower part 39 of a later-described first base cloth 38, as shown in FIG. 2.

Figure 4:
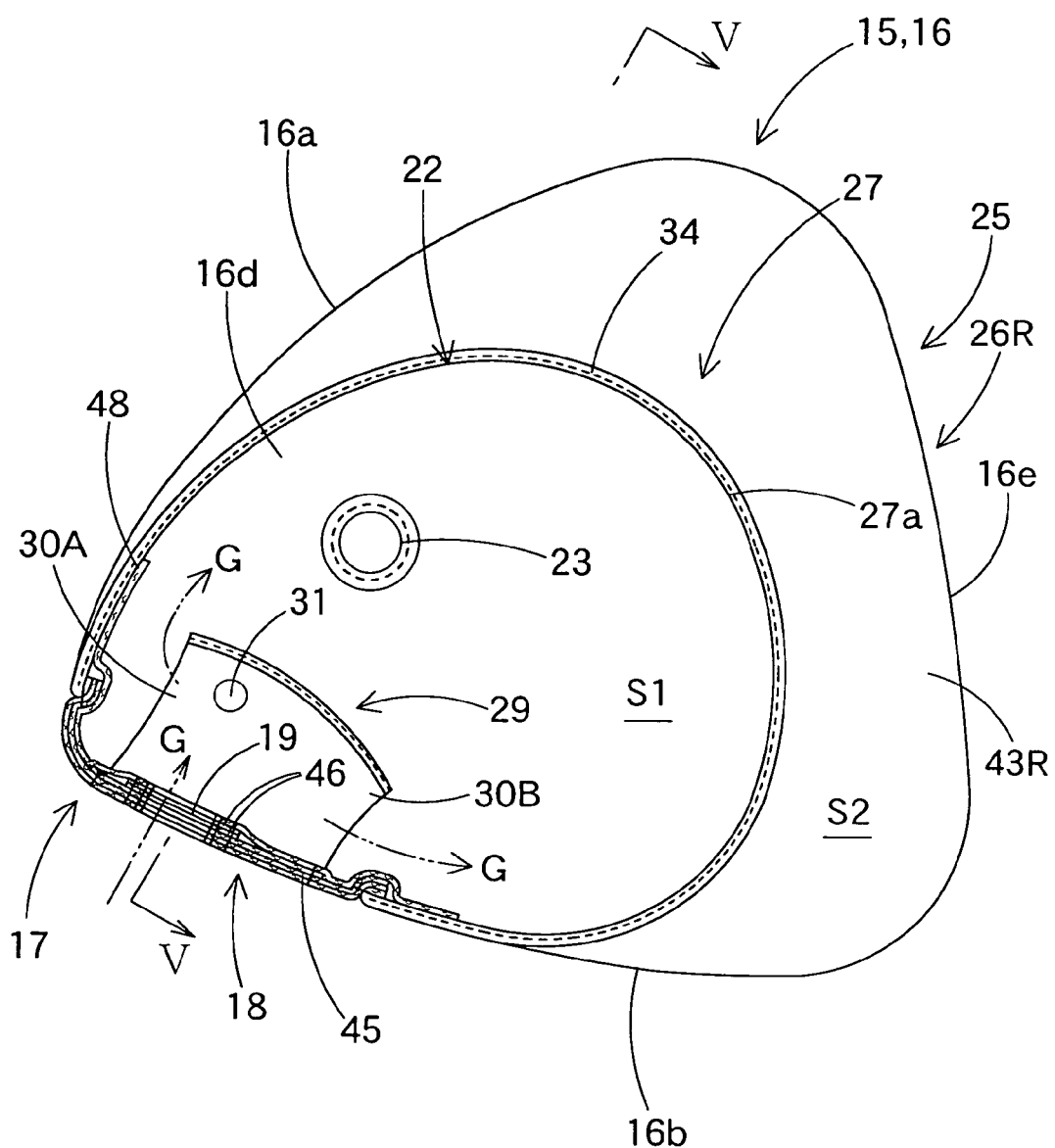
FIG. 4 is a sectional view of the airbag of FIG. 2, taken along front-rear direction.
Figure 5:
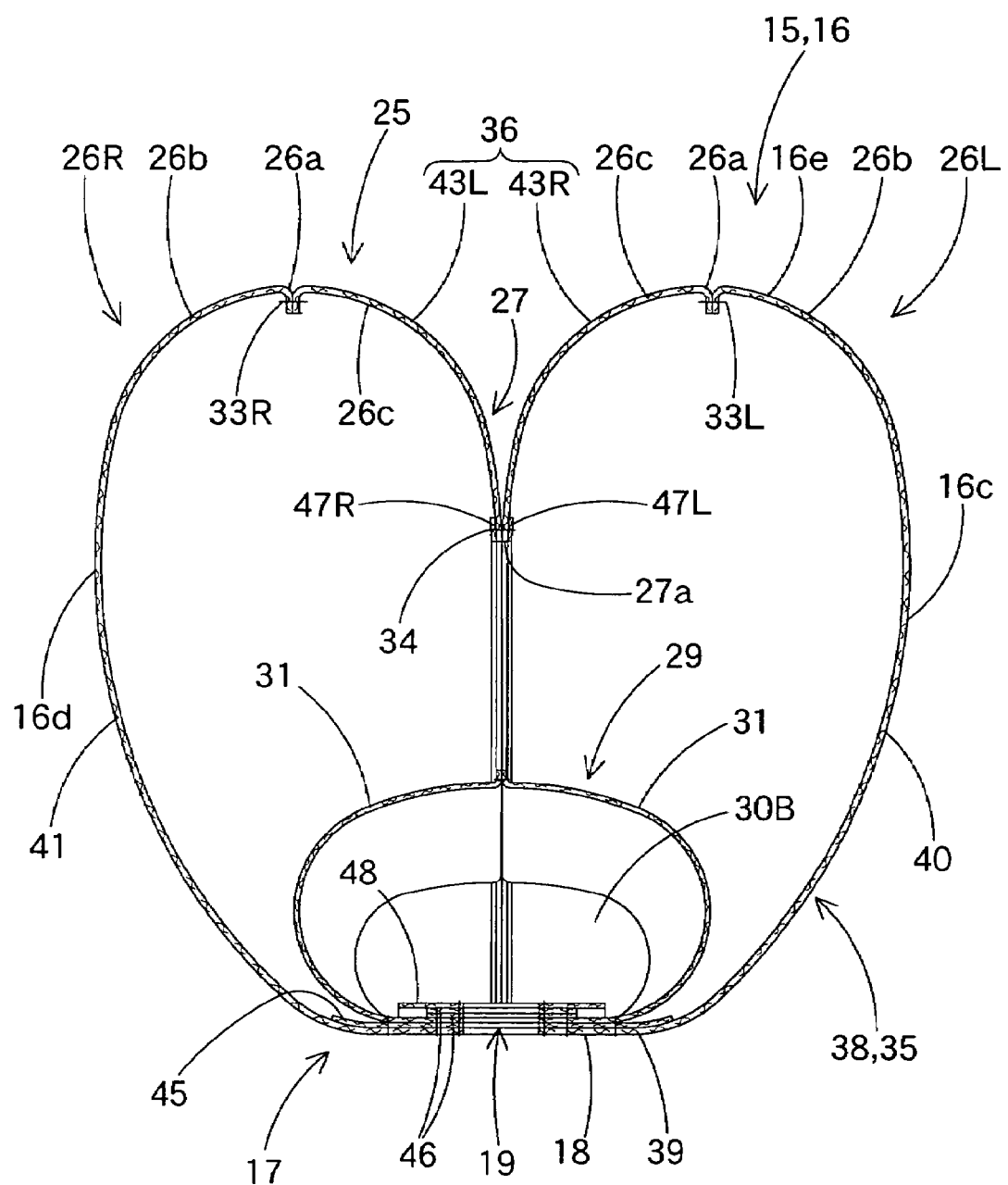
FIG. 5 is a sectional view taken along V-V in FIG. 4.
Figure 15:
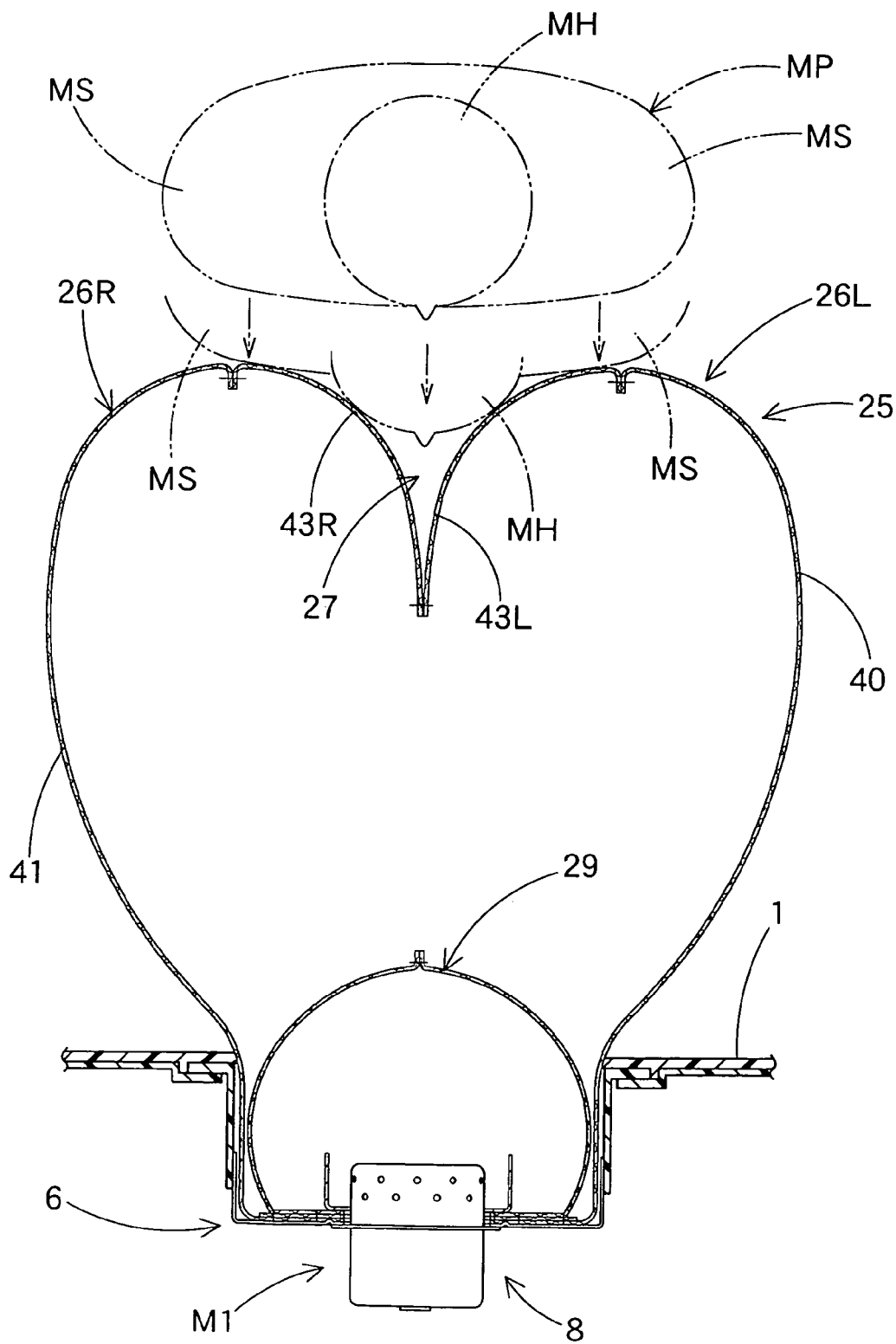
FIG. 15 schematically illustrates the airbag of FIG. 14 as viewed from upper side of vehicle.
Figure 16:
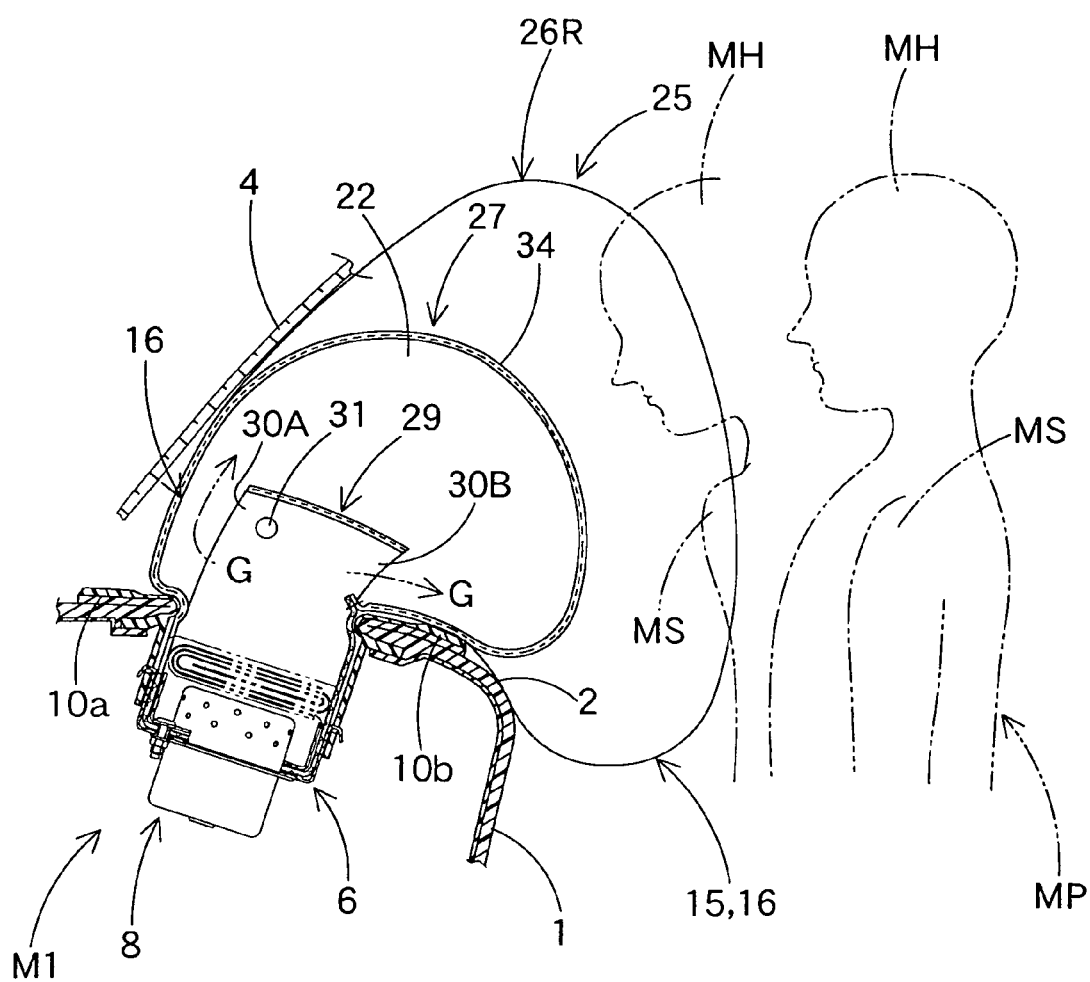
FIG. 16 schematically illustrates the airbag of FIG. 14 as viewed from side of vehicle.

Referring to FIGS. 4 and 5, the flow regulating cloth 29 located inside the airbag body 16 is arranged to cover the gas inlet port 19 from upper side. The flow regulating cloth 29 is formed into a generally cylindrical shape opened at front and rear ends so as to redirect inflation gas G flown in via the inlet port 19 forward and rearward. In the airbag 15, more specifically, the inflation gas G flown in via the inlet port 19 is supplied into the airbag body 16 from front and rear openings 30A and 30B of the flow regulating cloth 29. In the flow regulating cloth 29, as shown in FIGS. 1, 15 and 16, an upper part of the front and rear openings 30A and 30B are located in higher level than the top face 2 of the dashboard 1, upon deployment of the airbag 15. The flow regulating cloth 29 has a greater dimension than front-rear, and left-right dimension of the gas inlet port 19, but is not so great as to reach an inner edge of a later-described communication port 22. A sectional shape of the flow regulating cloth 29 taken along front-rear direction at the center vicinity of the inlet port 19 is a curvature bulging upward away from the inlet port 19. The flow regulating cloth 29 further includes through holes 31 adapted to release inflation gas supplied from the inlet port 19. A total of opening areas of the through holes 31 is smaller than an opening area of the opening 30A/30B. In the illustrated embodiment, the through holes 31 are located in two positions symmetric with respect to a center of the inlet port 19, as shown in FIGS. 4 and 5. The through holes 31 help stabilize orientation of the front and rear openings 30A and 30B, and further stabilize direction of the inflation gas G flowing into the airbag body 16, upon airbag deployment, by releasing a small portion of the inflation gas G flown in via the inlet port 19.

Figure 6:
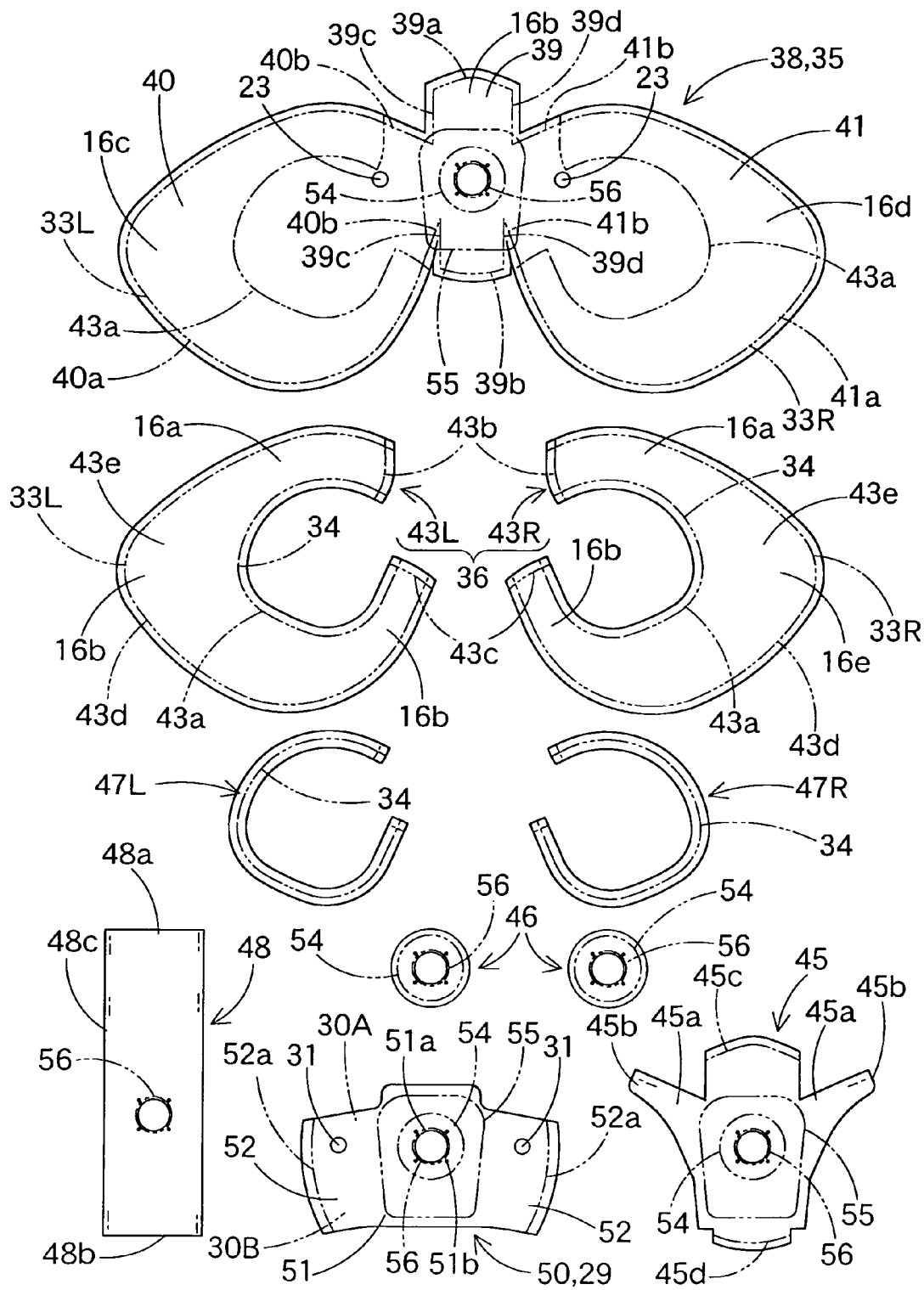
FIG. 6 illustrates constituent parts of the airbag of FIG. 2 by plan views.

The flow regulating cloth 29 is made of a material 50 for the flow regulating cloth shown in FIG. 6. The material 50 includes a generally rectangular joint portion 51 and extensions 52 extending from left and right sides of the joint portion 51. The joint portion 51 includes an opening 51a correspondent to the inlet port 19, and holes 51b correspondent to the mounting holes 20, and is sewn to the lower part 39 of the first base cloth 38 at its circumference. The extensions 52 are sewn up at edges 52a thereof apart from the joint portion 51. The through holes 31 are formed in left and right sides of the opening 51a in the extensions 52, the positions being symmetric with respect to the opening 51a.

The airbag body 16 is formed by joining edges of predetermined shaped base cloths. The airbag body 16 includes an outer panel 35 constituting the left and right side walls 16c and 16d, and a front part of the lower side wall 16b, and an inner panel 36 constituting the upper and rear side walls 16a and 16e, and a rear part of the lower side wall 16b. In the illustrated embodiment, the airbag body 16 is formed of a first base cloth 38 and a pair of second base cloths 43L and 43R, as inner panel base cloth, having the same shapes. The first base cloth 38 constitutes the outer panel 35, while the second base cloths 43L and 43R constitute the inner panel 36.

The first base cloth 38 has a laterally symmetric shape proximate to a figure of a butterfly spreading its wings. The first base cloth 38 includes a generally rectangular lower part 39 constituting the periphery 18 of the gas inlet port 19 in the vehicle body side portion 17, and left and right portions 40 and 41, each of which having a generally triangular plate shape, arranged in such a manner as to extend left and right-wards from the lower part 39. The lower part 39 makes a front part of the lower side wall 16b of the airbag body 16 as completely inflated, which is the vicinity of the gas inlet port 19. The left and right portions 40 and 41 mainly constitute the left and right side walls 16c and 16d of the airbag body 16 as completely inflated. Portions in the vicinity of outer edges 40a and 41a of the left and right portions 40 and 41 constitute outer wall portions 26b located toward transverse ends than projected tops 26a of the shoulder restraining portions 26L and 26R, respectively, as shown in FIGS. 2 and 5. In the illustrated embodiment, the left and right portions 40 and 41 are symmetric to each other with respect to a line running through the center of the inlet port 19.

Figure 3:
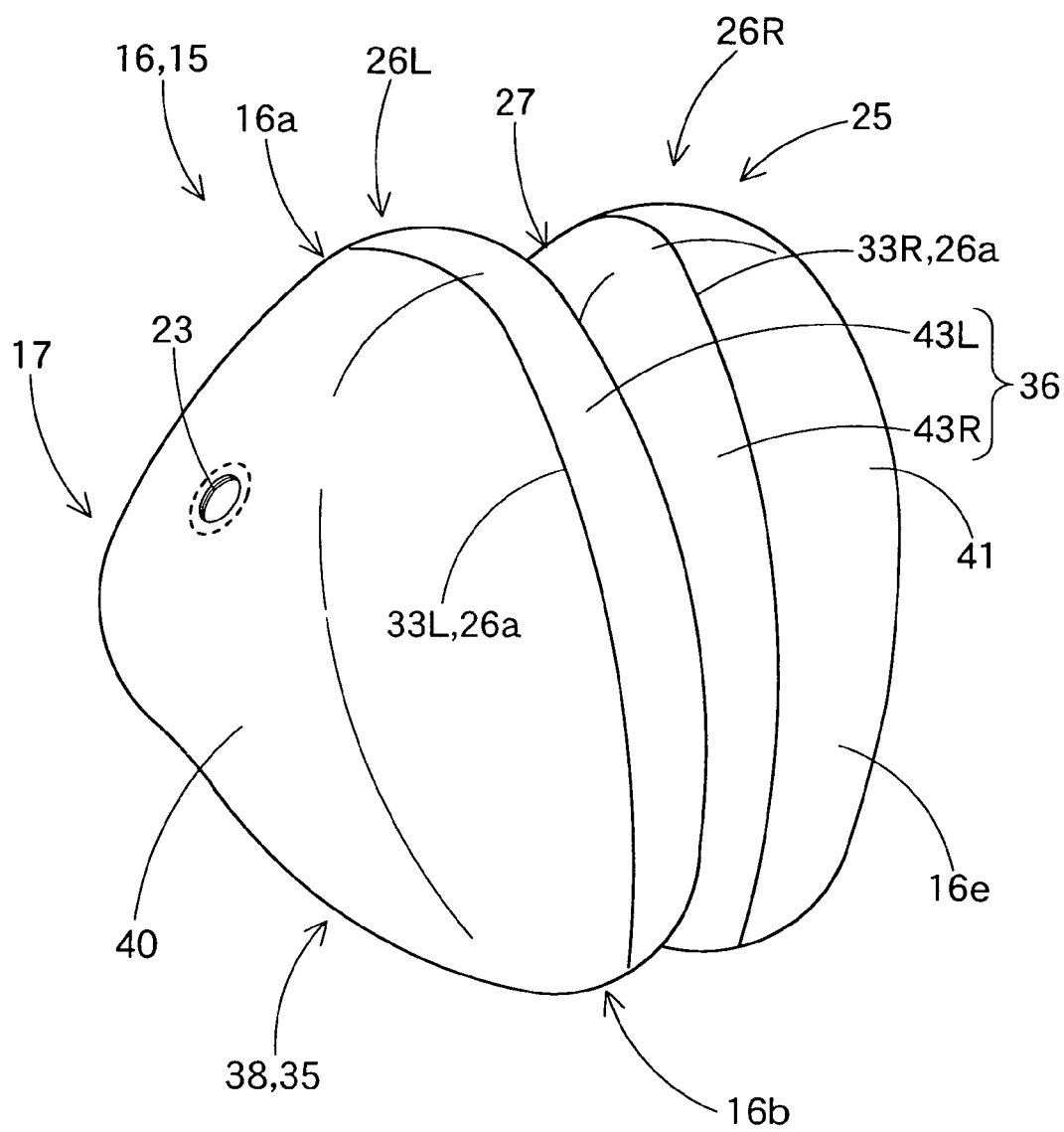
FIG. 3 is a perspective view of the airbag of FIG. 2 as viewed from rearward.

Referring to FIGS. 2, 3 and 5, the second base cloths 43L and 43R are arranged in such a manner as to divide an area of the inner panel 36 into two in left-right direction, upon airbag inflation. In the illustrated embodiment, in the airbag body 16 as completely inflated, the second base cloths 43L and 43R constitute the upper and rear side walls 16a, 16e and a rear part of the lower side wall 16b. The second base cloths 43L and 43R also constitute inner wall portions 26c that are located toward transverse center than the projected tops 26a of the shoulder restraining portions 26L and 26R. Each of the second base cloths 43L and 43R has a band shape curved in a generally C-shape. In the illustrated embodiment, an outer edge portion 43d of each of the second base cloths 43L and 43R has generally the same shape as a portion of the edge 40a/41a of the left/right portion 40/41 in the first base cloth 38 except a root side edge 40b/41b. Moreover, inner edge portions 43a formed in inner circumferences of the second base cloths 43L and 43R provide a leading end 27a of the recess 27 recessed inward of the airbag body 16, and also an edge of a communication port 22 that communicates the left and right shoulder restraining portions 26L and 26R.

The shoulder restraining portions 26L and 26R and the recess 27 in the protection portion 25 are formed by sewing up edges of, the left and right portions 40 and 41 of the first base cloth 38, and the second base cloths 43L and 43R. A sewn portion 33L, as outer joint, formed by sewing up the edge 40a of the left portion 40 in the first base cloth 38 and the outer edge 43d of the second base cloth 43L, and a sewn portion 33R, also as outer joint, formed by sewing up the edge 41a of the right portion 41 in the first base cloth 38 and the outer edge 43d of the second base cloth 43R provide, respectively, the projected tops 26a of the shoulder restraining portions 26L and 26R. The vicinity of a sewn portion 34, as inner joint, formed by sewing up the inner edges 43a of the second base cloths 43L and 43R provides the leading end 27a of the recess 27.

In interior side of the airbag body 16, a communication port 22 is provided in the vicinity of the recess leading end 27a. The communication port 22 communicates the shoulder restraining portions 26L and 26R in left-right direction, and is defined by the sewn portion 34, or the leading end 27a of the recess 27, formed by sewing up the inner edges 43a of the second base cloths 43L and 43R, and the lower part 39 of the first base cloth 38. The communication port 22 ranges from lower side of the protection portion 25 to lower side of the vehicle body side portion 17, as shown in FIG. 4.

When the airbag body 16 is completely inflated, an opening plane of the communication port 22 is arranged along front-rear direction in generally transverse center of the airbag body 16. An opening area S1 of the communication port 22 in a section taken along front-rear direction generally at the center of the gas inlet port 19, in an completely inflated condition of the airbag body 16 or the airbag 15, is predetermined ⅕ or greater of a projected area S2 of a side view of the whole airbag body 16 or the whole airbag 15 as completely inflated, as shown in FIG. 4. In the illustrated embodiment, the opening area S1 of the communication port 22 is generally half of the projected area S2 of the completely inflated airbag 15. In order to protect a passenger's head softly, the opening area S1 of the communication port 22 is desirably less than ⅘ of the projected area S2 of the completely inflated airbag 15. If the opening area S1 of the communication port 22 is ⅘ or greater of the projected area S2 of the completely inflated airbag 15, projecting amount of the shoulder restraining portions 26L and 26R, i.e., recessing amount of the recess 27, becomes relatively small, which may cause failure in protecting the passenger's head softly.

The airbag body 16 is provided with a vent hole 23 for exhausting extra inflation gas in each of the left and right side walls 16c and 16d. As shown in FIG. 4, each of the vent holes 23 is located in a position within an area of the communication port 22 in a side view of the completely inflated airbag body 16.

The airbag body 16 is further provided with reinforcing cloths 45 and 46 for reinforcing the inlet port periphery 18, reinforcing cloths 47L and 47R for reinforcing the sewn portions 34, and a protection cloth 48 for protecting the inlet port periphery 18. The reinforcing cloth 45 is formed into a shape that covers a generally entire area of inner surface of the lower part 39 of the first base cloth 38. Flap portions 45a of the reinforcing cloth 45, which have such a shape as to project left and rightward, are sewn to the vicinity of the sewn portions 33L and 33R, respectively, at leading ends 45b thereof. Each of the reinforcing cloths 46 has a generally round shape. Although the airbag 15 in the foregoing embodiment has two reinforcing cloths 46, number of the reinforcing cloth 46 may be varied according to output of the inflator 8. Each of the reinforcing cloths 47L and 47R has a shape curved in a generally C-shape corresponding to the inner edge 43a of the second base cloth 43L/43R, and is adapted to cover an entire area of the inner edge 43a of the second base cloth 43L/43R for reinforcing the sewn portion 34. The protection cloth 48 has a generally rectangular shape extending front and rearwards of the gas inlet port 19, and is applied to inner surface of the airbag body 16 in order to prevent the inflation gas G discharged from the inflator 8 from hitting sewn portions 54 and 55 located proximate to the inlet port 19, or sewn portions sewing up the lower part 39 of the first base cloth 38 and the second base cloths 43L and 43R, and so on, directly. The protection cloth 48 is sewn to the vicinity of the sewn portions 33L and 33R at a plurality of positions in left and right edges thereof. In the illustrated embodiment, the protection cloth 48 is sewn to the vicinity of the sewn portions 33L and 33R at six positions in front and rear ends 48a, 48b, and in positions 48c between the inlet port 19 and the front end 48a, as shown in FIG. 6.

In the foregoing embodiment, the first and second base cloths 38, 43L and 43R, the reinforcing cloths 45, 46, 47L and 47R, the protection cloth 48, and the flow regulating cloth material 50 are made from flexible woven fabric of polyester, polyamide or the like. The woven fabric is not coated by coating agent such as silicone, or the like.

Manufacturing of the airbag 5 is now described. Firstly, the reinforcing cloth 45, the flow regulating cloth material 50, and the reinforcing cloths 46 are lapped over the flatly developed first base cloth 38 in this order, and sewn to the first base cloth 38 at a position around the mounting holes 20 in the periphery 18 of the gas inlet port 19, and at a position running along an edge of the joint portion 51 of the flow regulating cloth 50 by sewing yarn, so that sewn portions 54 and 55 are provided. Subsequently, the protection portion 48 is lapped over the reinforcing cloth 46, and sewn thereto at a position between the inlet port 19 and the mounting holes 20 in a generally round shape, thereby a sewn portion 56 is provided. Thereafter, the gas inlet port 19 and the mounting holes 20 are formed by punching work. Subsequently, the edges 52a of the extensions 52 in the flow regulating cloth material 50 are sewn up together by sewing yarn in an arcuate shape, so that the flow regulating cloth 29 is formed into a predetermined shape. Although the punching work for providing the inlet port 19 and the mounting holes 20 are applied after the reinforcing cloths 45, 46, the protection cloth 48 and the flow regulating cloth material 50 are sewn to the first base cloth 38, each of the reinforcing cloths 45, 46, the protection cloth 48 and the flow regulating cloth material 50 may be provided with apertures constituting the inlet port and mounting holes in advance.

Thereafter, the second base cloths 43L and 43R are lapped with each other, and the reinforcing cloths 47L and 47R are applied in such a manner as to put the inner edges 43a of the second base cloths 43L and 43R therebetween. Then the inner edges 43a are sewn up together with the reinforcing cloths 47L and 47R, so that a sewn portion 34 is provided. Subsequently, with stitch allowances of the inner edges 43a kept inside, the second base cloths 43L and 43R are opened so that the front edges 43b of the second base cloths 43L and 43R are disposed in series generally straightly. Then the front edges 43b thus disposed straightly are sewn to a front edge 39a of the lower part 39 in the first base cloth 38 and to a front edge 45c of the reinforcing cloth 45. Likewise, rear edges 43c of the second base cloths 43L and 43R also disposed straightly are sewn to a rear edge 39b of the lower part 39 in the first base cloth 38 and to a rear edge 45d of the reinforcing cloth 45. Then front and rear left edges 39c of the lower part 39 are sewn to the root side portions 40b of the edge 40a in the left portion 40, while right edges 39d of the lower part 39 are sewn to the root side portions 41b of the edge 41a in the right portion 41. Thereafter, the sewn portion 33L is formed by sewing up the edge 40a of the left portion 40 and the outer edge 43d of the second base cloth 43L, while the sewn portion 33R is formed by sewing up the edge 41a of the right portion 41 and the outer edge 43d of the second base cloth 43R. Subsequently, the leading ends 45b of the reinforcing cloth 45 and part of the protection cloth 48, or portions 48a, 48b and 48c in the left and right edges of the protection cloth 48, are sewn to the vicinity of the sewn portions 33L and 33R. If then the airbag 15 is reversed inside out utilizing the gas inlet port 19 so that stitch allowances may not appear on surface, the airbag 15 is complete. If it is difficult to reverse the airbag 15 from the inlet port 19, the extensions 52 of the flow regulating cloth material 50 may be taken out of the inlet port 19 and sewn up at the edges 52a after the airbag body 16 is reversed inside out.

In the airbag 15, the inner panel 36 is formed by a pair of the second base cloths 43L and 43R having the generally same shape. Moreover, the outer edge portion 43d of each of the second base cloths 43L and 43R has generally the same shape as the edge 40a/41a of the left/right portion 40/41 in the first base cloth 38 except the root side portion 40b/41b. Accordingly, sewing positions in the edges of the base cloths 38, 43L and 43R easily match one another only by lapping the base cloths 38, 43L and 43R one on another, which facilitates sewing work of the airbag 15.

To mount the airbag 15 thus manufactured on vehicle, the airbag 15 is firstly folded up with the retainer 11 arranged inside thereof so that the bolts 11a protrude from the mounting holes 20. Folding process of the airbag 15 includes preparatory folding step, transverse folding step, and vertical folding step.

Figure 8:
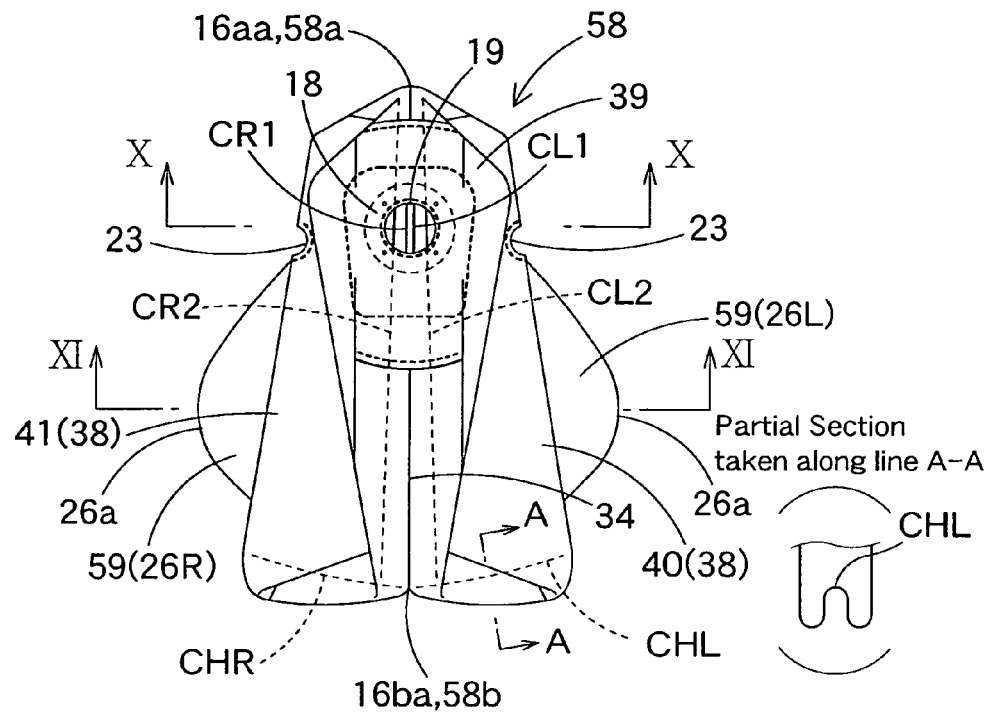
FIG. 8 illustrates the airbag of FIG. 2 having gone through a preparatory folding step, as viewed from side of a gas inlet port.
Figure 9:
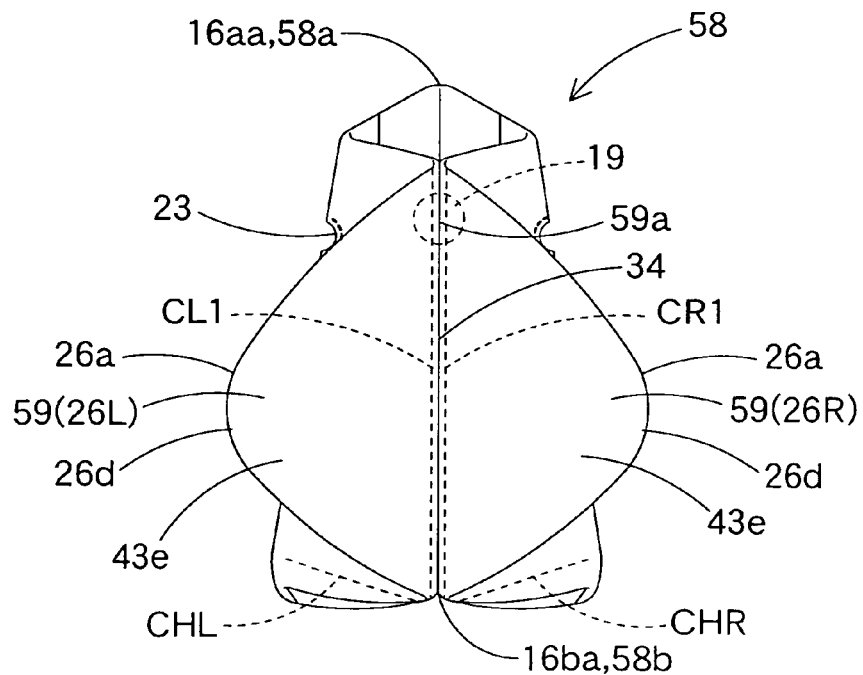
FIG. 9 illustrates the airbag of FIG. 8 as viewed from side of a protection portion.

The preparatory folding step provides a preparatorily folded airbag 58 shown in FIGS. 8 to 11. The preparatorily folded airbag 58 has a generally flat shape in which the projected tops 26a of the left and right shoulder restraining portions 26L and 26R are opened left and rightwards with respect to the sewn portion 34, and the sewn portion 34 is arranged in front-rear direction while confronting the gas inlet port 19. More specifically, the sewn portion 34 is disposed in generally entire circumference of the preparatorily folded airbag 58 except the periphery 18 of the inlet port 19, i.e., a portion defined by the lower part 39 of the first base cloth 38, along front-rear direction and in generally transverse center of the preparatorily folded airbag 58, as shown in FIGS. 8 and 9.

Figure 7:
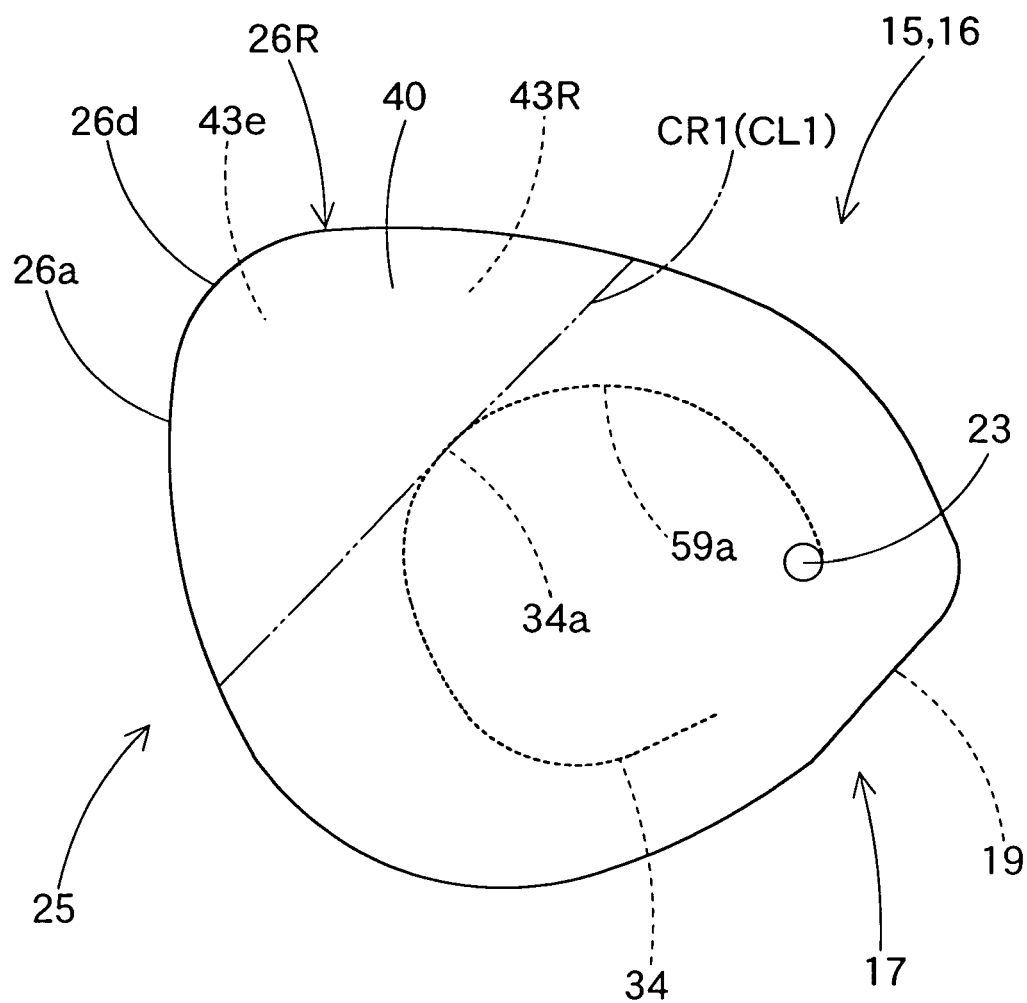
FIG. 7 is a schematic side view of the airbag of FIG. 2 lapped in transverse direction and developed flatly.
Figure 10:
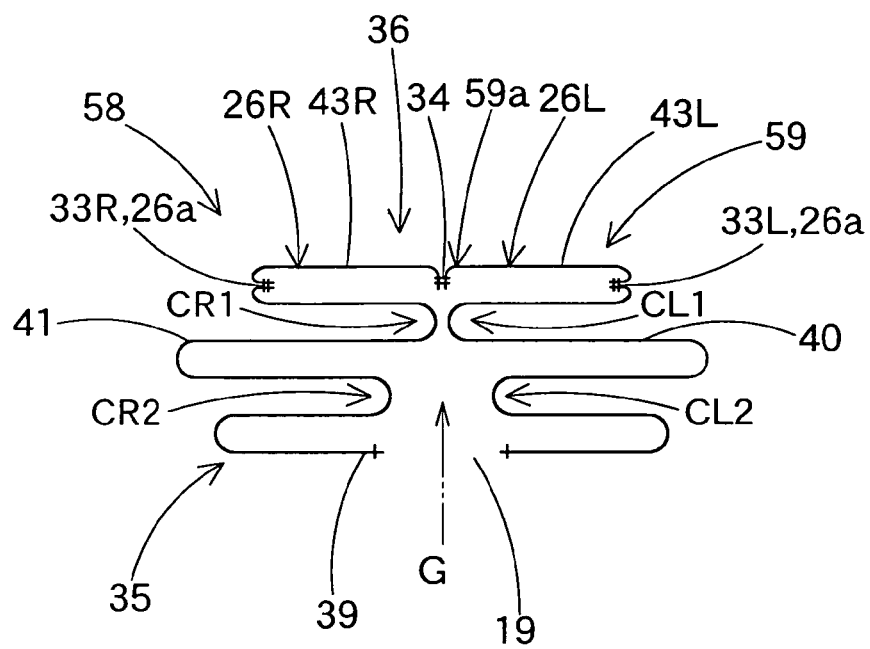
FIG. 10 is an end view taken along line X-X of FIG. 8.
Figure 11:
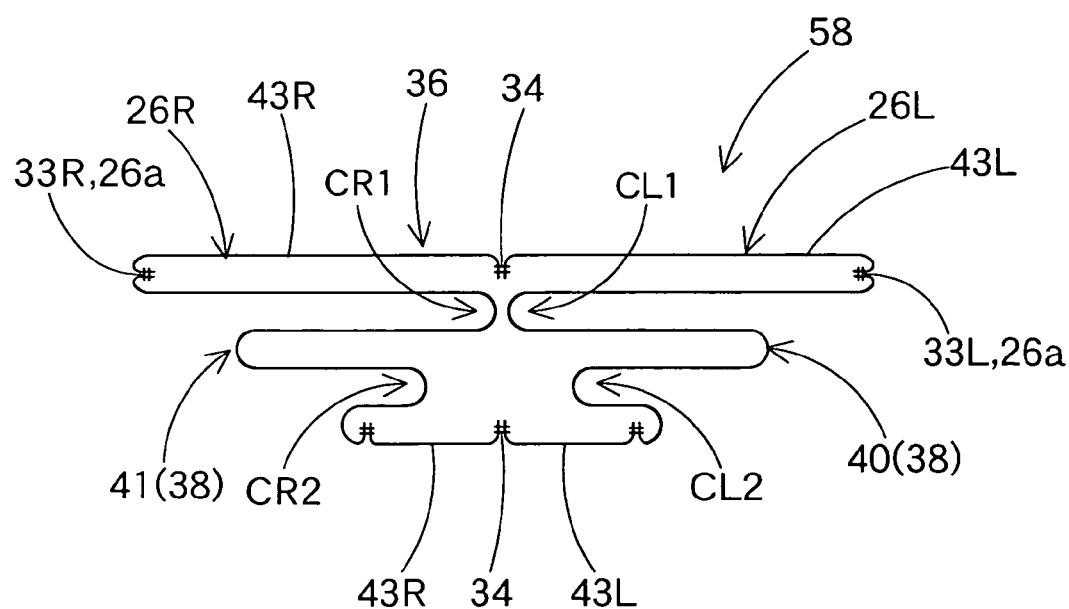
FIG. 11 is an end view taken along line XI-XI of FIG. 8.

More specifically, as shown in FIGS. 8 and 9, in the preparatorily folded airbag 58, the left and right portions 40 and 41 of the outer panel 35 are folded on valley folds CL1, CL2, CR1, and CR2 extending along front-rear direction. At this time, upper portions 43e of the second base cloths 43L and 43R are flatly developed, and this developed portion 59 is arranged such that a transverse center portion 59a in the vicinity of upper end thereof confronts the gas inlet port 19. In the illustrated embodiment, as shown in FIG. 7, supposing that the airbag 15 is flatly developed with the projecting tops 26a of the shoulder restraining portions 26L and 26R lapped in transverse direction, the folds CL1 and CL2 are formed to run generally in parallel to a section of an opening plane of the gas inlet port 19 taken along front-rear direction, through a rearmost point 34a of the sewn portion 34, i.e., a point in the sewn portion 34 most distant from the opening plane of the inlet port 19 in a direction perpendicular to the opening plane of the inlet port 19. As shown in FIGS. 8 to 10, the folds CL1 and CR1 are so disposed proximate to each other as to confront the gas inlet port 19. That is, the valley folds CL1 and CR1 of the preparatorily folded airbag 58 are formed below the developed portion 59, as shown in FIG. 10, in the left and right portions 40 and 41 of the first base cloth 38, respectively, to run generally in parallel to the opening plane of the gas inlet port 19 in a section of the inlet port 19 taken along front-rear direction, so that the developed portion 59 is generally parallel to the opening plane of the inlet port 19. As shown in FIGS. 10 and 11, there is a greater distance between the folds CL2 and CR2 than that between the folds CL1 and CR1, and the folds CL2 and CR2 are more elongated in generally front-rear direction than the folds CL1 and CR1. The folds CL2 and CR2 are located proximate to the inlet port 19. The folds CL1 and CR1, and the folds CL2 and CR2 are generally laterally symmetric with respect to the inlet port 19.

As shown in FIGS. 8 and 9, portions in the vicinity of lower end 58b of the preparatorily folded airbag 58 are folded in on folds CHL and CHR extending along generally transverse direction. The folds CHL and CHR are also generally laterally symmetric with respect to the inlet port 19. In the preparatorily folded airbag 58, moreover, in a supposed airbag 15 flatly developed with the projecting tops 26a of the shoulder restraining portions 26L and 26R lapped in transverse direction, as shown in FIG. 7, a portion 59a of the developed portion 59 located in a side of the gas inlet port 19 with respect to the rearmost point 34a in the sewn portion 34, and in a higher level than the rearmost point 34a is arranged to confront the inlet port 19. The preparatorily folded airbag 58 has a generally laterally symmetric shape with respect to the inlet port 19.

Referring to FIG. 2, the preparatory folding is conducted by holding a front end vicinity portion 16aa in transverse center of the upper side wall 16a, and a portion 16ba in a center in front-rear and left-right directions of the lower side wall 16b, of the airbag body 16, and pulling and separating the held portions 16aa and 16ba in front-rear direction so as to provide the folds CL2 and CR2, while holding rear end vicinity portions 26d in the projecting tops 26a of the shoulder restraining portions 26L and 26R and opening the shoulder restraining portions 26L and 26R left and rightwards of the sewn portion 34 in a flattening manner so as to provide the folds CL1 and CR1, and then by folding in lower end portions on the folds CHL and CHR. The held portions 16aa and 16ba define front and rear ends 58a and 58b of the preparatorily folded airbag 58, respectively.

Figure 12A:
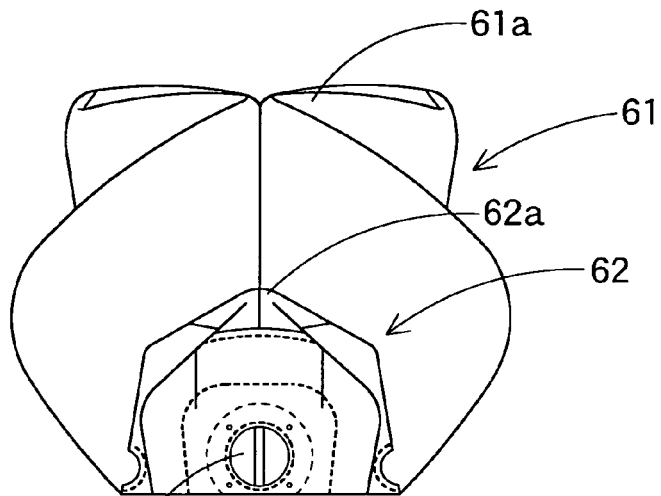
FIGS. 12A to 12C and 13A to 13C illustrate folding process of the airbag of FIG. 2 after the preparatory folding step.
Figure 12B:
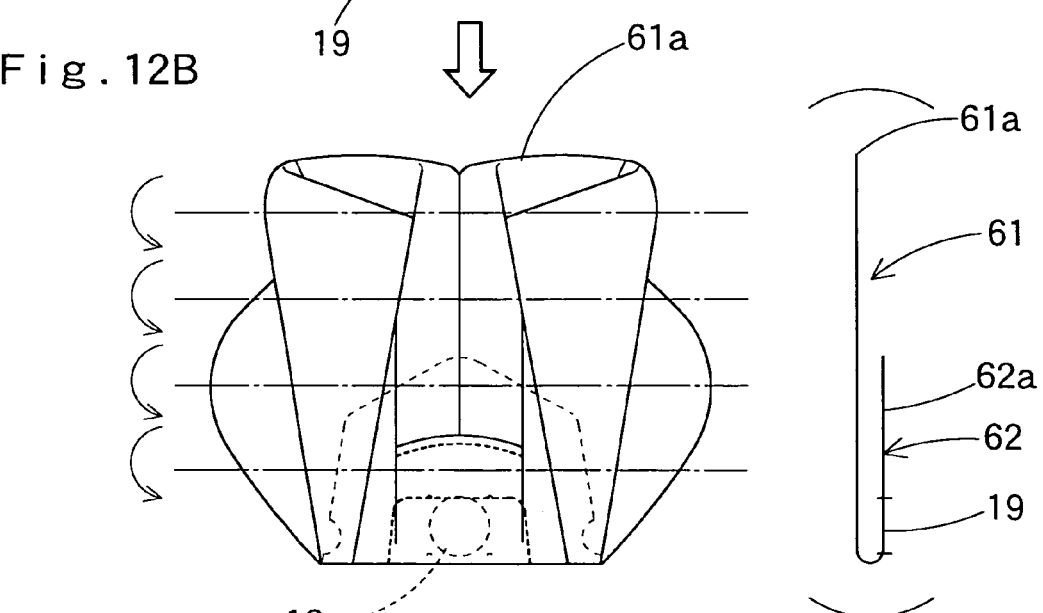
Figure 12C:
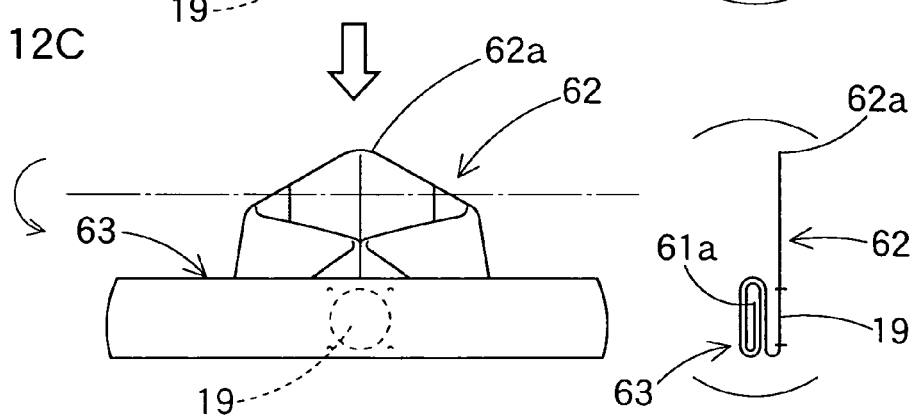
Figure 13A:
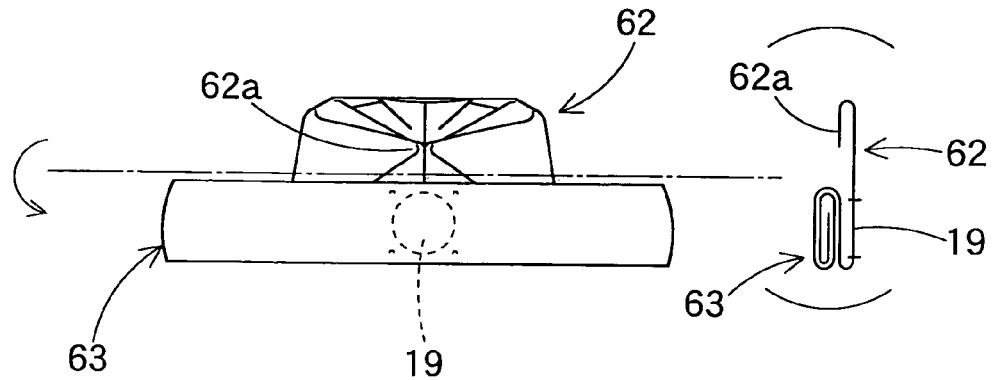
Figure 13B:
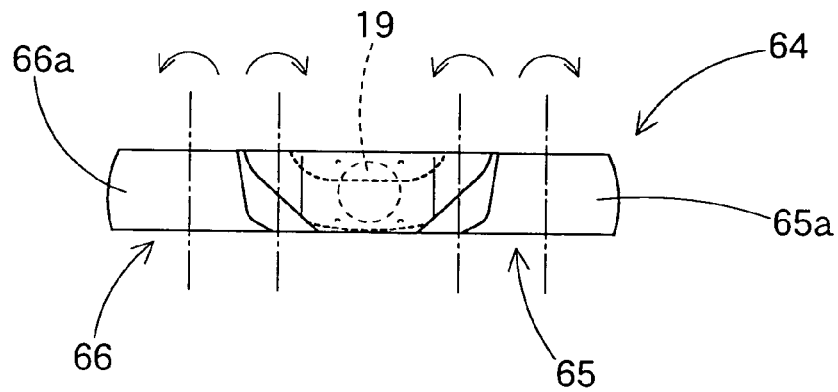

Subsequently, as shown in FIGS. 12A, 12B, 12C, 13A and 13B, the transverse folding is applied to the preparatorily folded airbag 58. More specifically, front and rear portions 61 and 62 of the inlet port 19 in the preparatorily folded airbag 58 are folded on folds extending along left-right direction such that ends 61*a* and 62*a* are brought closer to the inlet port 19. In the illustrated embodiment, the rear portion 61 is rolled toward the lower side wall 16*b* from the rear end 61*a*, and is placed on a back side of the inlet port 19, as shown in FIGS. 12B and 12C. The front portion 62 is rolled toward the rear wall 16*e* from the front end 62*a*, and is placed over a rolled portion 63 of the rear portion 61, as shown in FIGS. 12C, 13A and 13B.

Figure 13C:
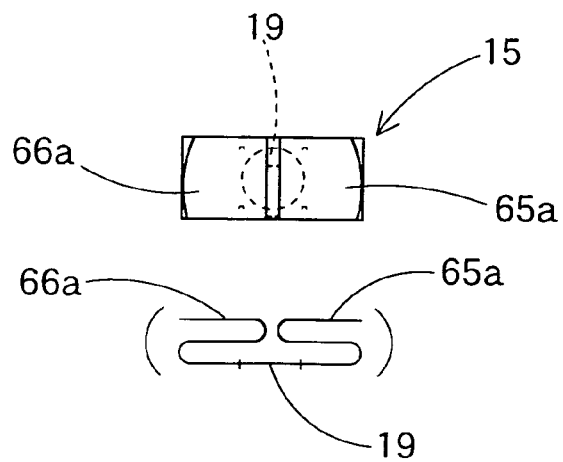

Then the vertical folding is applied, as shown in FIGS. 13B and 13C. A left portion 65 and right portion 66 of the inlet port 19 in the transversely-folded airbag 64 are folded on folds extending along front-rear direction such that ends 65*a* and 66*a* are brought close to the inlet port 19. In the illustrated embodiment, the left and right portions 65 and 66 are bellows-folded so that the ends 65*a* and 66*a* are brought close to the inlet port 19 and placed on a back side of the inlet port 19.

When the folding of the airbag 15 is completed by the vertical folding, the folded-up airbag 15 is wrapped by a breakable wrapping sheet 14 (refer to FIG. 1) to keep the folded-up configuration. Then the folded-up airbag 15 is placed on the bottom wall 6*a* of the case 6 by putting the bolts 11*a* of the retainer 11 through the bottom wall 6*a*. Subsequently, the body 8*a* of the inflator 8 is set in the case 6 from lower side of the bottom wall 6*a*, while the bolts 11*a* protruded downward from the bottom wall 6*a* are inserted through the flange 8*c* of the inflator 8. Thereafter, by fastening the bolts 11*a* protruded from the flange 8*c* of the inflator 8 into nuts 12, the folded-up airbag 15 and the inflator 8 are attached to the bottom wall 6*a* of the case 6.

Then if the side wall 6*b* of the case 6 is retained by the joint wall 10*c* of the airbag cover 10 in the dashboard 1 having been mounted on vehicle, and the unillustrated brackets of the case 6 are fixed to predetermined portions of vehicle body, the airbag device M1 for front passenger's seat is mounted on vehicle.

Figure 14:
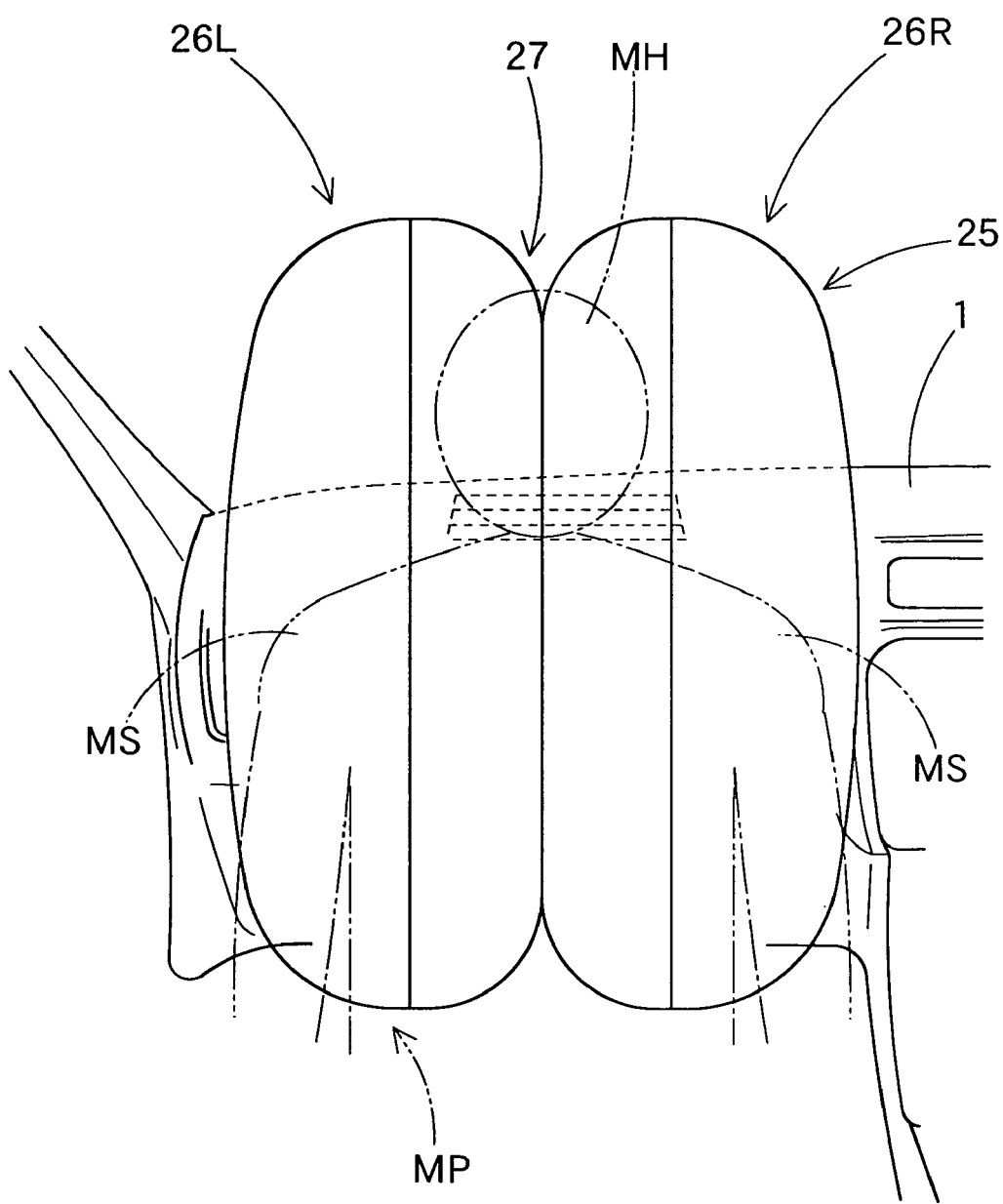
FIG. 14 illustrates the airbag of FIG. 2 in service as viewed from rearward of vehicle, the airbag being completely inflated.

After mounting the airbag device M1 on vehicle, when inflation gas G is discharged from the gas discharge ports 8*b* of the inflator 8 upon frontal collision of vehicle, the airbag body 16 inflates. The airbag body 16 breaks the wrapping sheet 14, and further pushes and opens the doors 10*a* and 10*b* of the airbag cover 10, as indicated by double-dotted lines in FIG. 1. Then the airbag body 16 protrudes upward from an opening provided by the opening of the doors 10*a* and 10*b* of the airbag cover 10, and deploys rearward of vehicle in such a manner as to occupy a space between the dashboard top face 2 and the windshield 4, as indicated by double-dotted lines in FIG. 1 and as shown in FIGS. 14 to 16. Thus the airbag body 16 completes inflation.

In the airbag 15 for front passenger's seat according to the first embodiment of the present invention, the protection portion 25 includes, in a portion ranging from upper side to rear side in a completely inflated condition, the shoulder restraining portions 26L and 26R that are disposed side by side in generally left-right direction and continuously project upward and then rearward. That is, the protection portion 25 inflates in such a shape as is recessed in a transverse center thereof or between the shoulder restraining portions 26L and 26R. With this construction, when the inflated airbag 15 is thrown against a passenger MP, the left and right shoulder restraining portions 26L and 26R projecting rearward firstly bump against the vicinities of left and right shoulders MS of the passenger MP, as shown in FIGS. 15 and 16, so that forward kinetic energy of the passenger MP is reduced. Thereafter, a head MH of the passenger MP whose shoulders MS are restrained by the shoulder restraining portions 26L and 26R enters into the recess 27 provided between the shoulder restraining portions 26L and 26R, and then is restrained and suppressed from moving forward. Accordingly, the airbag 15 is capable of receiving the head MH of the passenger MP by suppressing reaction force from the airbag 15, in a condition that kinetic energy is reduced by the shoulder restraining portions 26L and 26R.

Therefore, the airbag 15 of the first embodiment is capable of, when completely inflated and thrown against the head MH of the passenger MP, protecting the head MH properly by suppressing reaction force, thereby attaining the first object of the present invention.

In the meantime, in the airbag 15, since each of the shoulder restraining portions 26L and 26R is arranged from upper side to rear side of the inflated airbag body 16 in a continuously projecting manner, the recess 27 provided between the shoulder restraining portions 26L and 26R is also arranged continuously from upper end of the protection portion 25 generally vertically. Accordingly, even if a position of the head MH of the passenger MP varies in vertical orientation according to a build or sitting posture of the passenger MP, the airbag 15 receives the head MH softly while suppressing reaction force.

In the airbag 15, the sewn portion 34 sewing up the inner edges 43*a* of the second base cloths 43L and 43R, which constitute the inner panel 36, is arranged generally all over the circumference of the airbag body 16 in generally vertical direction, and in a generally transverse center of the airbag body 16 as inflated. Since the inner edge 43*a* of the second base cloth 43L/43R defining the sewn portion 34 has a shorter length than the outer edge 43*d* of the second base cloth 43L/43R, the sewn portion 34 is positioned inward of an outline, or the rear wall 16*e*, of the airbag body 16 as viewed from side, as shown in FIG. 4. Accordingly, the whole base cloths of the airbag body 16 is regulated in developing direction by the sewn portion 34 when developed and inflated, so that the rear wall 16*e* to be deployed toward passenger is prevented from protruding toward passenger upon airbag inflation, and a shape of the completely inflated airbag body 16 is regulated. As a result, the airbag body 16 no longer needs a tether or the like which would pull the rear wall 16*e* forward i.e., in a direction opposite to passenger and regulate the shape of the airbag body 16 as completely inflated, so that number of parts of the airbag 15 is reduced.

Moreover, the airbag 15 of the first embodiment includes the flow regulating cloth 29 having a generally cylindrical shape. The flow regulating cloth 29 is located inside the airbag body 16, and is arranged to cover the gas inlet port 19 from upper side. Since the flow regulating cloth 29 is so opened at front and rear ends so as to redirect inflation gas G flown in via the inlet port 19 forward and rearward, the inflation gas G flown in via the inlet port 19 is supplied into the airbag body 16 from front and rear openings 30A and 30B of the flow regulating cloth 29 along front-rear direction, upon airbag inflation, as shown in FIGS. 4 and 16. That is, in the airbag 15, inflation gas G flows into the airbag body 16 along front-rear direction, i.e., along the dashboard top face 2, so that a lower part of the airbag body 16, especially rear lower part of the airbag body 16 is developed along the dashboard 1. As a result, the airbag 15 is prevented from unnecessarily protruding toward the passenger MP.

In the airbag 15 of the first embodiment, moreover, the flow regulating cloth 29 includes the through holes 31 adapted to release inflation gas supplied from the inlet port 19. A total of opening areas of the through holes 31 is smaller than an opening area of the front/rear opening 30A/30B. The through holes 31 are located in two positions forming a lateral symmetry in the flow regulating cloth 29. When the airbag 15 inflates, accordingly, the through holes 31 help stabilize orientation of the front and rear openings 30A and 30B, and further stabilize direction of the inflation gas G flowing into the airbag body 16, by releasing a small portion of the inflation gas G therefrom. As a result, the shoulder restraining portions 26L and 26R are supplied with inflation gas properly and generally equally, so that left and right portions of the airbag 15 are developed and inflated equally in further stable manner. Although the flow regulating cloth 29 of the airbag 15 includes two through holes 31 located in symmetric positions with respect to the gas inlet port 19, the cloth 29 may include only one through hole provided that the hole forms a lateral symmetry. For example, the through hole may be located in one position in the vicinity of transverse center of the flow regulating cloth. It will also be appreciated that the flow regulating cloth includes three or more through holes forming lateral symmetry as a whole, provided that a total of opening areas of the through holes is smaller than an opening area of the front or rear opening, and thereby an outflow of inflation gas from the front or rear opening is not hindered.

In the preparatory folding of the airbag 15, portions defining left and right sides of the outer panel 35, i.e., the left and right portions 40 and 41 of the first base cloth 38, are folded on folds CL1, CL2, CR1, and CR2 extending along front-rear direction in a generally laterally symmetric manner, and the sewn portion 34, as inner joint, provided in the inner edges 43a of the left and right second base cloths 43L and 43R is arranged generally along front-rear direction to confront the gas inlet port 19. Inner sides of the flatly developed left and right shoulder restraining portions 26L and 26R up to the projecting tops 26a, i.e., the upper portions 43e of the second base cloths 43L and 43R, are located in left and right sides of the sewn portion 34. That is, in the preparatorily folded airbag 15, in the developed portion 59, into which the upper portions 43e of the second base cloths 43L and 43R are flatly developed while having the sewn portion 43 interposed therebetween, the sewn portion 34 is arranged to confront the inlet port 19.

Accordingly, when the airbag 15 unfolds from preparatorily folded state upon deployment, a portion around the sewn portion 34 confronting the inlet port 19, i.e., the portion 59a of the developed portion 59, swiftly shifts toward the passenger MP, and the left and right shoulder restraining portions 26L and 26R inflate thereafter in a well-balanced manner. That is, since the portion 59a and its vicinity swiftly shifts toward the passenger MP, even if the shoulder restraining portions 26L and 26R are still not inflated enough, the developed portion 59 being the inner sides of the shoulder restraining portions 26L and 26R up to the projecting tops 26a moves toward the passenger MP, while securing a generally vertical, wide and flat plane that is integral in left-right direction including the sewn portion 34. Accordingly, even if a passenger seated proximate to the dashboard advances toward the airbag 15, the airbag 15 does not unnecessarily apply a partial pressure to the passenger. Especially, since the airbag 15 of the first embodiment is preparatorily folded such that the developed portion 59 is arranged generally in parallel to an opening plane of the gas inlet port 19, when the airbag 15 is unfolded from the preparatory folding, the whole developed portion 59 advances toward the passenger MP in a generally even manner because of the inflation gas flown in via the inlet port 19. Therefore, the passenger MP is even more unlikely to receive partial pressure from the airbag 15. Although the flow regulating cloth 29 is interposed between the developed portion 59 and the inlet port 19, in the airbag 15, the inflation gas intensely pushes the developed portion 59 rearward of vehicle together with the flow regulating cloth 29, in the initial stage of airbag inflation, so that the developed portion 59 is pushed toward the passenger MP.

The airbag 15 includes the shoulder restraining portions 26L and 26R in left and right parts thereof that project rearward upon airbag inflation. The shoulder restraining portions 26L and 26R inflate in a well-balanced manner after the portion 59a confronting the inlet port 19 moves toward a passenger, so that a stable deployment is secured from airbag to airbag, with no anxiety of unbalanced inflation.

In the airbag 15 of the first embodiment, supposing that the airbag 15 is flatly developed with the projecting tops 26a of the shoulder restraining portions 26L and 26R lapped in transverse direction, the portion 59a confronting the inlet port 19 is positioned in a side of the gas inlet port 19 with respect to the rearmost point 34a (the folds CL1 and CR1) in the sewn portion 34, by the preparatory folding. However, it is enough that the confronting portion is arranged along the sewn portion 34, and therefore, position of the confronting portion may be varied according to a type of vehicle on which the airbag 15 is mounted, or according to output of the inflator 8 for supplying the airbag 15 with inflation gas.

In the airbag 15, the opening area S1 of the communication port 22, as communication portion which is located proximate to the gas inlet port 19 and communicates the left and right shoulder restraining portions 26L and 26R in left-right direction, is predetermined 1/5 or greater (generally 1/2, in the foregoing embodiment) of the projected area S2 of a side view of the whole airbag 15 as completely inflated, in a section of the completely inflated airbag 15 taken along front-rear direction generally at the center of the gas inlet port 19. Accordingly, inflation gas smoothly passes through the communication port 22, and prevents one of the shoulder restraining portions 26 from inflating more than the other, so that the left and right shoulder restraining portions 26L and 26R inflate generally evenly. If the opening area S1 of the communication port 22 is less than 1/5 of the projected area S2 of the whole airbag 15, it is likely that only one of the shoulder restraining portions 26 inflates more than the other upon airbag inflation.

In the first embodiment of the present invention, therefore, the airbag 15 protects an approaching passenger properly by inflating the shoulder restraining portions 26L and 26R or the two projecting portions constituting the protection portion 25 evenly, so that the second object of the present invention is attained.

Moreover, the opening area S1 of the communication port 22, which also constitutes the recess 27, is predetermined 1/5 or greater (generally 1/2, in the foregoing embodiment) of the projected area S2 of a side view of the whole airbag 15 as completely inflated. With this great setting of the communication port 22, a portion of the protection portion 25, being a bottom of the recess 27, has a good cushioning property. Even if a head MH of a passenger MP is thrown against the portion of the protection portion 25 in the bottom of the recess 27, therefore, the head MH is protected by the portion of the protection portion 25 properly.

In the airbag 15, the recess 27 is defined by the sewn portion 34, which sews up the inner edges 43a of the second base cloths 43L and 43R constituting the inner wall portions 26c of the shoulder restraining portions 26L and 26R. Accordingly, the recess 27 provided between the left and right shoulder restraining portions 26L and 26R can be deeper or shallower by changing the length of the sewn portion 34 (to paraphrase, length of the inner edges 43a of the second base cloths 43L and 43R, or a generally inner diameter of the inner edges 43a). At the same time, an opening area of the communication port 22 communicating the left and right shoulder restraining portions 26L and 26R can be changed by changing the length of the sewn portion 34, too. That is, in the airbag 15, a shape of the recess 27 is easily changed without changing an outer contour of the airbag body 16.

Although the outer panel 35 in the airbag 15 is formed by a single piece of cloth, or the first base cloth 38, having such a shape as the left portion 40 defining the left side wall 16c and the right portion 41 defining the right side wall 16d are joined together in left-right direction, the shape of the outer panel should not be limited thereby. The outer panel may be constructed of a pair of two base cloths split up into a left portion and a right portion. In addition, although the airbag body 16 is manufactured by sewing work of the base cloths 38, 43L and 43R, connecting means of the edges of the base cloths should not be limited thereby, but adhesive or the like may be used to connect edges of the base cloths.

Furthermore, in the airbag 15, each of the vent holes 23 in the left/right side wall 16c/16d is located in a position within an area of the communication port 22 in a side view of the completely inflated airbag body 16. With this construction, the left and right shoulder restraining portions 26L and 26R inflate and develop generally evenly. If the vent hole 23 is located out of the area of the communication port 22 in a side view of the completely inflated airbag body 16, it is likely that an even inflated condition of the both shoulder restraining portions is not maintained because of decrease of internal pressure in either one of the shoulder restraining portions.

Figure 21:
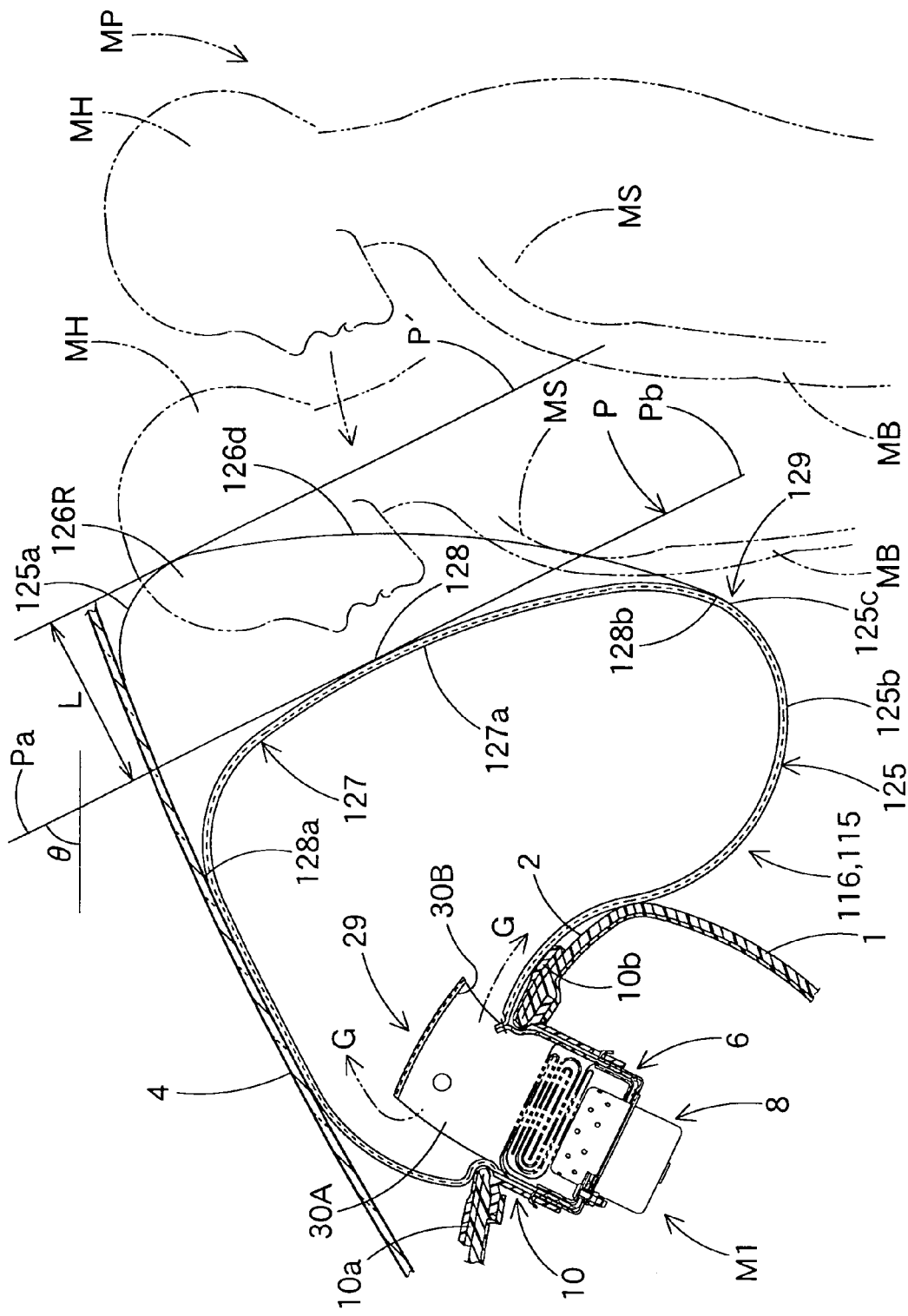
FIGS. 21 and 22 schematically illustrate the airbag of FIG. 17 in service as viewed from side of vehicle, the airbag being completely inflated.
Figure 22:
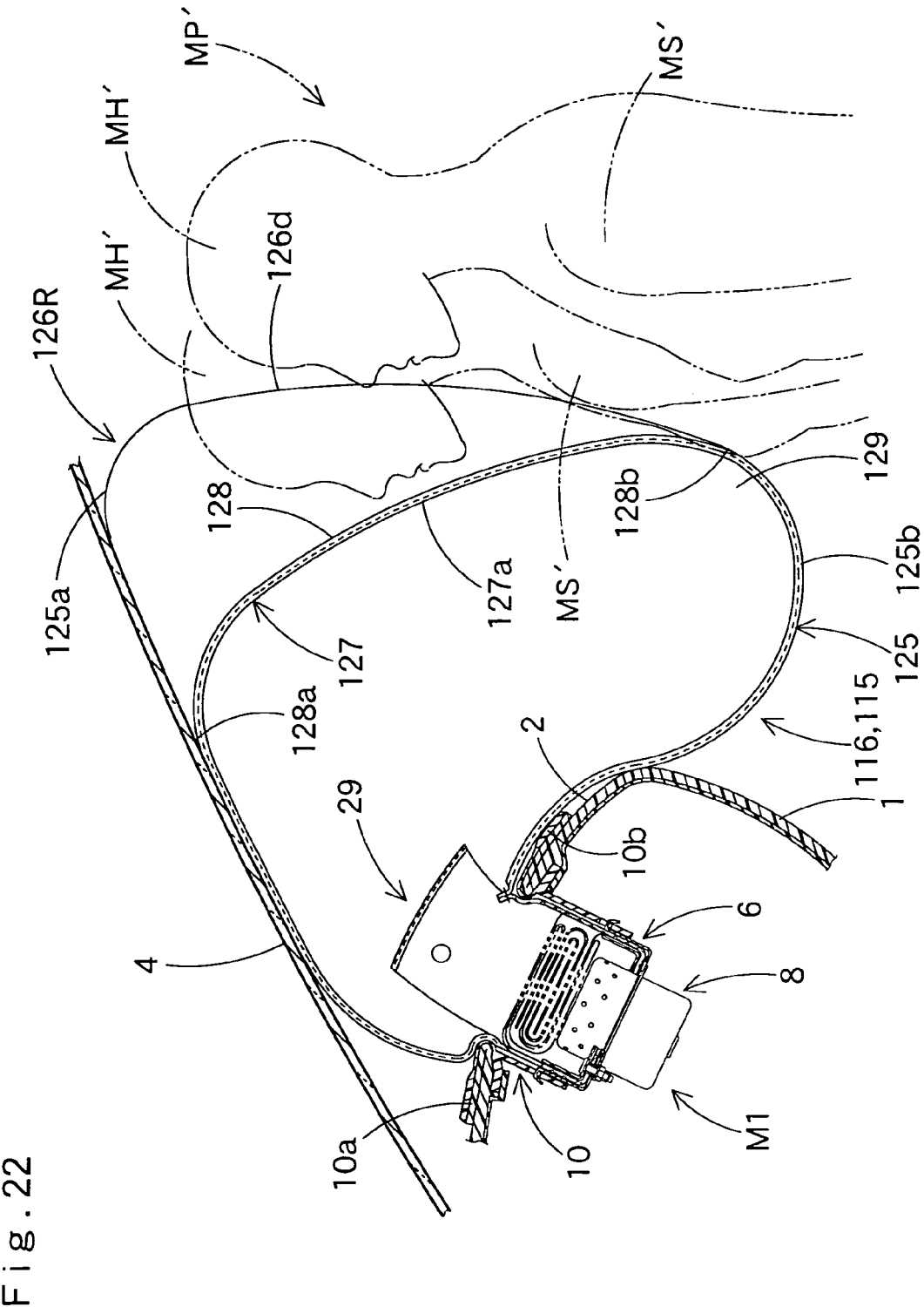

A second embodiment of the present invention is now described, by which the first object of the present invention are attainable. As shown in FIGS. 21 and 22, an airbag 115 for front passenger's seat according to the second embodiment is used for an airbag device M1 for front passenger's seat, which is located inside the top face 2 of dashboard 1, as the airbag 15 in the first embodiment. The airbag device M1 for front passenger's seat for which the airbag 115 is used has the same construction as the aforedescribed airbag device M1, and therefore, its description will be omitted by assigning common reference numerals to common members.

The airbag 115 includes an airbag body 116 and a flow regulating cloth 29 disposed inside the airbag body 116. Since the flow regulating cloth 29 has the same construction as the aforedescribed flow regulating cloth 29 of the airbag 15, its description will be omitted by assigning common reference numerals to common parts.

Figure 17:
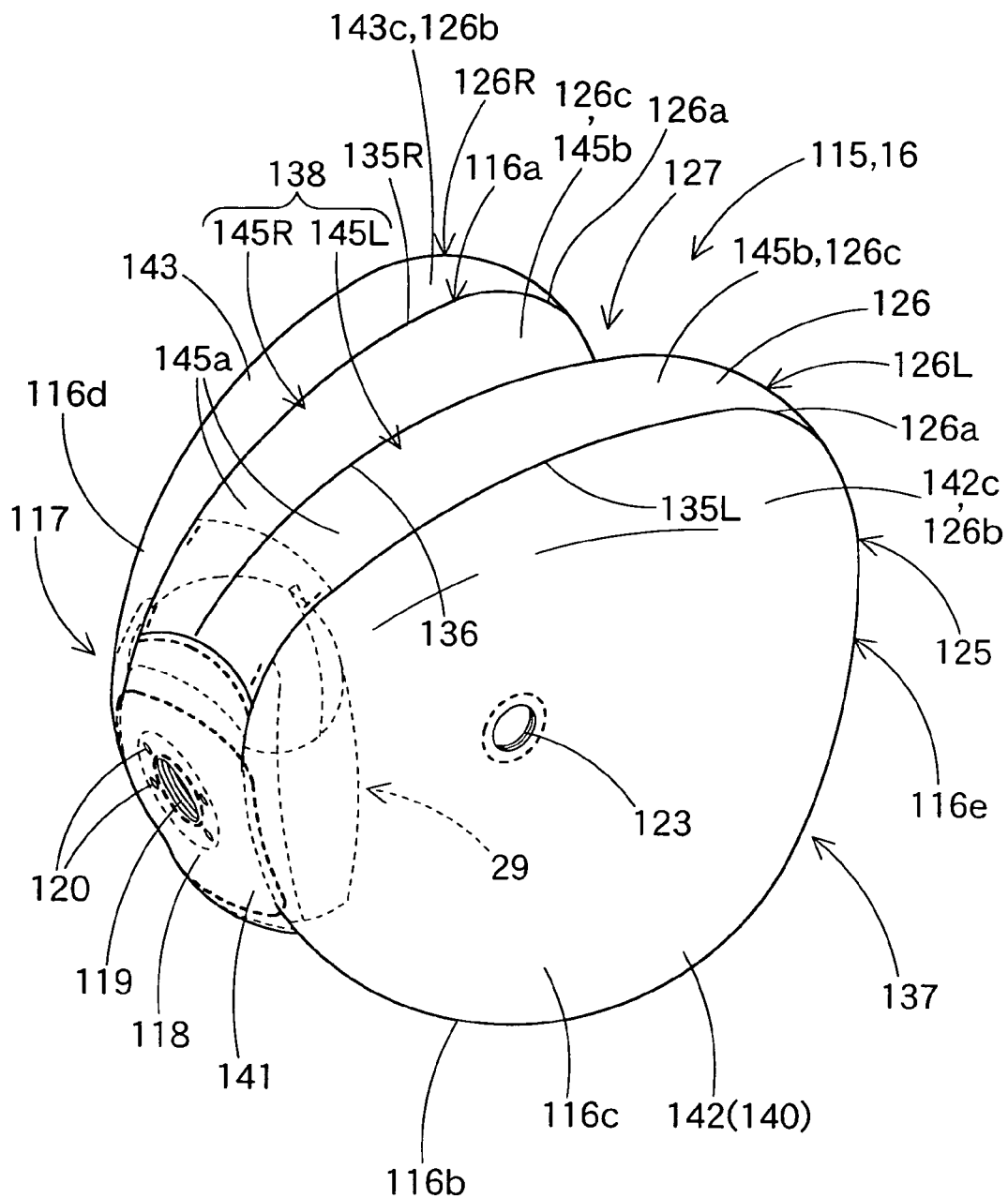
FIG. 17 is a perspective view of an airbag for front passenger's seat according to a second embodiment of the present invention, the airbag being inflated by itself and viewed from forward of vehicle.
Figure 18:
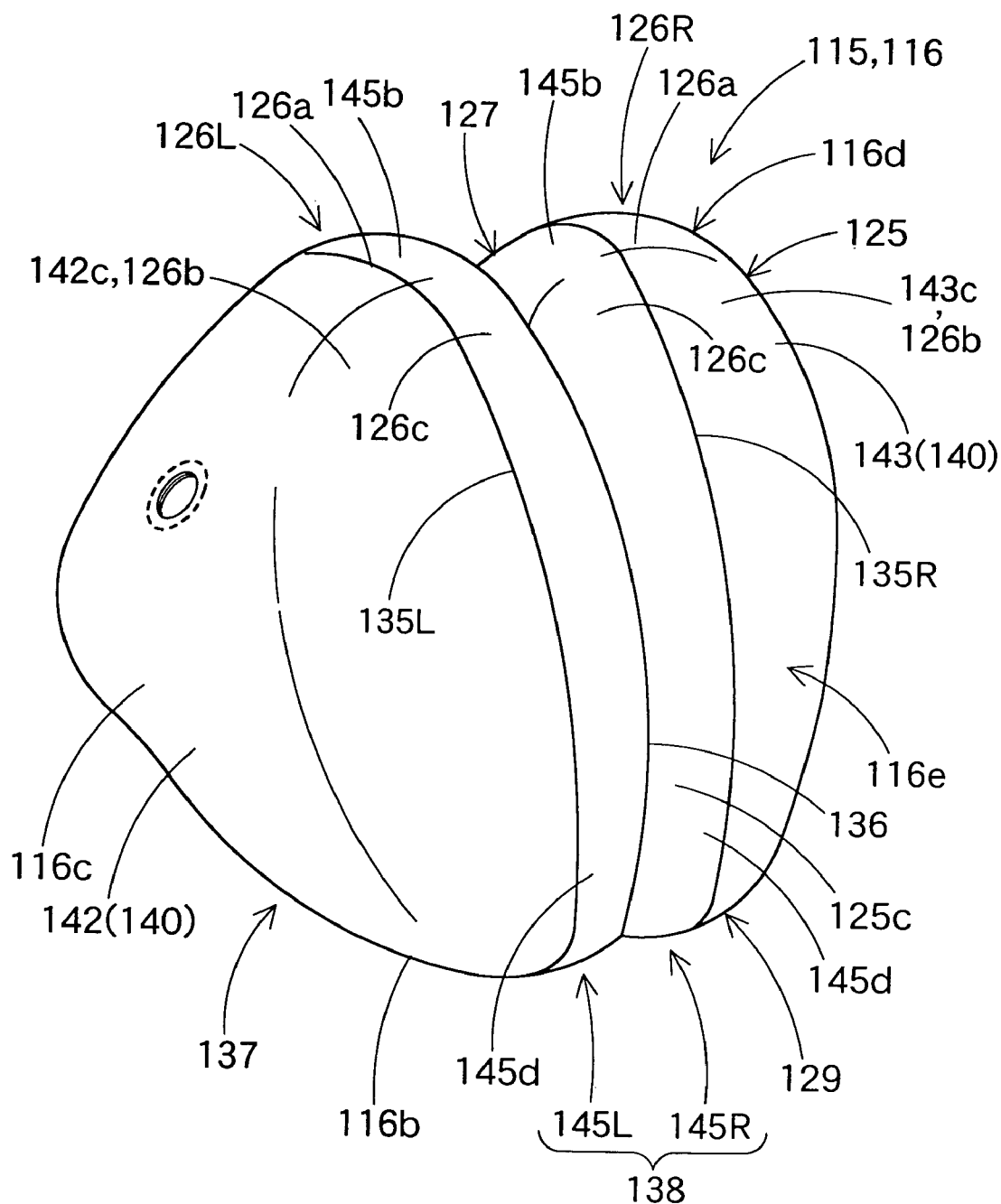
FIG. 18 is a perspective view of the airbag of FIG. 17, as viewed from rearward of vehicle.
Figure 19:
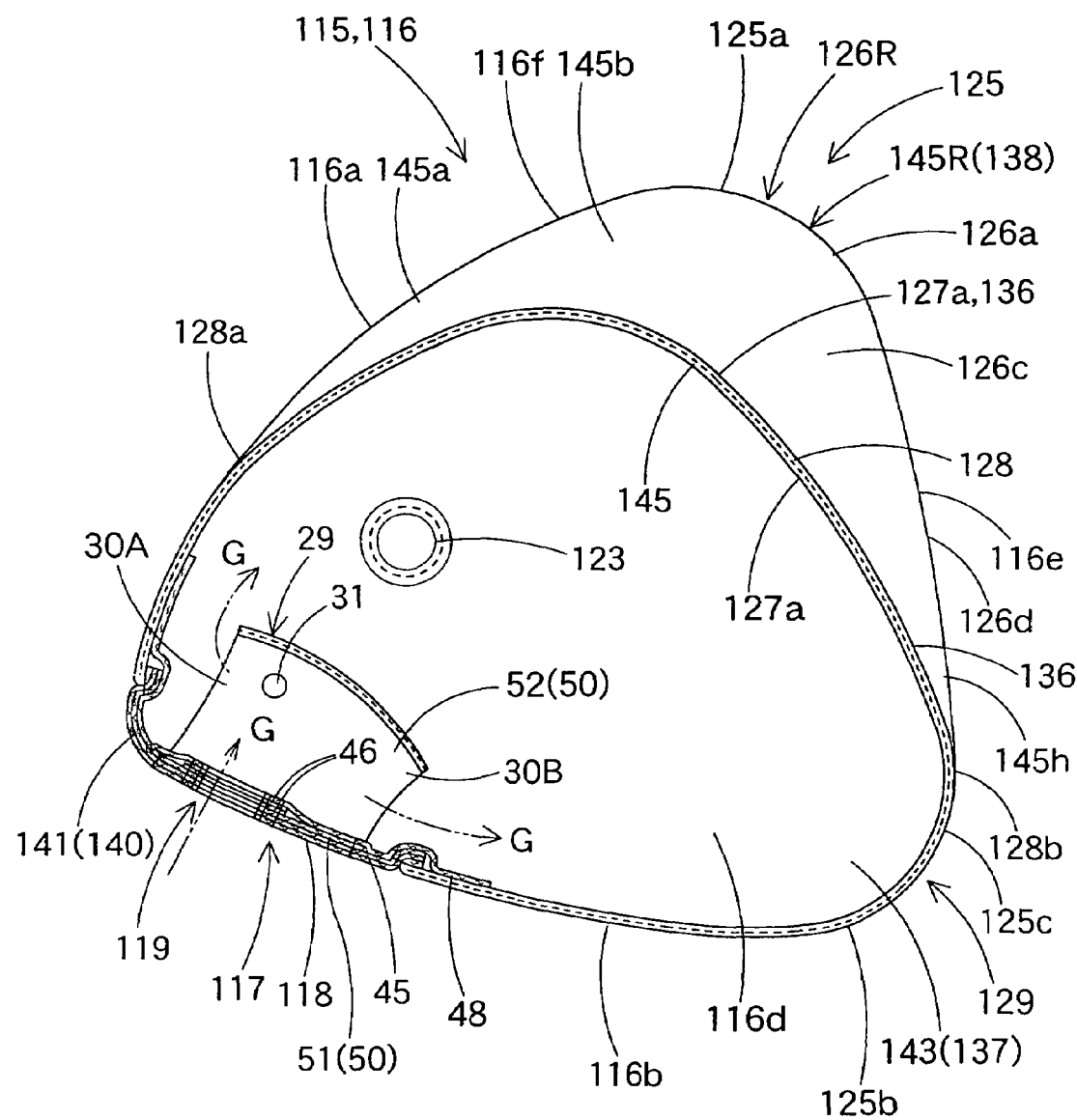
FIG. 19 is a sectional view of the airbag of FIG. 17, taken along front-rear orientation.
Figure 20:
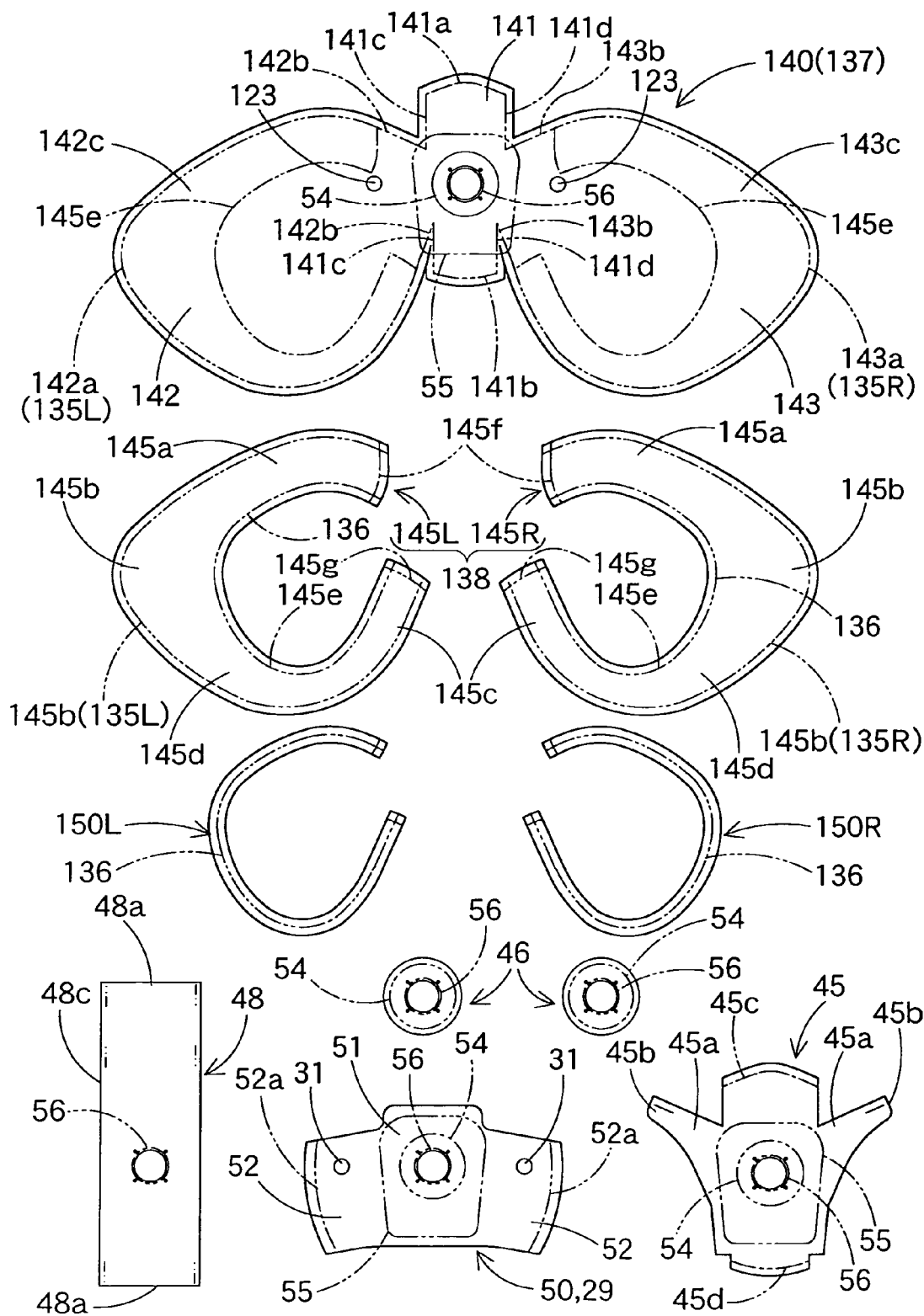
FIG. 20 illustrates constituent parts of the airbag of FIG. 17 by plan views.

Referring to FIGS. 17 to 19, the airbag body 116 is formed into a generally square conical shape when completely inflated by itself, and its top is in a front end of the airbag body 116. The airbag body 116 includes an upper side wall 116a and a lower side wall 116b arranged generally along left-right direction in upper and lower sides, a left side wall 116c and a right side wall 116d arranged generally along front-rear direction in left and right sides, and a rear wall 116e arranged generally along left-right direction to confront a passenger, in such a manner as to connect the upper side wall 116a and the lower side wall 116b. The airbag body 116 includes a protection portion 125 to be arranged in a rear side to face toward a passenger upon airbag inflation, and a vehicle body side portion 117 to be arranged between the dashboard 1 and a wind shield 4 and forward of the protection portion 125 upon airbag inflation, as the aforedescribed airbag body 16. The vehicle body side portion 117 includes a round gas inlet port 119 and mounting holes 120, in the vicinity of transverse center of the vehicle body side portion 117 and proximate to a front end of the lower side wall 116b in the airbag body 116 as completely inflated, as the aforedescribed airbag body 16. The airbag body 116 is further provided, in each of the left and right walls 116c and 116d, with a vent hole 123 for exhausting extra inflation gas.

The protection portion 125 includes left and right shoulder restraining portions 126L and 126R that are disposed side by side in left-right direction with a recess 127 located therebetween, and project rearward in such a manner as to extend vertically. The shoulder restraining portions 126L and 126R are adapted to protect shoulders MS of a passenger MP, and its rear plane 126d are arranged generally vertically upon airbag inflation. The recess 127 is located in the vicinity of transverse center of the completely inflated airbag body 116, and is recessed obliquely forward and downward. That is, when the airbag 115 is completely inflated, a rear plane 128 of the recess 127 is directed obliquely upward so as to restrain a head MH of a passenger MP. In the illustrated embodiment, rise of the left and right shoulder restraining portions 126L and 126R, and recess of the recess 127 continue forward from the rear side wall 116e of the airbag body 116, in such a manner as to enter within an area of the upper side wall 116a.

More specifically, in a sectional view taken along front-rear direction at transverse center of the airbag 115 as mounted on vehicle and completely inflated, i.e., in a sectional view taken along front-rear direction at the center of the gas inlet port 119, a tangent line P of the rear plane 128 of the recess 127 is, in its major part except upper and lower ends, slant, having its upper end Pa located forward and lower end Pb located rearward. In the illustrated embodiment, as shown in FIG. 21, the tangent line P is tangent to a generally vertical center of the recess rear plane 128, and a slant angle θ from a horizontal direction is generally 60°.

In the recess rear plane 128 of the airbag 115, a clearance L, as shown in FIG. 21, provided between the tangent line P and a tangent line P' tangent to an upper rear end of the completely inflated airbag body 116 and parallel to the line P is desirably 100 mm or greater (more desirably, 100 mm to 200 mm). If the clearance L is less than 100 mm, a substantial distance between rear planes 126d of the shoulder restraining portions 126L and 126R and the rear plane 128 of the recess 127, in a condition that the airbag 115 is completely inflated, is too small. Under this condition, it is hard to obtain a desirable behavior of the airbag 115 that the shoulder restraining portions 126L and 126R restrain shoulders MS of a passenger MP firstly, and then the recess rear plane 128 restrains a head MH, so that the head MH may not be restrained softly. In the illustrated embodiment, the clearance L between the tangent lines P and P' is 150 mm.

In addition, in a sectional view of the airbag 115 mounted on vehicle and completely inflated taken along front-rear direction at the center of the gas inlet port 119 in a condition, an upper end part and lower end part of the rear plane 128 of the recess 127 are constructed in such a manner as to branch off from an outline 116f of the airbag body 116. In the illustrated embodiment, an upper end side branching point 128a in the recess rear plane 128 is positioned in a lower level than an upper end 125a of the protection portion 125, and in a side of the wind shield 4 with respect to the upper end 125a. A lower end side branching point 128b is positioned in a higher level than a lower end 125b of the protection portion 125, and in a side of a passenger MP with respect to the lower end 125b.

That is, the recess 127 is located in a part of the airbag 115 except a lower end 125b vicinity of the protection portion 125, so that a rear plane 125c of the lower end 125b vicinity is generally flush with the rear planes 126d of the shoulder restraining portions 126L and 126R. This lower end 125b vicinity portion of the protection portion 125 defines an abdomen restraining portion 129 for restraining an abdomen MB of a passenger MP. When mounted on vehicle and inflated, the airbag 115 is pressed down by the wind shield 4 on the top face. Accordingly, as shown in FIGS. 19 and 21, when the airbag inflates by itself, the upper end side branching point 128*a* of the recess rear plane 128 is located forward than when the airbag 115 is mounted on vehicle.

As the aforedescribed airbag body 16, the airbag body 116 is formed by joining edges of predetermined shaped base cloths. The airbag body 116 includes an outer panel 137 constituting the left and right side walls 116*c* and 116*d*, and a front part of the lower side wall 116*b*, and an inner panel 138 constituting the upper and rear side walls 116*a* and 116*e*, and a rear part of the lower side wall 116*b*. In the illustrated embodiment, the airbag body 116 is formed of a first base cloth 140 and a pair of second base cloths 145L and 145R having the same shapes. The first base cloth 140 constitutes the outer panel 137, while the second base cloths 145L and 145R constitute the inner panel 138. The first base cloth 140 and the second base cloths 145L and 145R of the airbag body 116 have generally the same shapes as the first base cloth 38 and the second base cloths 43L and 43R of the aforedescribed airbag body 16, except shapes of inner edges 145*e* of the second base cloths 145L and 145R.

Referring to FIGS. 17 to 20, the first base cloth 140 has a laterally symmetric shape proximate to a figure of a butterfly spreading its wings. The first base cloth 140 includes a generally rectangular lower part 141 constituting a periphery 118 of the gas inlet port 119 in a vehicle body side portion 117, and left and right portions 142 and 143, each of which having a generally triangular plate shape, arranged in such a manner as to extend left and rightwards from the lower part 141. The lower part 141 makes a front part of the lower side wall 116*b* of the airbag body 116 as completely inflated, which is the vicinity of the gas inlet port 119. The left and right portions 142 and 143 mainly constitute the left and right side walls 116*c* and 116*d* of the airbag body 116 as completely inflated. Portions in the vicinity of outer edges 142*a* and 143*a* of the left and right portions 142 and 143 constitute left and right ends in the upper, lower and rear side walls 116*a*, 116*b* and 116*e* of the airbag body 116, or portions proximate to transverse ends of later-described sewn portions 135L and 135R, and upper rear portions 142*c* and 143*c* of the outer edge 142*a* and 143*a* vicinity constitute outer wall portions 126*b* located toward transverse ends than projected tops 126*a* of the shoulder restraining portions 126L and 126R, respectively, as shown in FIGS. 17 and 18. In the illustrated embodiment, the left and right portions 142 and 143 are symmetric to each other with respect to a line running through the center of the inlet port 119.

Referring to FIGS. 17 to 20, the second base cloths 145L and 145R are arranged in such a manner as to divide an area of the inner panel 138 into two in left-right direction, upon airbag inflation. In the illustrated embodiment, in the airbag body 116 as completely inflated, the second base cloths 145L and 145R constitute the upper and rear side walls 116*a*, 116*e* and a rear part of the lower side wall 116*b*. Each of the second base cloths 145L and 145R has a band shape curved in a generally C-shape with a portion proximate to rear upper part predetermined wider than other part. Rear upper portions 145*b* of the second base cloths 145L and 145R constitute inner wall portions 126*c* that are located toward transverse center than the projected tops 126*a* of the shoulder restraining portions 126L and 126R. Moreover, front upper portions 145*a* of the second base cloths 145L and 145R located forward of the rear upper portions 145*b* constitute the upper side wall 116*a*, while rear lower portions 145*d* located below the rear upper portions 145*b* constitute a lower part of the rear side wall 116*e*, i.e., a lower end part of the protection portion 125, or an abdomen restraining portion 129. Front lower portions 145*c* located forward of the rear lower portions 145*d* constitute a rear part of the lower side wall 116*b*.

In the illustrated embodiment, an outer edge 145*h* of each of the second base cloths 145L and 145R has generally the same shape as the edge 142*a*/143*a* of the left/right portion 142/143 in the first base cloth 140 except a root side portion 142*b*/143*b*. Moreover, inner edges 145*e* formed in inner circumferences of the second base cloths 145L and 145R provide a leading end 127*a* of the recess 127.

The shoulder restraining portions 126L and 126R and the recess 127 in the protection portion 125 are formed by sewing up edges of, the left and right portions 142 and 143 of the first base cloth 140, and the second base cloths 145L and 145R. A sewn portion 135L formed by sewing up the edge 142*a* of the left portion 142 in the first base cloth 140 and the outer edge 145*h* of the second base cloth 145L, and a sewn portion 135R, formed by sewing up the edge 143*a* of the right portion 143 and the outer edge 145*h* of the second base cloth 145R provide, respectively, the projected tops 126*a* of the shoulder restraining portions 126L and 126R. A sewn portion 136 formed by sewing up the inner edges 145*e* of the second base cloths 145L and 145R provides the leading end 127*a* of the recess 127. In the airbag 115, the sewn portion 136 is generally flush with the outline 116*f* of the airbag body 116 as completely inflated, in a portion from the lower end 125*b* vicinity of the protection portion 125, or the abdomen restraining portion 129, to the vicinity of the gas inlet port 119.

The airbag body 116 is provided with reinforcing cloths 45 and 46 for reinforcing the inlet port periphery 118, reinforcing cloths 150L and 150R for reinforcing the sewn portions 136, and a protection cloth 48 for protecting the inlet port periphery 118. Since the reinforcing cloths 45, 46, and the protection cloth 48 have similar constructions to the reinforcing cloths 45, 46, and the protection cloth 48 of the aforedescribed airbag body 16, description of those will be omitted by assigning common reference numerals. Each of the reinforcing cloths 150L and 150R has a shape curved in a generally C-shape corresponding to the inner edge 145*e* of the second base cloth 145L/145R, and is adapted to cover an entire area of the inner edge 145*e* of the second base cloth 145L/145R for reinforcing the sewn portion 136.

The first and second base cloths 140, 145L and 145R, and the reinforcing cloths 150L and 150R are made from flexible woven fabric of polyester, polyamide or the like, as the reinforcing cloths 45, 46 and the protection cloth 48. The woven fabric is not coated by coating agent such as silicone, or the like.

The airbag 115 of the second embodiment is manufactured through similar processes as the aforedescribed airbag 15, i.e., by sewing up the base cloths 140, 145L and 145R, the reinforcing cloths 45, 46, 150L and 150R, the protection cloth 48, and a flow regulating cloth material 50.

In the second embodiment, too, the inner panel 138 is formed of a pair of the second base cloths 145L and 145R having the generally same shape. Moreover, the outer edge 145*h* of each of the second base cloths 145L and 145R has generally the same shape as the edge 142*a*/143*a* of the left/right portion 142/143 in the first base cloth 140 constituting the outer panel 137 except the root side portion 142*b*/143*b*. Accordingly, sewing positions in the edges of the base cloths easily match one another only by lapping the base cloths 140, 145L and 145R one on another, which facilitates sewing work of the airbag 115.

The airbag 115 is then folded up and mounted on vehicle as part of the airbag device M1, as in the airbag 115.

In the airbag 115 of the second embodiment, when the inflated airbag body 116 is thrown against a passenger MP, left and right shoulders MS of the passenger MP, moving forward, bump against the left and right shoulder restraining portions 126L and 126R projecting rearward firstly, so that forward kinetic energy of the passenger MP is reduced. Thereafter, as shown in FIG. 21, a head MH of the passenger MP whose shoulders MS are restrained by the shoulder restraining portions 126L and 126R enters into the recess 127 provided from upper part to rear part of, and between the shoulder restraining portions 126L and 126R, and then is restrained and suppressed from moving forward. When the head MH of the passenger MP bumps against the recess rear plane 128, since the rear plane 128 has such construction as the tangent line P of the rear plane 128 is slant, having its upper end located forward and lower end located rearward, the airbag 115 softly receives the head MH of the passenger MP, while keeping the head MH in slant condition, with the rear plane 128 of the recess 127 which is generally smooth and generally parallel to an upper body of the passenger MP leaning forward. Accordingly, in the airbag 115 for front passenger's seat in the second embodiment, the head MH of the passenger MP is received softly while reaction force from the airbag 115 is suppressed, after the kinetic energy is reduced by the shoulder restraining portions 126L and 126R.

Accordingly, in the second embodiment, too, the airbag 115 for front passenger's seat is capable of, when completely inflated and thrown against the head MH of the passenger MP, protecting the head MH properly while suppressing reaction force, thereby attaining the first object of the present invention.

In the airbag 115 of the second embodiment, moreover, the rear plane 128 of the recess 127 is, in its major part except upper and lower ends, a slant plane having its upper end located forward and lower end located rearward. Accordingly, even if a level of a head MH of a seated passenger MP is changed, the airbag 115 receives the head MH with a slant portion of the recess rear plane 128. As shown in FIG. 22, more specifically, even when a passenger MP' of small build is seated in a front passenger's seat, the airbag 115 receives the head MH' of the passenger MP', which should be located in a lower level compared with a head MH of a passenger MP of large build, with the slant rear plane 128 of the recess 127, in the same manner as receives the head MH of the passenger MP. Accordingly, in the second embodiment, too, the airbag 115 protects the heads MH and MH' of the passenger MP and MP' softly, regardless of physique of passenger.

In the airbag 115, the lower end side branching point 128b of the recess rear plane 128 from the airbag outline 116f is positioned in a higher level than the lower end 125b of the protection portion 125, and in a side of a passenger MP with respect to the lower end 125b, in a sectional view of the airbag 115 mounted on vehicle and completely inflated taken along front-rear direction at the center of the gas inlet port 119. Accordingly, a lower end portion or the abdomen restraining portion 129 in the inflated airbag 115 deployed between the dashboard 1 and a passenger's abdomen MB inflates in a thick manner, so that the abdomen MB is protected by the abdomen restraining portion 129 in a stable manner.

Furthermore, the upper end side branching point 128a of the recess rear plane 128 from the airbag outline 116f is positioned in a lower level than the upper end 125a of the protection portion 125, and in a side of the wind shield 4 with respect to the upper end 125a, in a sectional view of the airbag 115 mounted on vehicle and completely inflated taken along front-rear direction at the center of the gas inlet port 119. That is, when the airbag 115 is completely inflated, the recess 127 is so formed that the rear plane 128 in an upper end part thereof is recessed deeply. In other words, in the airbag 115, a distance between the rear planes 126d of the shoulder restraining portions 126L and 126R and the recess rear plane 128 becomes greater as it goes from lower end to upper end. With this construction, as shown in FIG. 22, when a passenger MP' of small build is seated, a head MH' of the passenger MP' is to be protected by a portion of the rear plane 128 where the distance between the rear planes 126d of the shoulder restraining portions and the recess rear plane 128 is small. However, since a moving distance of the head MH' from shoulders MS' upon collision is small in case of the small build passenger MP', even if the distance between the rear planes 126d of the shoulder restraining portions and the recess rear plane 128 is small, it is prevented that the head MH' bumps against the airbag 115 prior to the shoulders MS'. That is, the head MH' is restrained by the recess rear plane 128 after the shoulders MS' are restrained by the shoulder restraining portions 126L and 126R, so that impact to a neck is reduced, and the head MH' is softly protected. On the contrary, when a large build passenger MP is seated, as shown in FIG. 21, a moving distance of his head MH from shoulders MS upon collision is greater in comparison with the small build passenger MP'. However, with the airbag 115, the head MH of the large build passenger MP is protected by an upward portion of the rear plane 128 than the portion to restrain the head MH' of the small build passenger MP', where the distance between the rear planes 126d of the shoulder restraining portions and the recess rear plane 128 is greater. Accordingly, it is prevented that the head MH bumps against the airbag 115 prior to the shoulders MS. That is, the head MH is restrained by the recess rear plane 128 after the shoulders MS are restrained by the shoulder restraining portions 126L and 126R, as in a case of the small build passenger MP', so that impact to a neck is reduced, and the head MH is softly protected. Consequently, the airbag 115 is capable of protecting the heads MH and MH' in accordance with physique of passenger.

As shown in FIG. 21, the clearance L between the tangent line P tangent to the recess rear plane 128 at generally vertical center of the recess rear plane 128 and the tangent line P' tangent to an upper rear end of the completely inflated airbag body 116 and parallel to the line P is predetermined 100 mm or greater. This construction secures enough distance between the rear planes 126d of the shoulder restraining portions 126L and 126R and the recess rear plane 128 in the completely inflated airbag body 116. Accordingly, the head MH is restrained by the recess rear plane 128 after the shoulders MS are restrained by the shoulder restraining portions 126L and 126R, so that the head MH of the passenger MP is softly protected by the recess rear plane 128.

In the second embodiment, too, the sewn portion 136 sewing up the inner edges 145a of the second base cloths 145L and 145R, which constitute the inner panel 138, is arranged in a generally transverse center of the inflated airbag body 116 generally all over the circumference of the airbag body 116 in generally vertical direction. Accordingly, the whole base cloths of the airbag body 116 is regulated in developing direction by the sewn portion 136 when developed and inflated, so that the rear wall 116e to be deployed toward passenger is prevented from projecting toward passenger upon airbag inflation, and a contour of the completely inflated airbag body 116 is regulated. As a result, the airbag body 116 no longer needs a tether or the like which would pull the rear wall 116e forward i.e., in a direction opposite to passenger and regulate the contour of the airbag body as completely inflated, so that number of parts of the airbag 115 is reduced.

Moreover, the airbag 115 of the second embodiment also includes the flow regulating cloth 29 having a generally cylindrical shape, and located inside the airbag body 116 to cover the gas inlet port 119 from upper side. Since the flow regulating cloth 29 is so opened at front and rear ends so as to redirect inflation gas G flown in via the inlet port 119 forward and rearward, the inflation gas G flown in via the inlet port 119 is supplied into the airbag body 116 from front and rear openings 30A and 30B of the flow regulating cloth 29 along front-rear direction, upon airbag inflation. That is, a lower part of the airbag body 116, especially the abdomen restraining portion 129 located in a rear lower part of the airbag body 116, is developed along the dashboard 1, so that the airbag 115 is prevented from unnecessarily protruding toward a passenger MP.

Furthermore, in the airbag 115, too, the recess 127 provided between the shoulder restraining portions 126L and 126R is defined by the sewn portion 136, which sews up the inner edges 145a of the second base cloths 145L and 145R constituting the inner wall portions 126c of the shoulder restraining portions 126L and 126R. Accordingly, a shape of the recess 127, or a slant angle or the like of the recess rear plane 128, can be changed by changing a shape of the sewn portion 136, or a shape of the inner edges 145a of the second base cloths 145L and 145R.

Although the outer panel 137 of the airbag 115 is formed by a single piece of cloth, or the first base cloth 140, having such a shape as the left portion 142 defining the left side wall 116c and the right portion 143 defining the right side wall 116d are joined together in left-right direction, in the second embodiment, too, the outer panel may be constructed of a pair of two base cloths split up into a left portion and a right portion.

Figure 23:
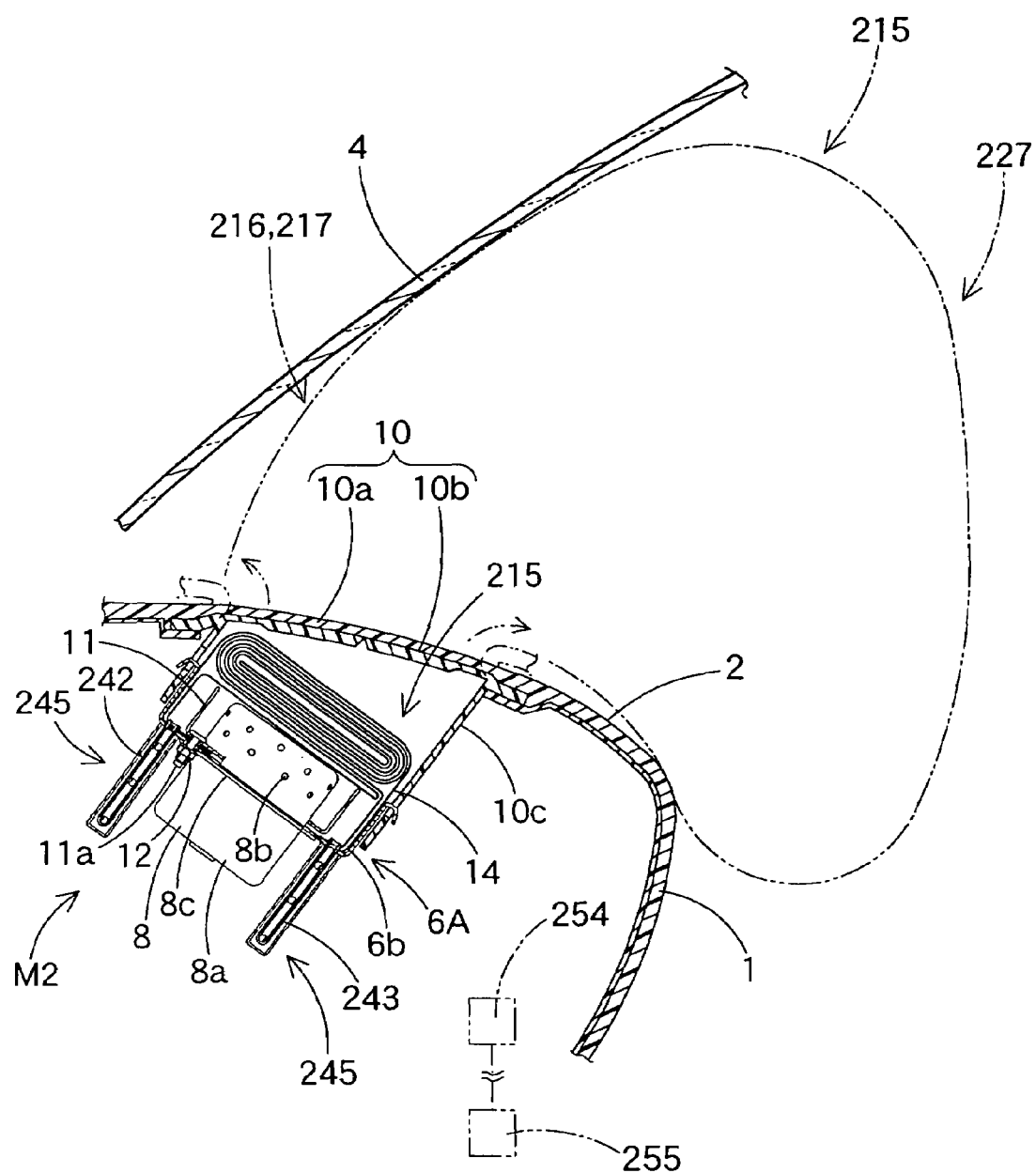
FIG. 23 is a schematic vertical section of an airbag device for front passenger's seat employing an airbag according to a third embodiment of the present invention, taken along front-rear orientation of vehicle.

A third embodiment of the present invention is now described, by which the first object of the present invention are attainable. As shown in FIG. 23, an airbag 215 for front passenger's seat according to the third embodiment is used for an airbag device M2 for front passenger's seat, which is a top-mount type attached to an interior of top face 2 of a dashboard 1.

Figure 24:
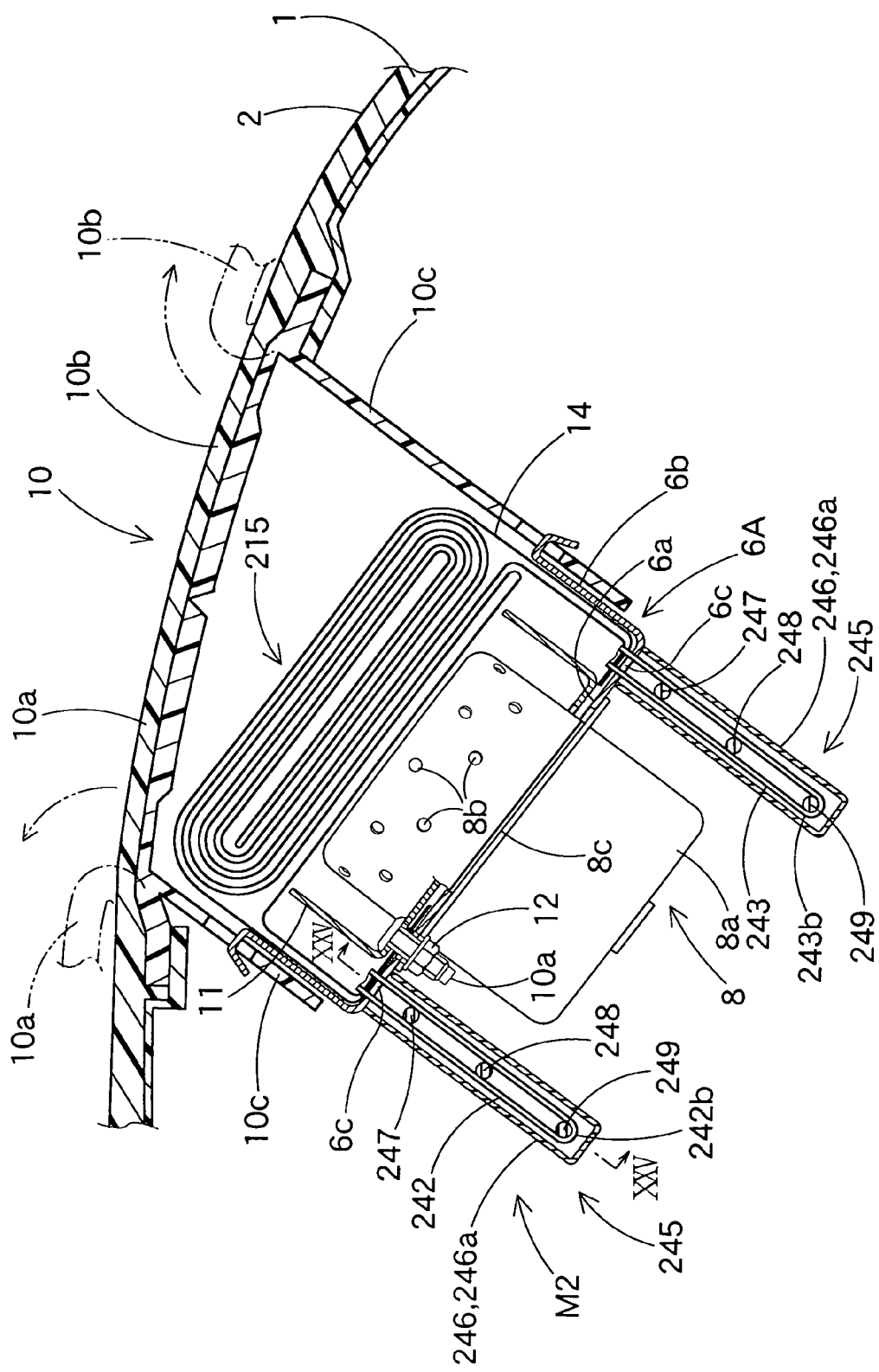
FIG. 24 is an enlarged schematic view of the airbag device of FIG. 23.
Figure 25:
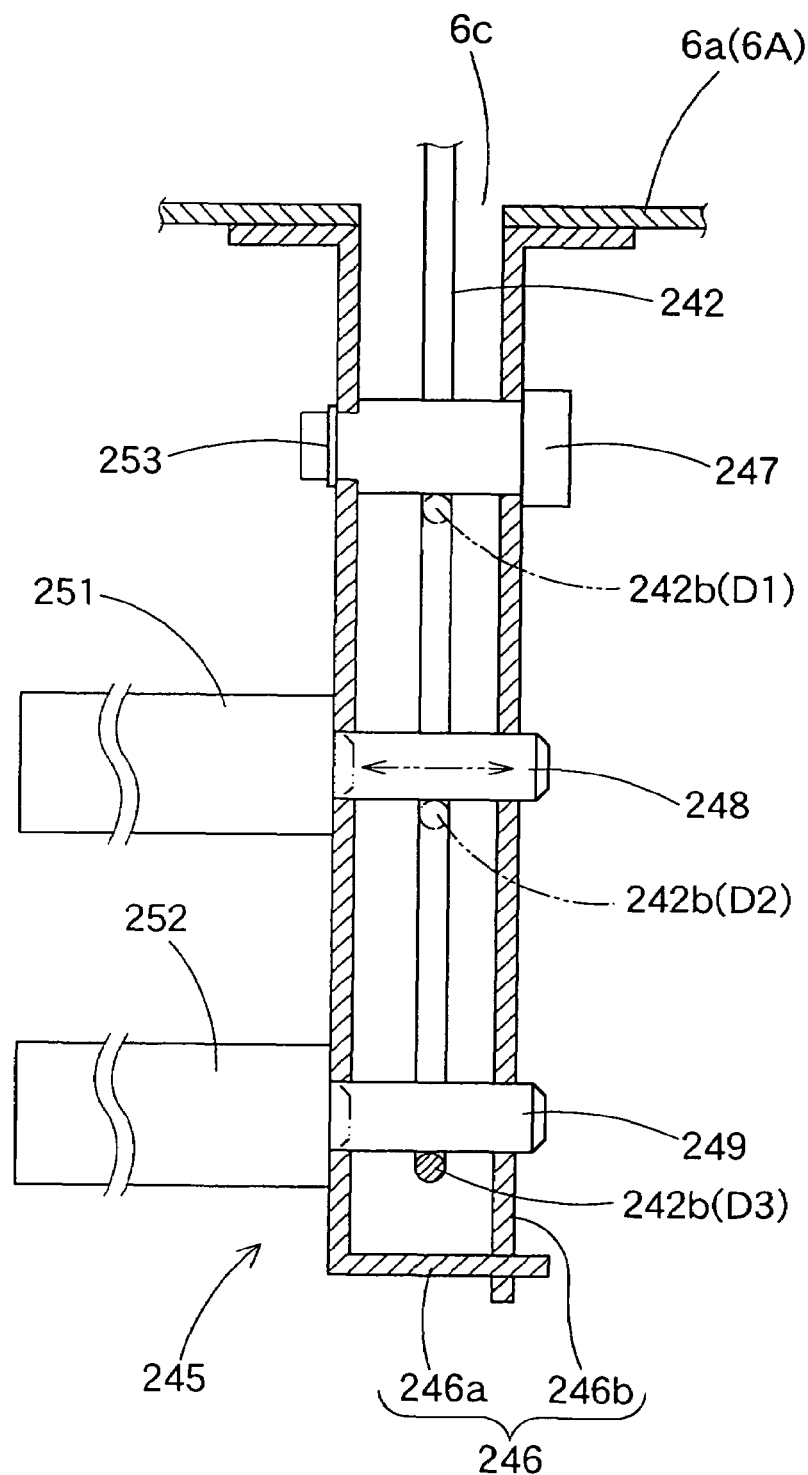
FIG. 25 is a schematic vertical section of a release adjuster employed with the airbag of the third embodiment, taken along XXV-XXV of FIG. 24.

Referring to FIGS. 23 to 25, the airbag device M2 for front passenger's seat includes a folded airbag 215, an inflator 8 for supplying inflation gas to the airbag 215, a case 6A for housing and holding the airbag 215 and the inflator 8, a retainer 11 for attaching the airbag 215 to the case 6A, an airbag cover 10 covering the folded airbag 215, and a release adjuster 245 adapted to adjust lengths of tethers 242 and 243 disposed within the airbag 215. The airbag device M2 has a similar construction to the aforedescribed airbag device M1, except the airbag 215 and release adjuster 245, and therefore, descriptions of the common members will be omitted by assigning common reference numerals. A bottom wall 6a of the case 6A is provided with through holes 6c for inserting the tethers 242 and 243 of the airbag 215 therethrough, other than apertures for inserting a body 8a of the inflator 8 and bolts 11a therethrough.

Figure 26:
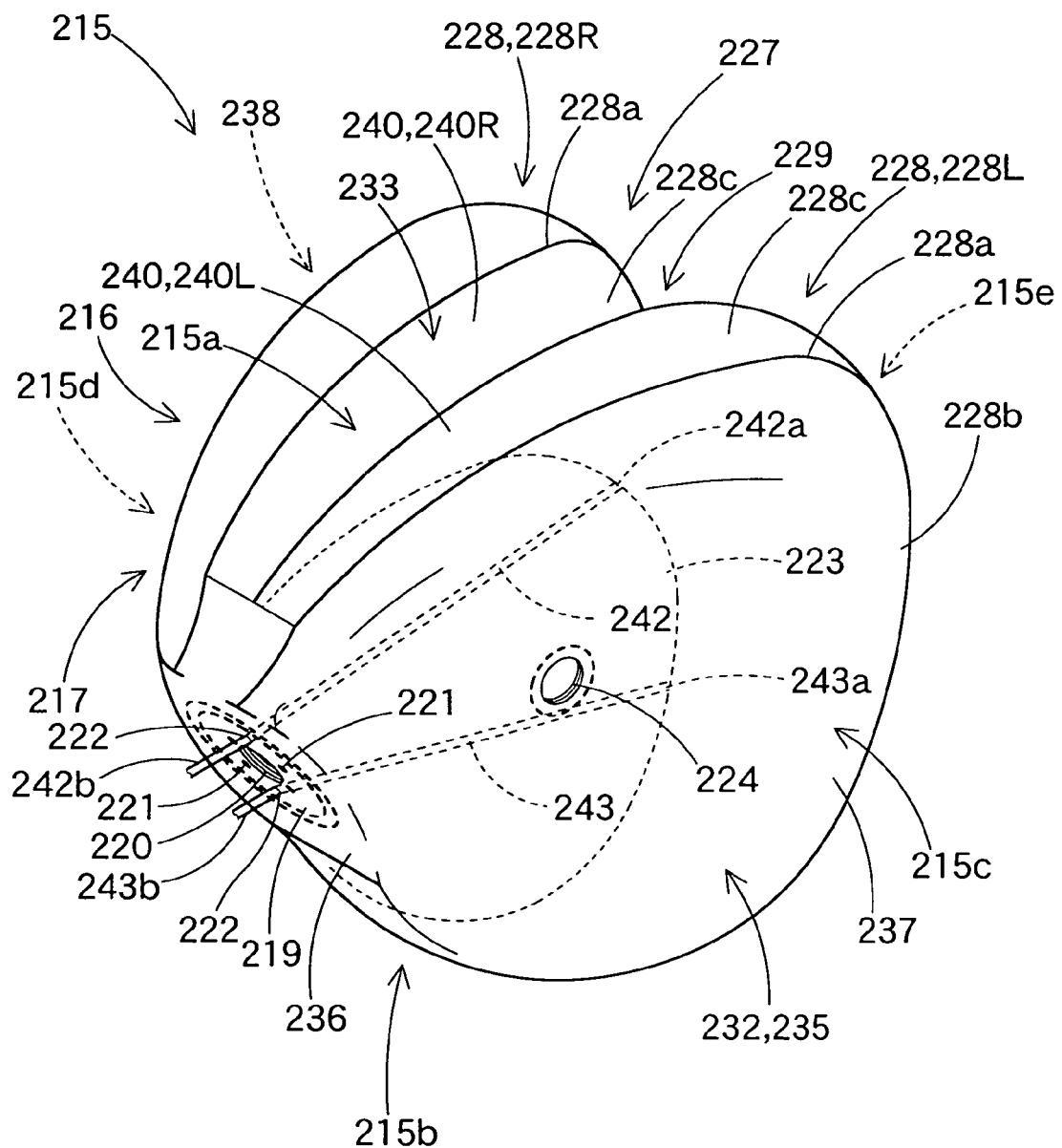
FIG. 26 is a perspective view of the airbag of the third embodiment, as inflated by itself and viewed from forward of vehicle.
Figure 27:
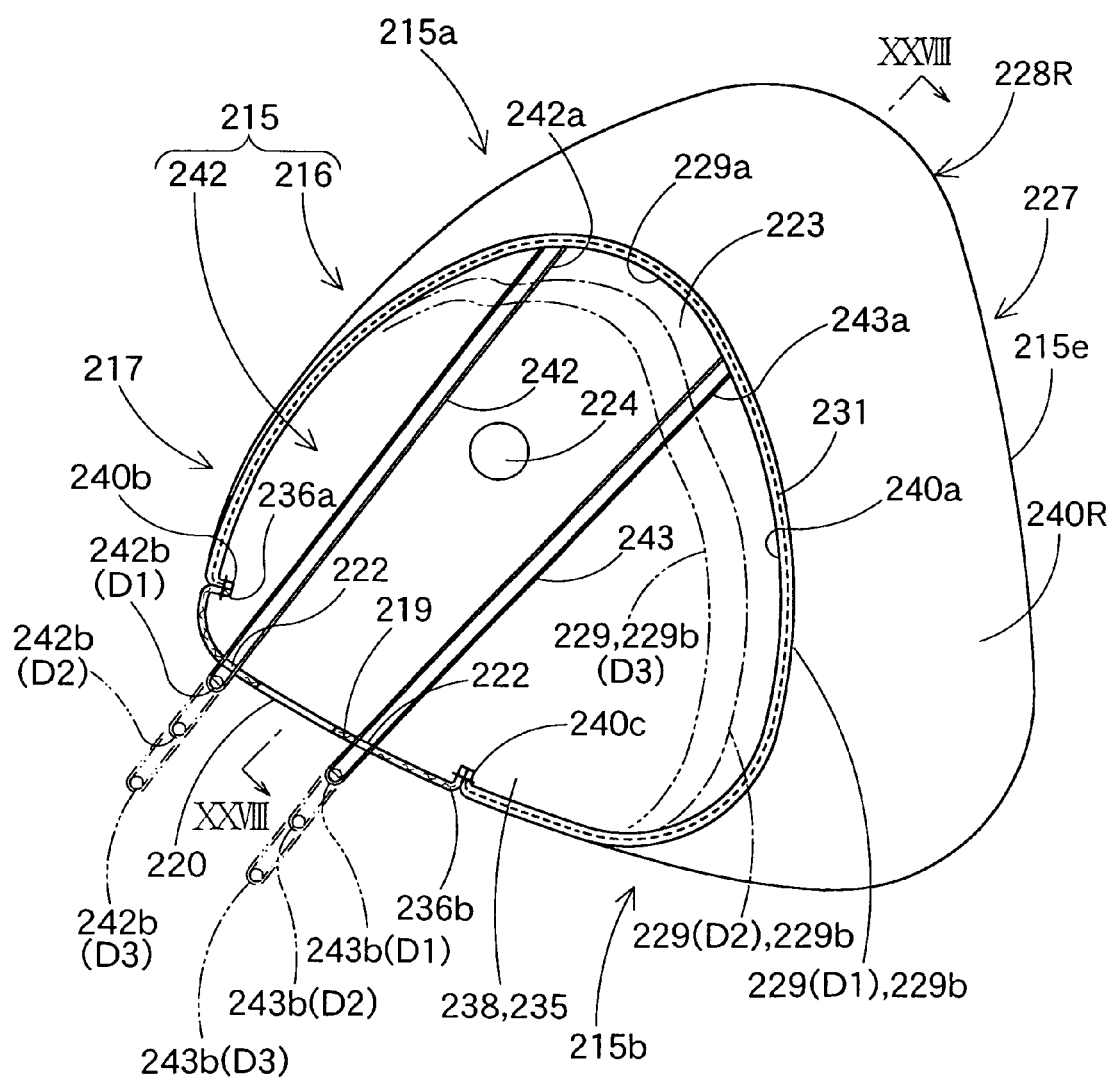
FIG. 27 is a sectional view of the airbag of FIG. 26 taken along front-rear orientation.
Figure 28:
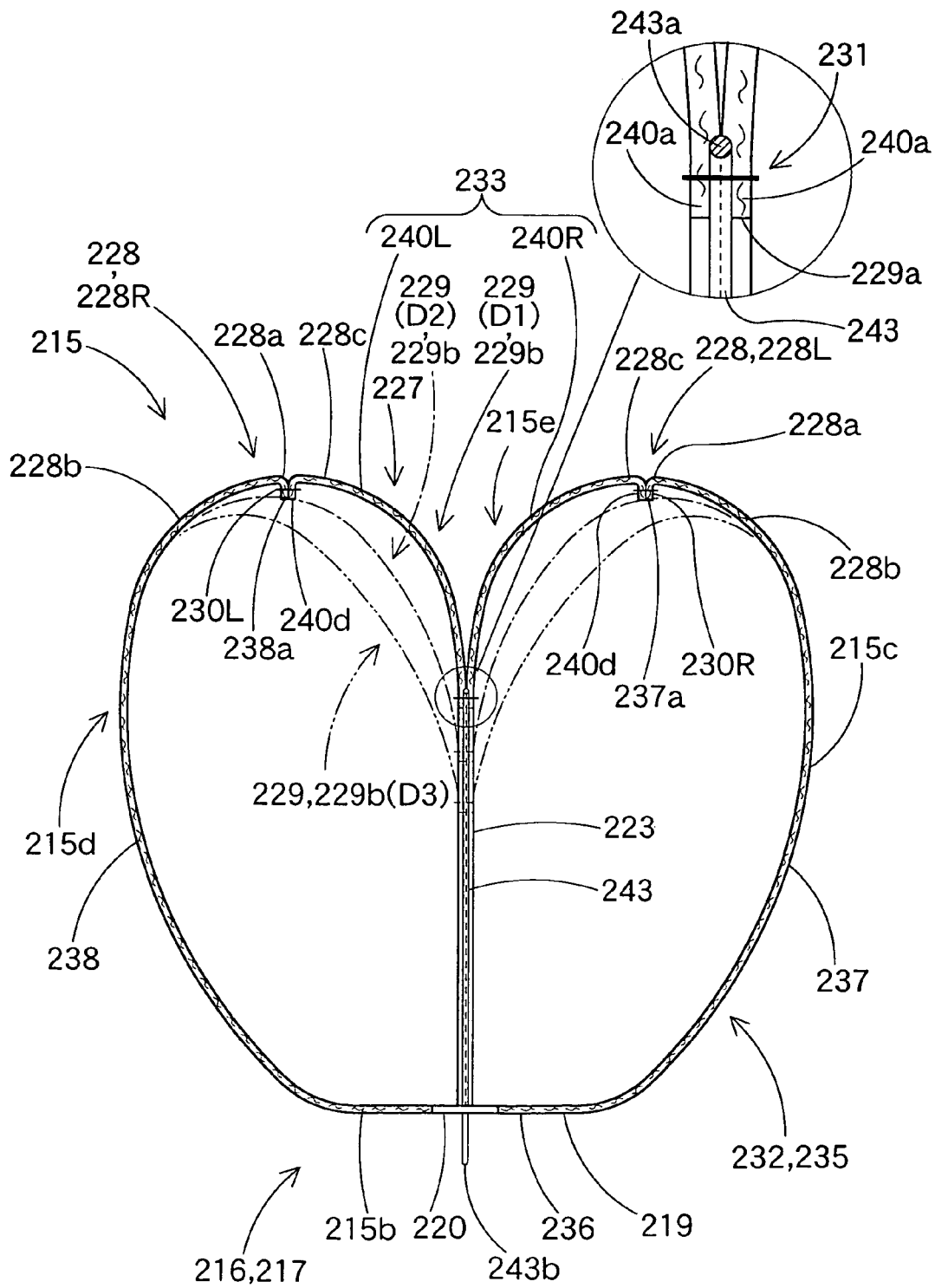
FIG. 28 is a schematic section of the airbag of FIG. 26 taken along XXVIII-XXVIII of FIG. 27.

Referring to FIGS. 26 to 28, the airbag 215 is formed into a generally square conical shape when completely inflated by itself. A front end of the airbag 215 defines a top of the square cone, and a rear side of bottom side constitutes a protection portion 227. The airbag 215 is folded and housed in an interior side of top face 2 of the dashboard 1, when not in service. When fed with inflation gas, the airbag 215 protrudes upward and rearward in such a manner as to occupy a space between the top face 2 of dashboard 1 and a wind shield 4, thereby protecting a passenger by a rear side thereof or the protection portion 227.

The protection portion 227 as inflated includes left and right shoulder restraining portions 228L and 228R for protecting the vicinities of passenger's left and right shoulders. Provided vertically between the shoulder restraining portions 228L and 228R is a center restraining portion 229, which is recessed forward, for protecting a portion of a passenger between shoulders including at least a head.

The airbag 215 includes a generally square conical bag shaped airbag body 216, and a plurality of (two, in the third embodiment) tethers 242 and 243 disposed inside the airbag body 216. A rear side of the airbag body 216 serves as the protection portion 227, and apart located forward of the protection portion 227 serves as a vehicle body side portion 217 to contact the top face 2 of dashboard 1 and the wind shield 4. As in the aforedescribed airbag 15 and airbag 115, the vehicle body side portion 217 includes a gas inlet port 220 and mounting holes 221, in the vicinity of transverse center and proximate to a front end of a lower side thereof. The vehicle body side portion 217 is also provided with through holes 222 for inserting the tethers 242 and 243 therethrough, in the vicinity of transverse center and proximate to the front end of the lower side thereof.

As shown in FIGS. 26 to 29, the airbag body 216 is manufactured by joining outer edges of two kinds of panel portions, i.e., an outer panel 232 and an inner panel 233. The outer panel 232 defines left and right walls 215c and 215d of the generally square conical shape which the airbag 215 is formed into when completely inflated, whereas the inner panel 233 defines an area ranging from an upper wall 215a to a lower wall 215b, via a rear wall 215e, of the generally square conical shape, between the left and right walls 215c and 215d.

Figure 29:
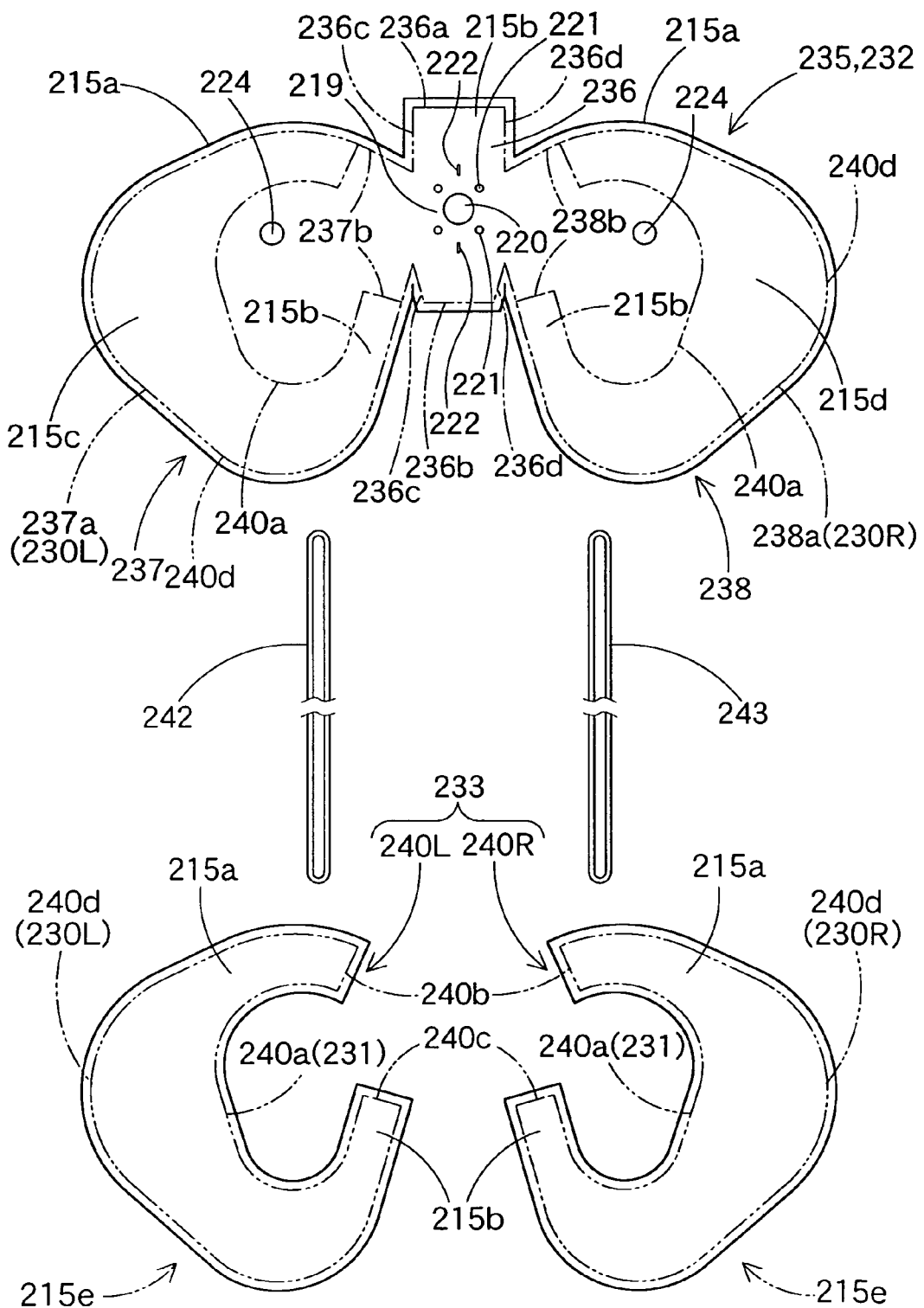
FIG. 29 illustrates constituent parts of the airbag of FIG. 26 by plan views.

Referring to FIG. 29, the airbag body 216 is formed of a first base cloth 235 and a pair of second base cloths 240L and 240R as inner panel base cloth. The first base cloth 235 constitutes the outer panel 232, while the second base cloths 240L and 240R, having the same shapes, constitute the inner panel 233. The first base cloth 235 has a laterally symmetric shape proximate to a figure of a butterfly spreading its wings. The first base cloth 235 includes a generally rectangular lower part 236 constituting a periphery 219 of the gas inlet port 220 in a vehicle body side portion 217, and left and right portions 237 and 238, each of which having a generally triangular plate shape, arranged in such a manner as to extend left and rightwards from the lower part 236. The lower part 236 makes a front part of the lower side wall 215b of the airbag 215 as completely inflated, which is the vicinity of the gas inlet port 220. The left and right portions 237 and 238 mainly constitute the left and right side walls 215c and 215d of the airbag 215 as completely inflated. Portions in the vicinity of outer edges 237a and 238a of the left and right portions 237 and 238 constitute outer wall portions 228b located toward transverse ends than projected tops 228a of the shoulder restraining portions 228L and 228R, respectively. The left and right portions 237 and 238 are symmetric to each other with respect to a line running through the center of the inlet port 220.

The second base cloths 240L and 240R are arranged in such a manner as to divide an area of the inner panel 233 into two in left-right direction, upon airbag inflation. Each of the second base cloths 240L and 240R has a band shape or flat shape curved in a generally C-shape. In the airbag 215 as completely inflated, the second base cloths 240L and 240R constitute the upper side wall 215a, the rear side wall 215e, and a rear part of the lower side wall 215b. The second base cloths 240L and 240R also constitute inner wall portions 228c that are located toward transverse center than the projected tops 228*a* of the shoulder restraining portions 228L and 228R.

An outer edge 240*d* of each of the second base cloths 240L and 240R has generally the same shape as an outer edge (edge portion) 237*a*/238*a* of the left/right portion 237/238 in the first base cloth 235 except a root side portion 237*b*/238*b*. Inner edges 240*a* formed in inner circumferences of the second base cloths 240L and 240R provide a leading end or inner edge 229*a* of the center restraining portion 229, which is most recessed, and also constitute an inner edge of a communication port 223 that communicates the left and right shoulder restraining portions 228L and 228R.

The first and second base cloths 235, 240L and 240R are made from flexible woven fabric of polyester, polyamide or the like. The woven fabric is not coated by coating agent such as silicone, or the like.

The shoulder restraining portions 228L and 228R and the center restraining portion 229 in the protection portion 227 are formed by sewing up edges of, the left and right portions 237 and 238 of the first base cloth 235, and the second base cloths 240L and 240R. More specifically, a sewn portion 230L formed by sewing up the edge 237*a* of the left portion 237 in the first base cloth 235 and the outer edge 240*d* of the second base cloth 240L, and a sewn portion 230R formed by sewing up the edge 238*a* of the right portion 238 and the outer edge 240*d* of the second base cloth 240R provide, respectively, the projected tops 228*a* of the shoulder restraining portions 228L and 228R. The vicinity of a sewn portion 231 formed by sewing up the inner edges 240*a* of the second base cloths 240L and 240R provides the inner edge 229*a* of the center restraining portion 229.

In the airbag body 216, the shoulder restraining portions 228L and 228R are communicated with each other in left-right direction with a communication port 223 defined by the inner edge 229*a* of the center restraining portion 229. The communication port 223 is defined by the sewn portion 231 sewing up the inner edges 240*a* of the second base cloths 240L and 240R, or the inner edge 229*a* of the center restraining portion 229, and the lower part 236 of the first base cloth 235. The communication port 223 ranges from lower side of the protection portion 227 to lower side of the vehicle body side portion 217 in the completely inflated airbag body 216. When the airbag body 216 is completely inflated, an opening plane of the communication port 223 is arranged along front-rear direction in generally transverse center of the airbag body 216.

The airbag body 216 is further provided, in each of the left and right walls 215*c* and 215*d*, with a vent hole 224 for exhausting extra inflation gas.

Each of the tethers 242 and 243 is sewn into the sewn portion 231 at an upper end 242*a*/243*a* thereof, when the inner edges 240*a* of the second base cloths 240L and 240R are sewn up, so that the tethers 242 and 243 are disposed one below another in a vertical inner edge of the center restraining portion 229, in the completely inflated airbag body 216. Lower ends 242*b* and 243*b* of the tethers 242 and 243 extend obliquely downward and forward within the airbag body 216. In the illustrated embodiment, each of the tethers 242 and 243 is made of metal or fabric string member in a loop. The lower ends 242*b* and 243*b* protrude out of the two through holes 222 located front and rear of the gas inlet port 220 in the periphery 219 of the inlet port 220, and protrude downward of the airbag body 216. The lower ends 242*b* and 243*b* are further extracted from the through holes 6*c* of the case 6A, and connected to the release adjuster 245 when the airbag device M2 is mounted on vehicle. The upper ends 242*a* and 243*a* of the tethers 242 and 243 are joined to the vicinity of upper end, and the vicinity of vertical center, respectively, of the center restraining portion 229 in the rear plane 215*e*.

Referring to FIGS. 23 to 25, the release adjuster 245 includes cases 246, and one each first, second and third stopper pin 247, 248 and 249 per each case. Each of the cases 246 is fixed to the case 6A in such a manner as to extend from the through hole 6*c* of the case 6A and confront each other. Each of the pins 247, 248 and 249 is retained by walls 246*a* and 246*b* of each of the cases 246. The first stopper pin 247 located proximate to the case bottom wall 6*a* is fixed to the walls 246*a* and 246*b* at both ends thereof, whereas the second and third stopper pins 248 and 249, which are remote from the case bottom wall 6*a* in this order, are movable cores of electromagnetic solenoids 251 and 252 fixed to the wall 246*a*. The lower ends 242*b* and 243*b* of the loop-shaped tethers 242 and 243 are wound on the third pins 249 while having all the pins 247, 248 and 249 put through the loop.

Each of the electromagnetic solenoids 251 and 252 is controlled by a control device 254 of the airbag device M2. The control device 254 receives electric signals from an unillustrated sensor for detecting frontal collision of vehicle, and a weight sensor 255 mounted on front passenger's seat to detect weight of a passenger seated therein.

Figure 30:
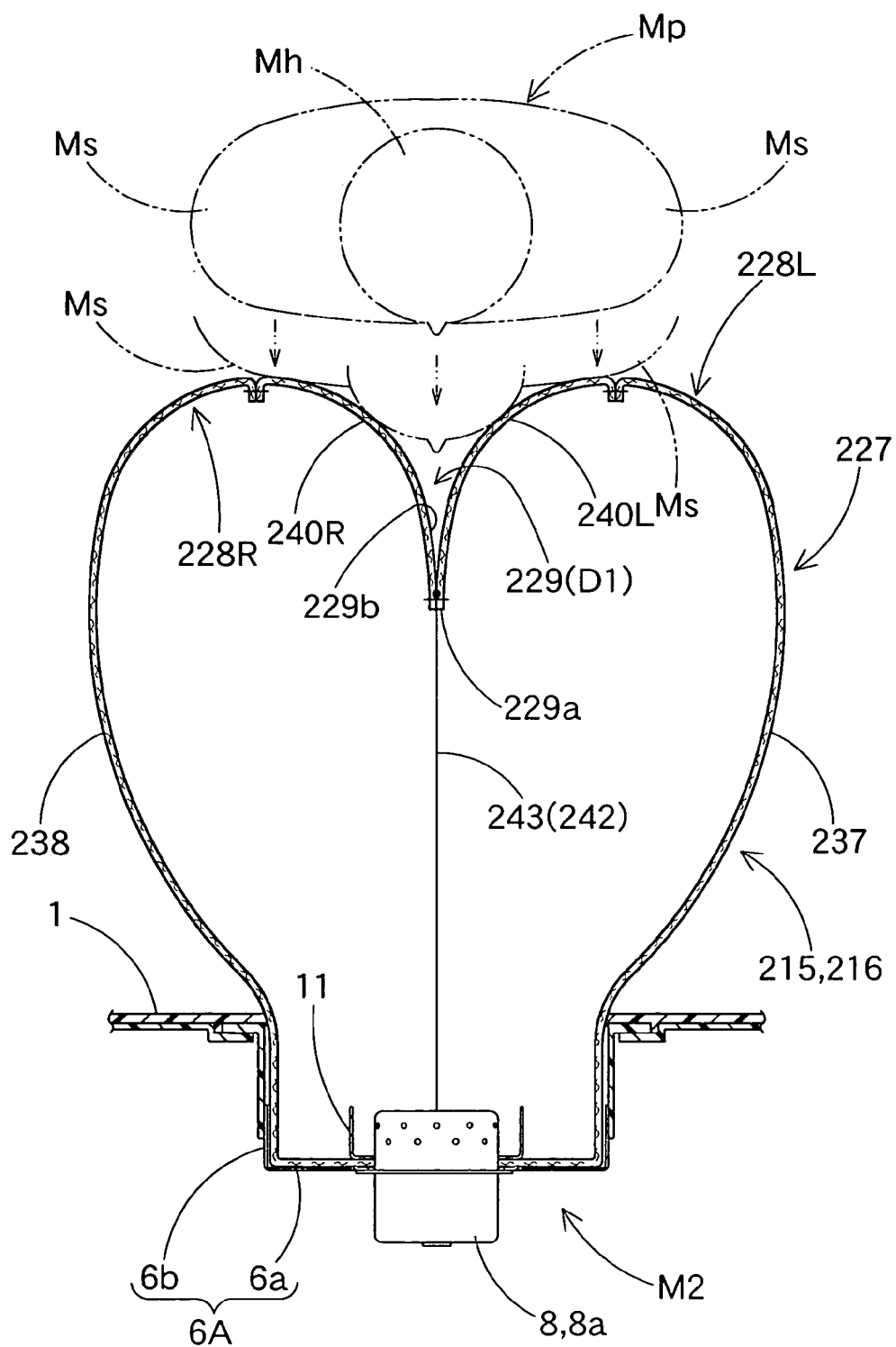
FIG. 30 schematically illustrates the airbag of FIG. 26 in service as viewed from upper side of vehicle, the airbag being completely inflated.
Figure 31:
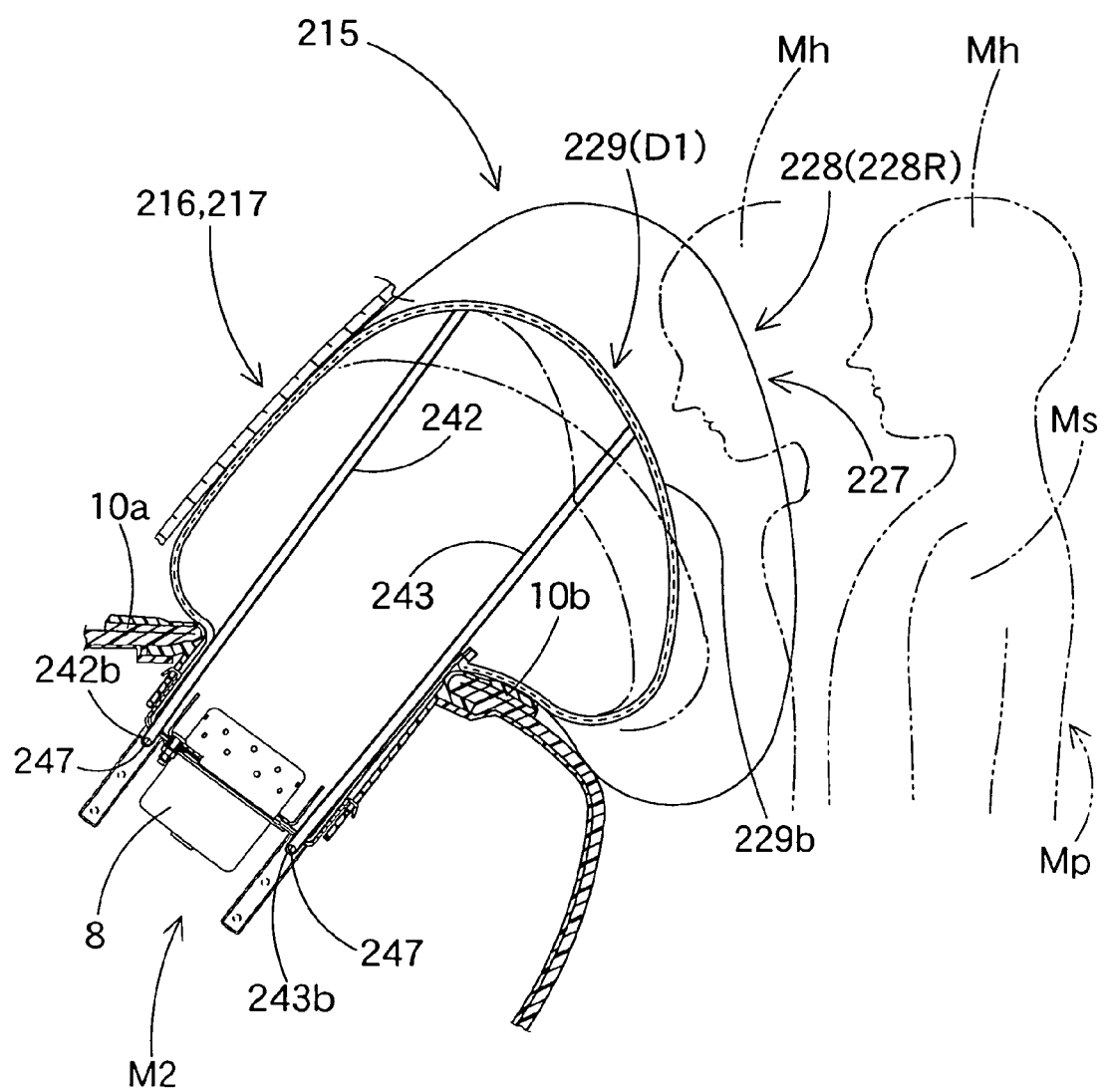
FIG. 31 is a schematic view of the airbag of FIG. 30 as viewed from side of vehicle.

Upon frontal collision in a condition that the sensor 255 is detecting that a passenger seated in front passenger's seat is of large build, the control device 254 outputs activating signals to the electromagnetic solenoids 251 and 252 as well as to the inflator 8, so that the solenoids 251 and 252 are activated to pull the pins 248 and 249 out of the walls 246*b* and retract them toward the walls 246*a*. At this time, the tethers 242 and 243 are retained only by the first stopper pins 247 at the lower ends 242*b* and 243*b*, and accordingly, length of the upper ends 242*a* and 243*a* parts of the tethers 242 and 243 released into the completely inflated airbag body 216 is most elongated. That is, the center restraining portion 229 of the completely inflated airbag 215 is located in a rearmost position D1, as indicated by solid lines in FIGS. 27, 30 and 31.

Upon collision in a condition that the sensor 255 is detecting that a passenger seated in front passenger's seat is of small build, the control device 254 outputs an activating signal only to the inflator 8, but not to the electromagnetic solenoids 251 and 252. Then the pins 248 and 249 are kept retained across the walls 246*a* and 246*b*. At this time, the tethers 242 and 243 are retained by the third stopper pins 249 at the lower ends 242*b* and 243*b*, and accordingly, length of the upper ends 242*a* and 243*a* parts of the tethers 242 and 243 released into the completely inflated airbag body 216 is most shortened. That is, the center restraining portion 229 of the completely inflated airbag 215 is located in a foremost position D3, as indicated by double-dotted lines in FIGS. 27, 32 and 33.

Moreover, upon collision in a condition that the sensor 255 is detecting that a passenger seated in front passenger's seat is of average build, the control device 254 outputs activating signals only to the electromagnetic solenoids 252 as well as to the inflator 8, but not to the solenoids 251. Then the solenoids 252 are activated to pull only the pins 249 out of the walls 246*b* and retract them toward the walls 246*a*. At this time, the tethers 242 and 243 are retained by the second stopper pins 248 at the lower ends 242*b* and 243*b*, and accordingly, length of upper ends 242*a* and 243*a* parts of the tethers 242 and 243 released into the completely inflated airbag body 216 is medium. That is, the center restraining portion 229 of the completely inflated airbag 215 is located in a middle position D2 between the rearmost position D1 and the foremost position D3, as indicated by single-dotted lines in FIG. 27, or solid lines in FIGS. 32 and 33.

When assembling the release adjuster 245, the walls 246a are secured to a lower side of the bottom wall 6a of the case 6A in a condition that the electromagnetic solenoids 251 and 252 are fixed to the walls 246a in advance, whereas the first stopper pins 247 are fixed to the walls 246b. Assembling of the adjuster 245 is conducted by firstly inserting the first stopper pins 247 through the walls 246a in a condition that the lower ends 242b and 243b parts of the tethers 242 and 243 are wound around the second stopper pins 248 and the third stopper pins 249, attaching the walls 246b to the walls 246a while inserting the second and third pins 248 and 249 through the walls 246b, and then by attaching C-rings 253 for holding the stopper pins 247. Thus the release adjuster 245 is assembled with the case 6A, and the lower ends 242b and 243b of the tethers 242 and 243 are joined to the adjuster 245.

To manufacture the airbag 215 according to the third embodiment, the second base cloths 240L and 240R are lapped with each other with the upper ends 242a and 243a of the tethers 242 and 243 put therebetween, and the inner edges 240a of the second base cloths 240L and 240R are sewn up together with the upper ends 242a and 243a, firstly. Subsequently, front edges 240b of the second base cloths 240L and 240R are sewn to a front edge 236a of the lower part 236 in the first base cloth 235, and rear edges 240c of the second base cloths 240L and 240R are also sewn to a rear edge 236b of the lower part 236 in the first base cloth 235. Then front and rear left edges 236c of the lower part 236 are sewn to the root side edges 237b of the edge 237a in the left portion 237, while right edges 236d are sewn to the root side edges 238b of the edge 238a in the right portion 238. Thereafter, the edge 237a of the left portion 237 and the outer edge 240d of the second base cloth 240L are sewn up, while the edge 238a of the right portion 238 and the outer edge 240d of the second base cloth 240R are sewn up. If then the airbag 215 is reversed inside out utilizing the gas inlet port 220 so that stitch allowances may not appear on surface, and the lower ends 242b and 243b parts of the tethers 242 and 243 are extracted from the through holes 222, the airbag 215 is complete.

In the airbag 215 according to the third embodiment, too, the second base cloths 240L and 240R are formed in a pair each of which having the generally same shape, and the outer edge portion 240d of each of the second base cloths 240L and 240R has generally the same shape as the edge 237a/238a of the left/right portion 237/238 in the first base cloth 235 constituting the outer panel 232 except the root side portion 237b/238b. Accordingly, sewing positions in the edges of the base cloths easily match one another only by lapping the base cloths 235, 240L and 240R one on another, which facilitates sewing work of the airbag 215.

After manufacturing the airbag 215, the airbag 215 is folded up with the retainer 11 disposed inside such that bolts 11a of the retainer 11 are protruded from the mounting holes 221. Then the folded-up airbag 215 is wrapped by a breakable wrapping sheet 14 (refer to FIGS. 23 and 24) to keep the folded-up configuration. At this time, the lower ends 242b and 243b parts of the tethers 242 and 243 are taken out of the wrapping sheet 14. Then the folded-up airbag 215 is placed on the bottom wall 6a of the case 6A by putting the bolts 11a of the retainer 11 through the bottom wall 6a, and the lower ends 242b and 243b parts of the tethers 242 and 243 are protruded downward from the through holes 6c of the case 6A. Subsequently, the body 8a of the inflator 8 is set in the case 6A from lower side of the bottom wall 6a, while the bolts 11a protruded downward from the bottom wall 6a are inserted through the flange 8a of the inflator 8. Thereafter, by fastening the bolts 11a protruded from the flange 8c of the inflator 8 into nuts 12, the folded-up airbag 215 and the inflator 8 are attached to the bottom wall 6a of the case 6A.

As aforedescribed, the release adjuster 245 is assembled so that the lower ends 242b and 243b of the tethers 242 and 243 are connected to the release adjuster 245.

Then the airbag device M2 for front passenger's seat is mounted on vehicle if a side wall 6b of the case 6A is retained by a joint wall 10c of an airbag cover 10 in the dashboard 1 having been mounted on vehicle, unillustrated brackets of the case 6A are fixed to predetermined positions of vehicle body, and unillustrated wires leading from the control device 254 are connected to the inflator 8 and the electromagnetic solenoids 251 and 252.

When mounted on vehicle and deployed, the airbag 215 for front passenger's seat according to the third embodiment of the present invention completes inflation in a condition that the center restraining portion 229 located between the shoulder restraining portions 228L and 228R is recessed forward in the protection portion 227. Accordingly, when the inflated airbag 215 is thrown against a passenger Mp, left and right shoulders Ms of the passenger Mp bump against the left and right shoulder restraining portions 228L and 228R projecting rearward firstly, so that forward kinetic energy of the passenger Mp is reduced. Thereafter, a head Mh of the passenger Mp enters into the center restraining portion 229 provided between the shoulder restraining portions 228L and 228R, and then is restrained and suppressed from moving forward. Accordingly, the head Mh of the passenger Mp is received softly while reaction force from the airbag 215 is suppressed, after kinetic energy is reduced by the shoulder restraining portions 228L and 228R.

According to the third embodiment, in a condition that the airbag 215 is mounted on vehicle and completely inflated, a disposition of the center restraining portion 229 in front-rear direction is adjustable into positions D1, D2 and D3, as shown in FIG. 27. For example, if a passenger Mp seated in front passenger's seat is of large build, the center restraining portion 229 is disposed in the rearmost position D1 so as to be less recessed from the shoulder restraining portions 228L and 228R, as indicated by solid lines in FIGS. 27, 30 and 31. This means that the airbag 215 comes to have more volume when inflated, so that it may take the airbag 215 longer time to complete inflation. However, under a circumstance that the passenger Mp of large build is seated farther rearward from the airbag 215, the shoulder restraining portions 228L and 228R of the completely inflated airbag 215 restrain left and right shoulders Ms properly, and then the center restraining portion 229 receives a head Mh of the passenger Mp softly.

In this case, although the center restraining portion 229 is more proximate to the head Mh of the passenger Mp, when disposed in the rearmost position D1, than when in the forward positions D2 or D3, a forward kinetic energy of the large build passenger Mp is absorbed by the shoulder restraining portions 228L and 228R smoothly, since the shoulder restraining portions 228L and 228R are inflated thick enough in left-right direction, so that the head Mh of the passenger Mp is received softly, too, by the center restraining portion 229.

If a passenger Mp seated in front passenger's seat is of small build, the passenger Mp is seated more forward. The center restraining portion 229 is disposed in the foremost position D3 so as to be more recessed from the shoulder restraining portions 228L and 228R, as indicated by double-dotted lines in FIGS. 27, 32 and 33. This means that the airbag 215 comes to have less volume when inflated, and it takes the airbag 215 a shorter time to complete inflation. With this construction, the left and right shoulder restraining portions 228L and 228R restrain shoulders Ms of the small build passenger Mp moving forward firstly, and then the center restraining portion 229 receives a head Mh of the small build passenger Mp softly by the rear plane 229b.

In this case, since the center restraining portion 229 is disposed more forward, or deeply recessed than when disposed in the position D1, the airbag 215 properly restrains the head Mh of the passenger Mp by the rear plane 229b of the center restraining portion 229 disposed in the front position D3, after restraining the shoulders Ms by the shoulder restraining portions 228L and 228R, even if the passenger Mp is seated proximate to the airbag 215. Accordingly, the head Mh of the passenger Mp is received softly.

In this case, even if a passenger Mp seated proximate to the airbag 215 is of large build, the shoulder restraining portions 228L and 228R restrain the shoulders Ms of the passenger Mp and absorb enough kinetic energy of the passenger Mp because of long absorbing stroke, before protecting a head Mh by the rear plane 229b of the center restraining portion 229 deeply recessed forward. Accordingly, the head Mh of the large build passenger Mp is received softly, too, by the rear plane 229b of the center restraining portion 229.

Figure 32:
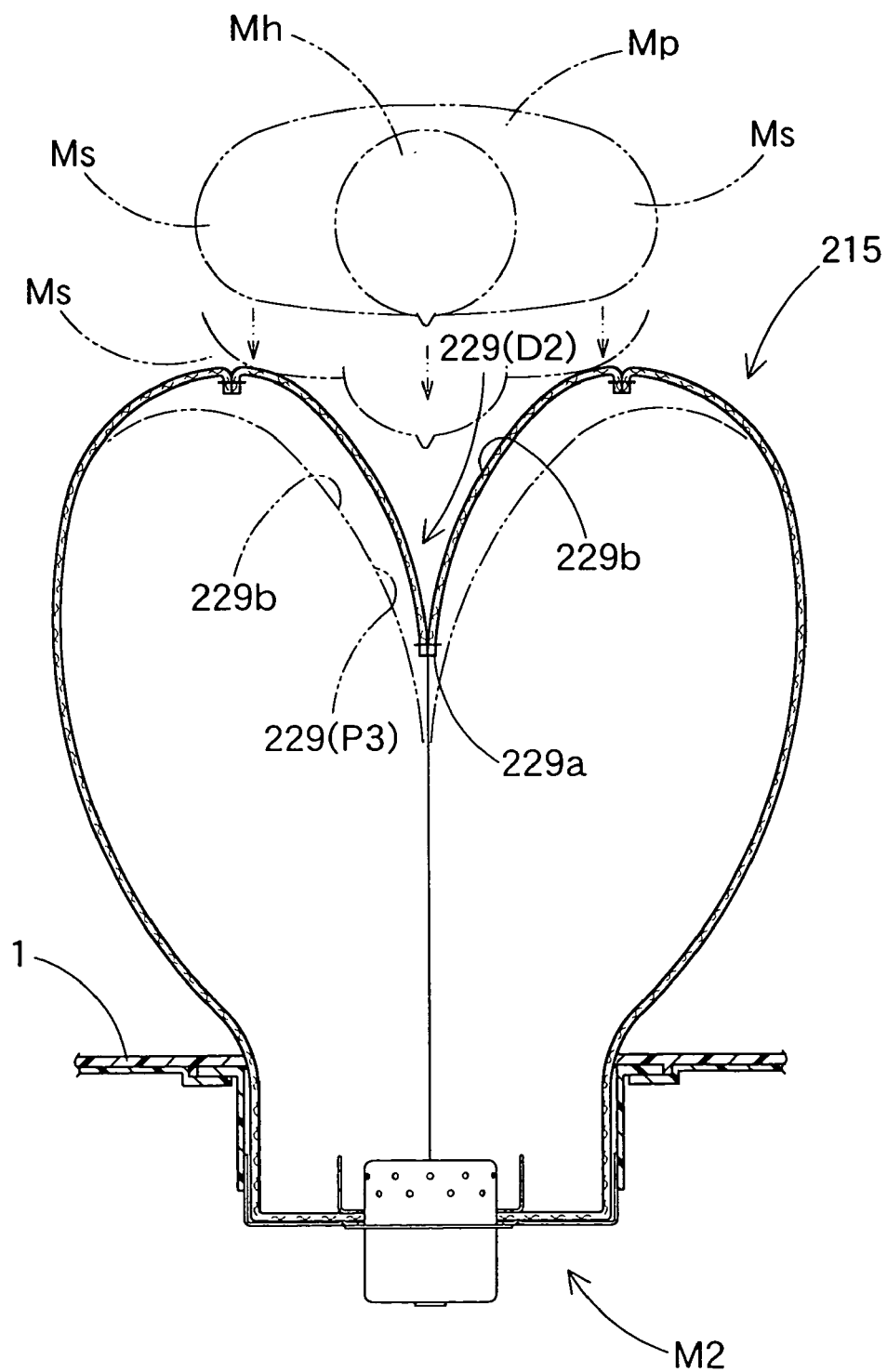
FIG. 32 is a schematic view of the airbag of FIG. 26 in service as viewed from upper side of vehicle, in a state that a position of a center restraining portion in front-rear orientation is adjusted.
Figure 33:
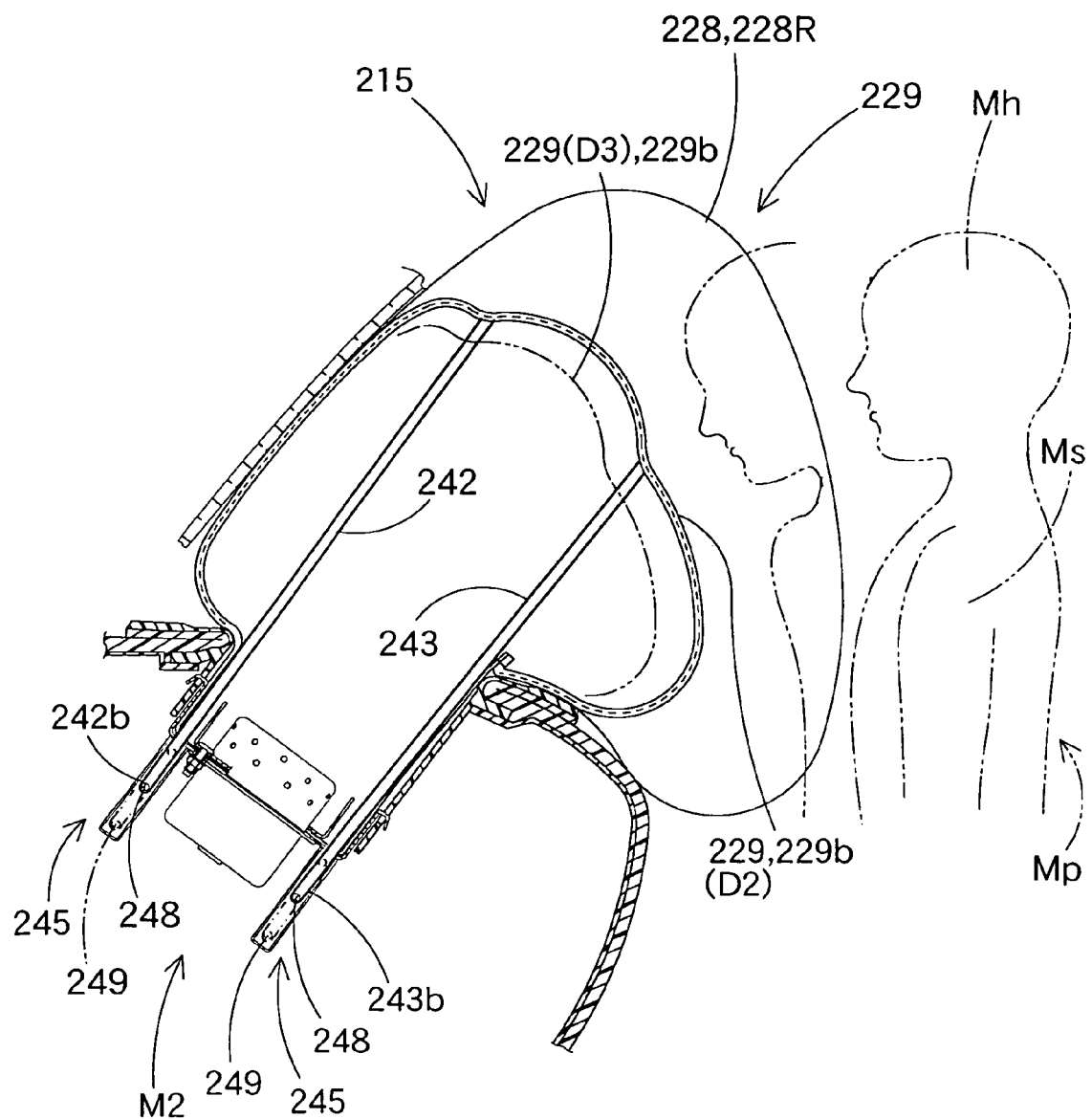
FIG. 33 is a schematic view of the airbag of FIG. 32 as viewed from side of vehicle.

Furthermore, if a passenger Mp is average build, the center restraining portion 229 is located in the middle position D2 upon airbag inflation, as indicated by single-dotted lines in FIG. 27 and by solid lines in FIGS. 32 and 33. A passenger's head Mh is protected softly by the rear plane 229b of the center restraining portion 229 in a condition that his kinetic energy is reduced by restraint of shoulders Ms by the shoulder restraining portions 228L and 228R.

According to the third embodiment, therefore, the airbag 215 is capable of protecting a head Mh of passenger Mp in accordance with physique and seated position of the passenger, when the head Mh is thrown against the completely inflated airbag 215.

Since the airbag 215 is capable of receiving a head Mh of large build passenger Mp softly even if the large build passenger Mp is seated proximate to the airbag 215, the sensor 255, which is to monitor passenger' weight, can be replaced by a distance sensor for monitoring passenger's seated position in front-rear direction, such as a distance sensor for monitoring a clearance between the dashboard 1 and a passenger, or a distance sensor for monitoring seat position in front-rear direction, so that the control device 254 controls the adjuster 245 such that, if it is monitored that a passenger is seated in a forward position, the rear plane 229b of the center restraining portion 229 be deployed in the position D3, and if it is monitored that a passenger is seated in a rearward position, the rear plane 229b be deployed in the position D1, and moreover, if a passenger is seated in a middle position in front-rear direction, the rear plane 229b be deployed in the position D2.

In the airbag 215, disposition of the center restraining portion 229 is adjusted by the two tethers 242 and 243 that are disposed one below another in the vertical inner edge 229a of the center restraining portion 229, and extend forward within the airbag 215. Accordingly, by changing lengths of the tethers 242 and 243, not only a position in front-rear direction, but also a slant angle of the center restraining portion 229 from horizontal orientation can be adjusted. More specifically, if a length of the front tether 242 released from the adjuster 245 is elongated whereas a length of the rear tether 243 released from the adjuster 245 is shortened, the rear plane 229b of the center restraining portion 229 has more backward descending slant angle from horizontal orientation, with the front end located more upward and the rearward more downward, as indicated by single-dotted lines in FIG. 31. On the contrary, if a length of the tether 242 released from the adjuster 245 is shortened whereas a length of the tether 243 released from the adjuster 245 is elongated, the rear plane 229b of the center restraining portion 229 has less backward descending slant angle from horizontal orientation, as indicated by double-dotted lines in FIG. 31.

In the third embodiment, too, the joint 231 is disposed in generally entire circumference of the airbag 215, along front-rear direction and in generally transverse center of the airbag 215 as completely inflated. A length of each of the inner edges 240a of inner panel base cloths 240, which constitute the joint 231, is predetermined shorter than that of each of the outer edges 240d of inner panel base cloths 240. That is, the joint 231 does not project outward, or located inside of an outline of the airbag 215 as viewed from side when completely inflated. With this construction, the protection portion 227 having the shoulder restraining portions 228L and 228R in a rear side and the recessed center restraining portion 229 between the shoulder restraining portions 228L and 228R is easily made out of a base cloth 235 for forming the outer panel 232 and two base cloths 240 for forming the inner panel 233.

In addition, in the airbag 215, the tethers 242 and 243 are easily attached to the airbag 215 when the inner edges 240a of the inner panel base cloths 240 are joined to each other.

Figure 37:
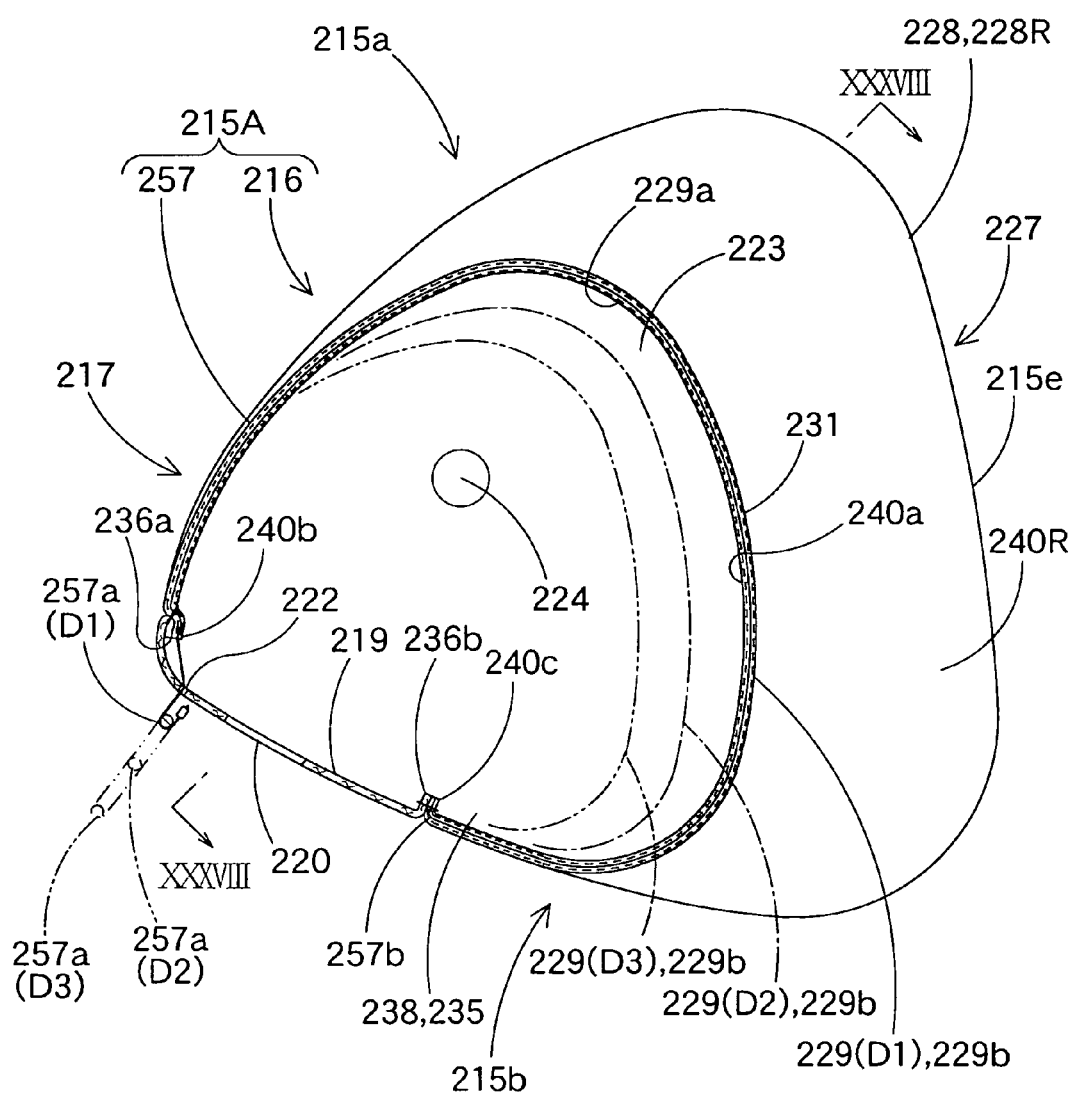
FIG. 37 is a sectional view of the modified airbag inflated by itself, taken along front-rear orientation.
Figure 38:
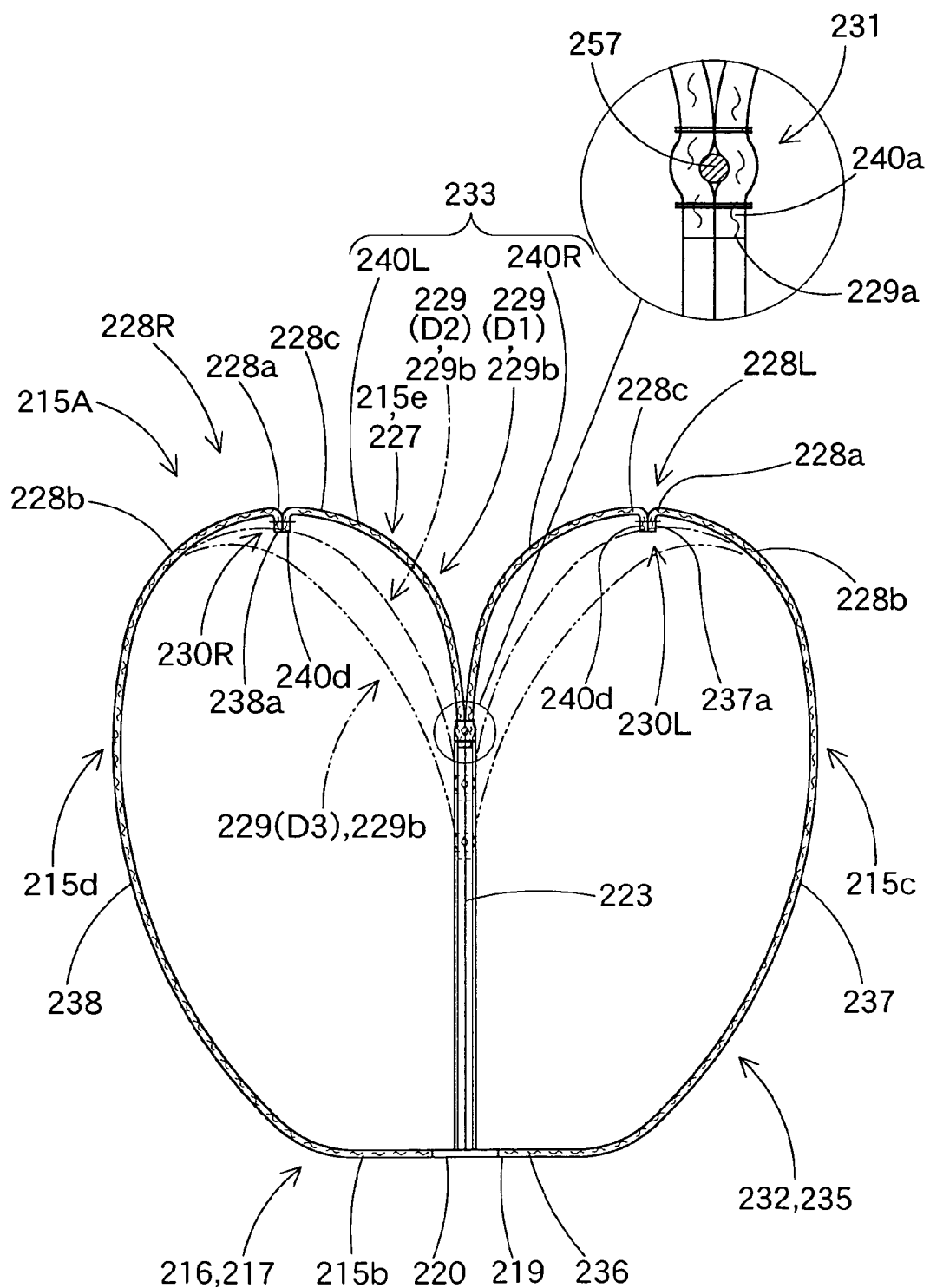
FIG. 38 is a schematic section of the airbag of FIG. 37, taken along XXXVIII-XXXVIII of FIG. 37.
Figure 39:
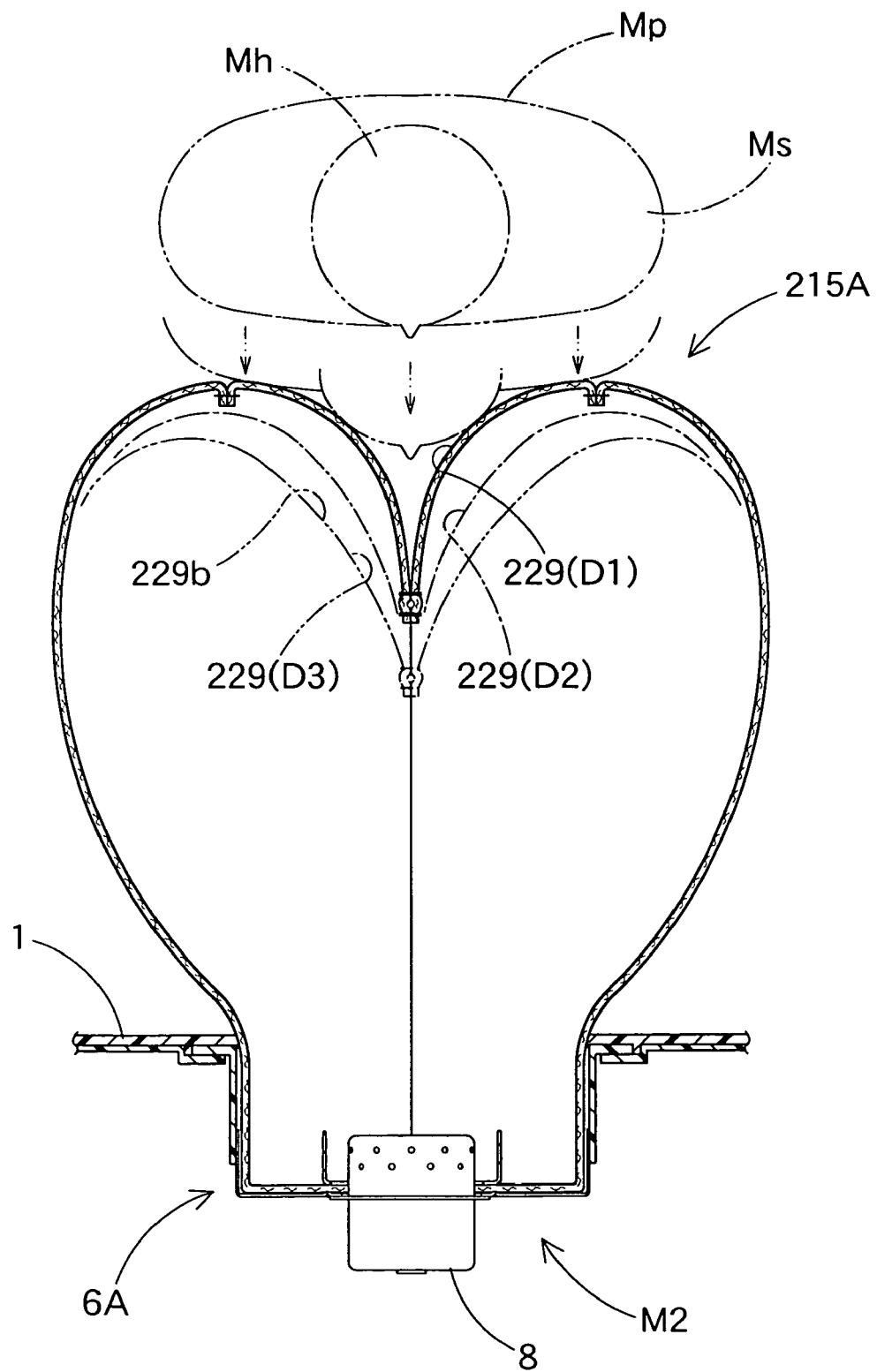
FIG. 39 is a schematic view of the airbag of FIG. 37 as viewed from upper side of vehicle, in a state that a position of a center restraining portion in front-rear orientation is adjusted.
Figure 40:
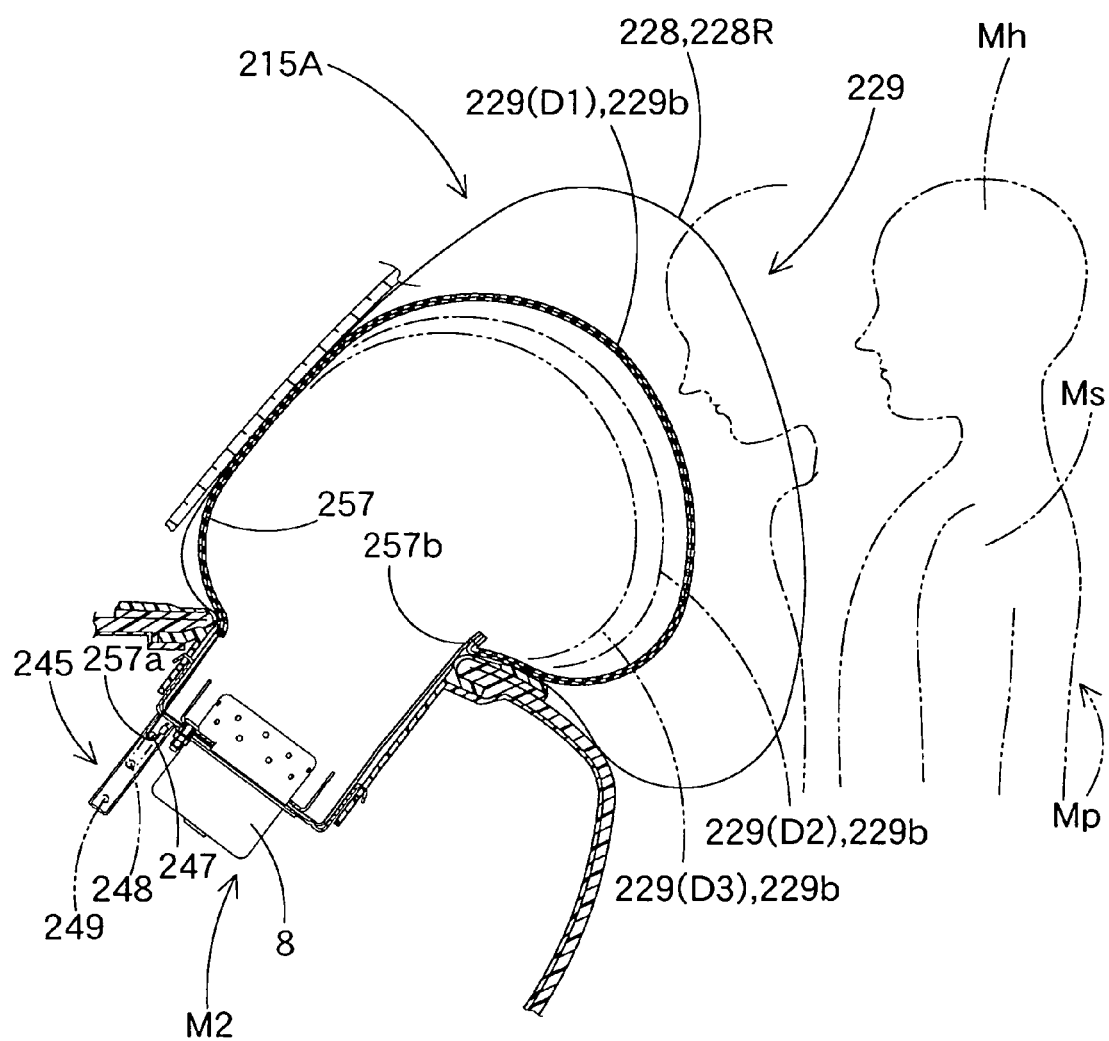
FIG. 40 is a schematic view of the airbag of FIG. 39 as viewed from side of vehicle.

Disposition of the center restraining portion 229 may be adjusted also by adjusting length of a string member 257 which is disposed generally all along the inner edge 229a of the center restraining portion 229, as in an airbag 215A shown in FIGS. 37 and 38. The airbag 215A is a modification of the third embodiment.

Figure 34:
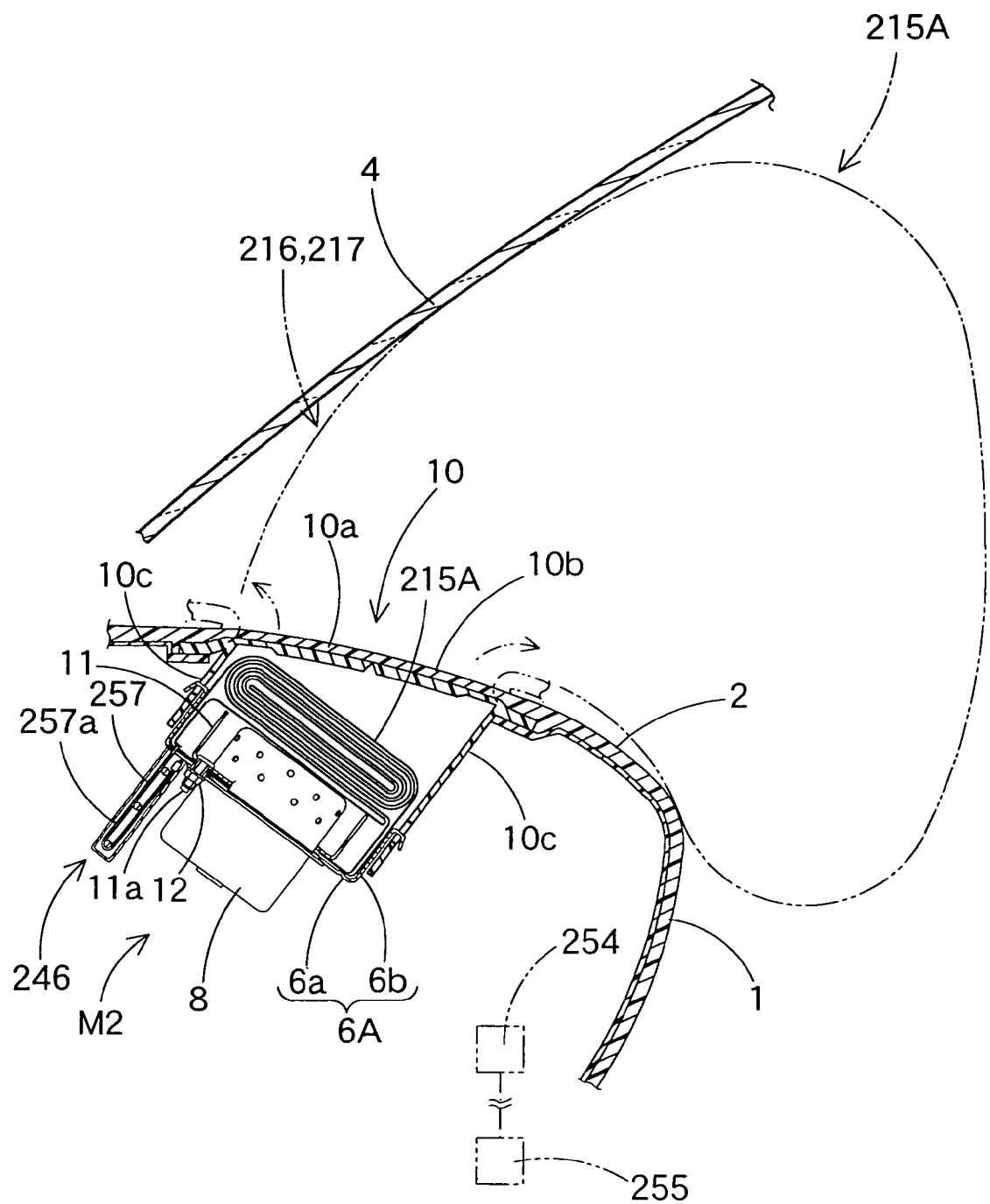
FIG. 34 is a schematic vertical section of an airbag device for front passenger's seat employing a modification of the airbag of the third embodiment, taken along front-rear orientation of vehicle.
Figure 35:
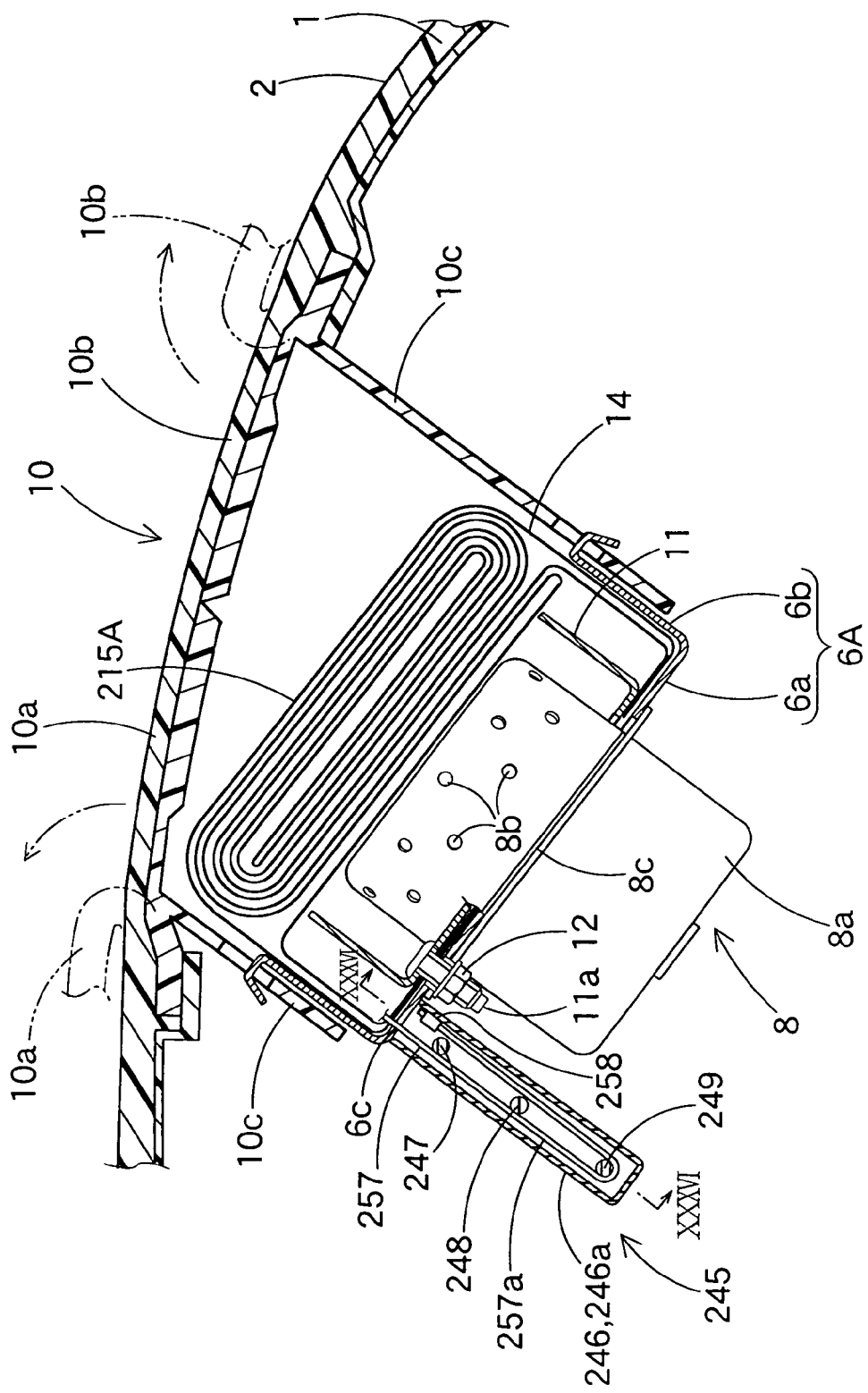
FIG. 35 is an enlarged schematic section of the airbag device of FIG. 34 taken along front-rear orientation of vehicle.
Figure 36:
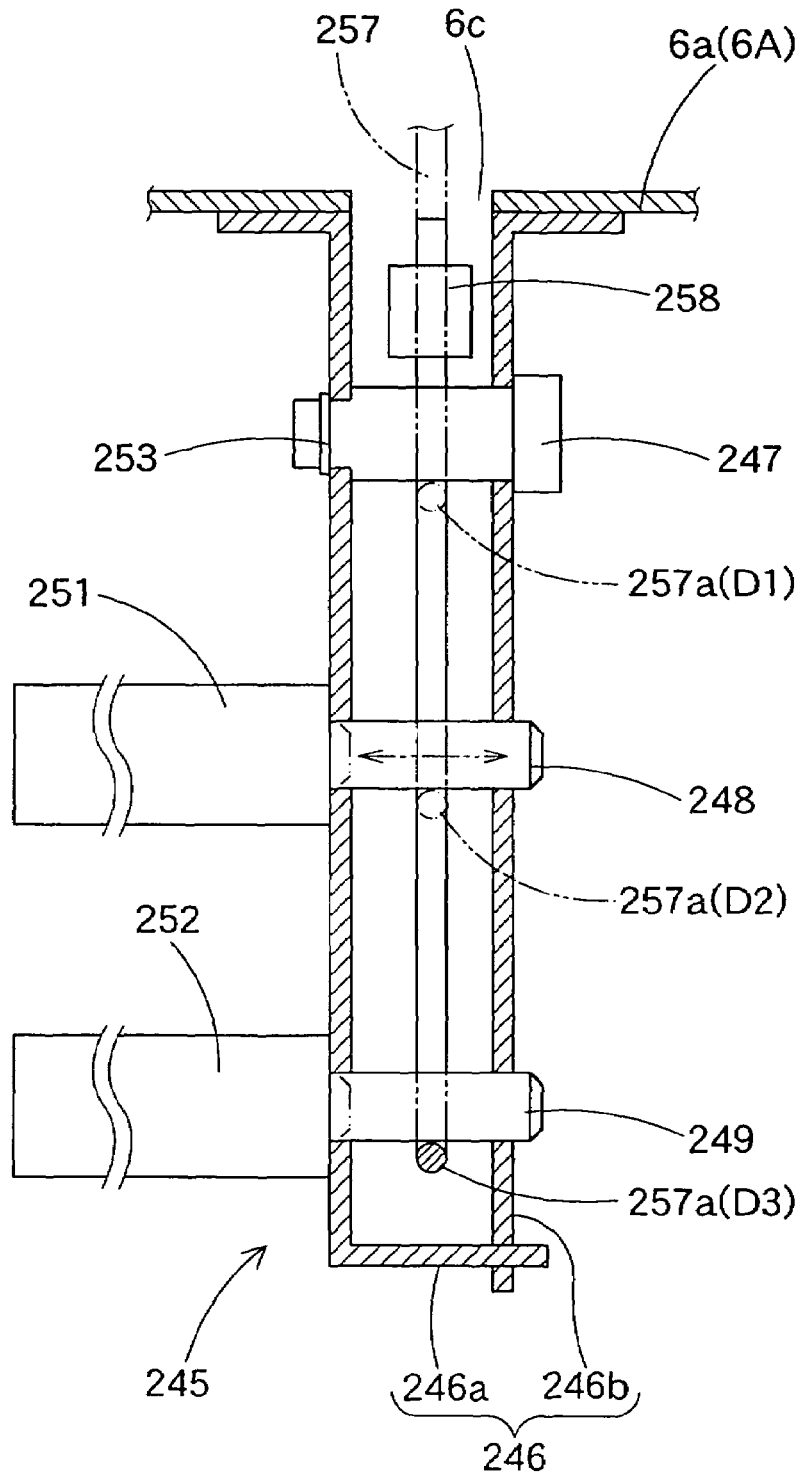
FIG. 36 is a schematic vertical section of a release adjuster employed with the modified airbag, taken along XXXVI-XXXVI of FIG. 35.

Referring to FIGS. 34 to 36, the string member 257 is made of flexible metal or fabric. The airbag 215A is constructed such that the string member 257 goes through and along a joint of inner edges 240a of inner panel base cloths 240. A rear end 257b of the string member 257 is fixed to a rear edge 240c of the inner edge 240a, whereas a front end 257a of the string member 257 is pulled out of a front edge 240b of the inner edge 240a into inner space of the airbag body 216, and taken out of the airbag body 216 via a through hole 222, and then extended up to a third stopper pin 249 as part of the release adjuster 245 having the same construction as that in the aforedescribed airbag 215, and wound therearound. A terminal of this front end 257a is fixed to a wall 246a of a case 246 with a fixing member 258, and thus the front end 257a of the string member 257 is joined with the adjuster 245.

The airbag 215A differs from the aforedescribed airbag 215 in that the string member 257, instead of the tethers 242 and 243, is disposed along the inner edges 240a of the inner panel base cloths 240, or the inner edge 229a of the center restraining portion 229, in such a manner as to go back and forth along the inner edge 240a or 229a, while having the rear end 257b fixed to the airbag body 216, and having the front end 257a wound around pins 247, 248 and 249, and then the terminal of the front end 257a is fixed to the case 246, and in that the airbag 215A has only one through hole 222 in front part thereof. However, other constructions of the airbag 215A are similar to those of the airbag 215, and therefore, descriptions of common members or the like will be omitted by assigning those members common reference numerals. In addition, the airbag 215A is folded up and mounted on vehicle together with the case 6A, an inflator 8 and an airbag cover 10, in a similar manner to the aforedescribed airbag 215.

Moreover, the release adjuster 245, to which the front end 257a of the string member 257 is joined, has a similar construction to the aforedescribed adjuster 245, as shown in FIGS. 34 to 36. The case 6A has only one through hole 6c in a front part of a bottom wall 6a.

In the airbag 215A, upon frontal collision in a condition that a sensor 255 is detecting that a passenger Mp seated in front passenger's seat is of large build, a control device 254 outputs activating signals to electromagnetic solenoids 251 and 252 as well as to the inflator 8, so that the solenoids 251 and 252 are activated to pull the pins 248 and 249 out of the walls 246b and retract them toward the walls 246a. At this time, the string member 257 is retained only by the first stopper pin 247 at the front end 257a, and accordingly, length of the string member 257 released into the completely inflated airbag body 216 is most elongated. That is, a substantial length of a joint 231 of the inner edges 240a of the base cloths 240 is elongated, in other words, an inner edge of a communication port 223 is expanded, so that the inner edge 229a of the center restraining portion 229 of the completely inflated airbag 215A is located in a rearmost position D1, as indicated by solid lines in FIGS. 37 to 40.

As a result, the center restraining portion 229 is disposed in the rearmost position D1 so as to be less recessed from left and right shoulder restraining portions 228L and 228R. That is, the airbag 215A comes to have more volume when inflated, so that it may take the airbag 215A longer time to complete inflation. However, under a circumstance that the large build passenger Mp is seated farther rearward from the airbag 215A, the shoulder restraining portions 228L and 228R of the completely inflated airbag 215A restrain left and right shoulders Ms properly, and then the center restraining portion 229 receives a head Mh of the passenger Mp softly.

Upon collision in a condition that the sensor 255 is detecting that a passenger Mp seated in front passenger's seat is of small build, the control device 254 outputs an activating signal only to the inflator 8, but not to the electromagnetic solenoids 251 and 252. Then the pins 248 and 249 are kept retained across the walls 246a and 246b. At this time, the front end 257a of the string member 257 is retained by the third stopper pin 249, and accordingly, length of the string member 257 released into the completely inflated airbag body 216 is most shortened. That is, the substantial length of the joint 231 of the inner edges 240a of the base cloths 240, or the length of the inner edge of the communication port 223 is shortened, so that the inner edge 229a of the center restraining portion 229 is located in a foremost position D3, as indicated by double-dotted lines in FIGS. 37 to 40.

As a result, the center restraining portion 229 is disposed in the foremost position D3 so as to be more recessed from the shoulder restraining portions 228L and 228R. That is, the airbag 215A comes to have less volume when inflated, and it takes the airbag 215A a shorter time to complete inflation. With this construction, the left and right shoulder restraining portions 228L and 228R restrain shoulders Ms of the small build passenger Mp moving forward firstly, and then the center restraining portion 229 receives a head Mh of the small build passenger Mp softly by the rear plane 229b.

Moreover, upon collision in a condition that the sensor 255 is detecting that a passenger Mp seated in front passenger's seat is of average build, the control device 254 outputs activating signals only to the electromagnetic solenoid 252 as well as to the inflator 8, but not to the solenoid 251. Then the solenoid 252 is activated to pull only the pin 249 out of the wall 246b and retract it toward the wall 246a. At this time, the front end 257a of the string member 257 is retained by the second stopper pin 248, and accordingly, length of the string member 257 released into the airbag body 216 becomes medium. That is, the length of the inner edge of the communication port 223 is medium, too, so that the inner edge 229a of the center restraining portion 229 is located in a middle position D2, as indicated by single-dotted lines in FIGS. 38 to 40.

As a result, the center restraining portion 229 is disposed in the middle position D2 so as to be deeply recessed from the shoulder restraining portions 228L and 228R. With this construction, the left and right shoulder restraining portions 228L and 228R restrain shoulders Ms of the average build passenger Mp moving forward firstly, and then the center restraining portion 229 receives a head Mh of the passenger Mp softly by the rear plane 229b. Consequently, the airbag 215A obtains the same working effects as the airbag 215.

In the airbag 215A, the inner edge 229a of the center restraining portion 229 is contracted or slacked by adjusting the releasing length of the string member 257. Accordingly, side-viewed shapes of the center restraining portions 229 located in the positions D1, D2 and D3 upon airbag inflation are generally similar to one another.

Moreover, in the airbag 215A, the string member 257 is not disposed to go across an inner space of the airbag 215A, unlike the tethers 242 and 243. Accordingly, the airbag 215A may be provided with a flow regulating cloth for guiding inflation gas flown in the airbag 215A forward and rearward, since it is not likely that the flow regulating cloth engages the string member 257.

Although the release adjuster 245 is connected only with the front end 257a of the string member 257 in the foregoing embodiment, it will also be appreciated that the rear end 257b is also taken out of the airbag 215A and connected with an assumed adjuster 245 fixed to rear edge part of lower side of the case bottom wall 6a. It will also be appreciated that the string member 257 is formed into a loop shape, as in the airbag 215, and wound around the pins 247, 248 and 249.

Other than the release adjuster 245 described in the foregoing embodiments, a motor or a pretensioner, which changes lengths of tethers or string member by traction and release, may be adopted as release adjusting mechanism to adjust length of the tethers 242, 243 or the string member 257 released into the airbag. Then the release adjusting mechanism is connected to ends of the tethers or string member taken out of the airbag, so that the mechanism is controlled by a control circuit responding to various sensors mounted on the dashboard, roof, a seat or the like of vehicle for monitoring seating position or weight of a passenger.

When the airbag can be mounted on various kinds of vehicle in which seating position or physique of a passenger is supposed in a generally limited range, the airbag for front passenger's seat may be mounted on vehicle with a tether or a string member whose length is fixed. In this case, although the length of a tether or a string member may be adjusted only until the airbag is mounted on vehicle, but not after being mounted, it is advantageous that one kind of airbag may be applied to various kinds of vehicle.

Although the outer panel 232 in the airbags 215 and 215A is formed by a single piece of cloth, or the first base cloth 235, having such a shape as the left portion 237 defining the left side wall 215c and the right portion 238 defining the right side wall 215d are joined together in left-right direction, the shape of the outer panel should not be limited thereby. The outer panel may be constructed of a pair of two base cloths split up into a left portion and a right portion. In addition, although the airbags 215 and 215A are manufactured by sewing up edges of the base cloths 235, 240L and 240R, connecting means of the edges of the base cloths should not be limited thereby, but adhesive or the like may be used to connect edges of the base cloths.

Figure 46:
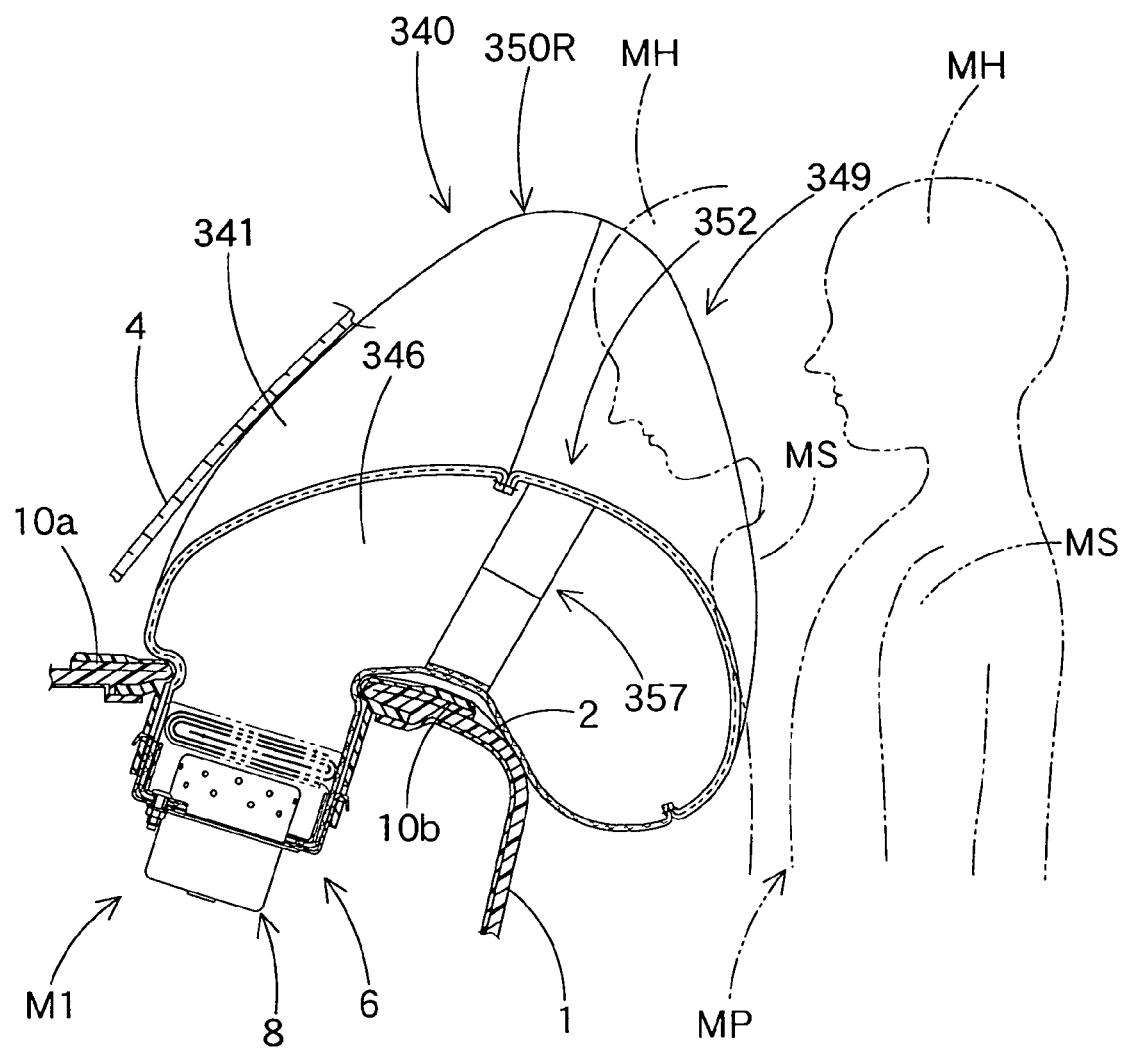
FIG. 46 schematically illustrates the airbag of FIG. 45 as viewed from side of vehicle.

A fourth embodiment of the present invention is now described, by which the second object of the present invention are attainable. As shown in FIG. 46, an airbag 340 according to the fourth embodiment is used for an airbag device M1 for front passenger's seat, which is also top-mount type, as the airbags 15 and 115. The airbag device M1 for front passenger's seat for which the airbag 340 is used has a similar construction to the aforedescribed airbag device M1, and therefore, its description will be omitted by assigning common reference numerals to common members.

Figure 41:
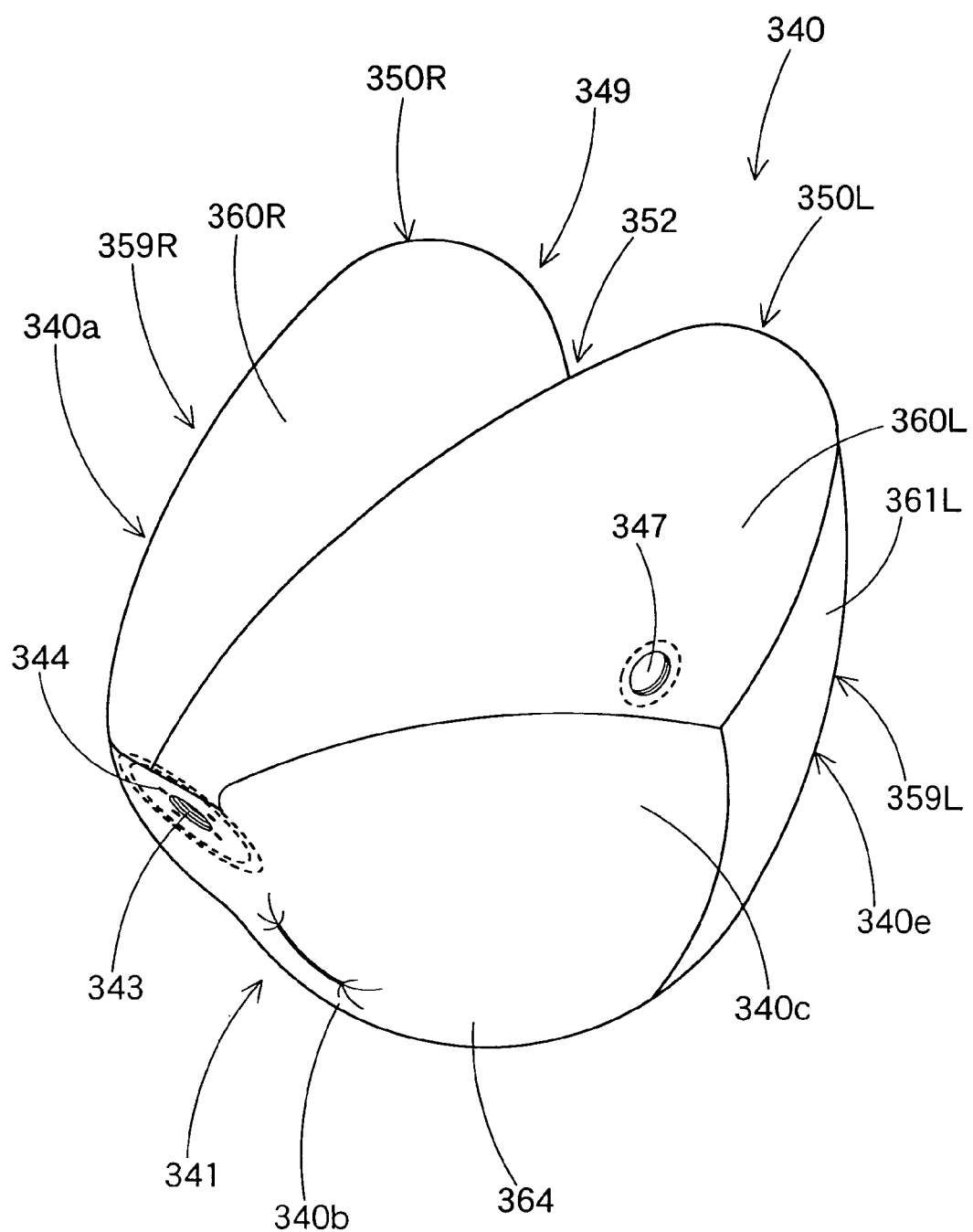
FIG. 41 is a perspective view of an airbag according to a fourth embodiment of the present invention as inflated by itself and viewed from forward.
Figure 42:
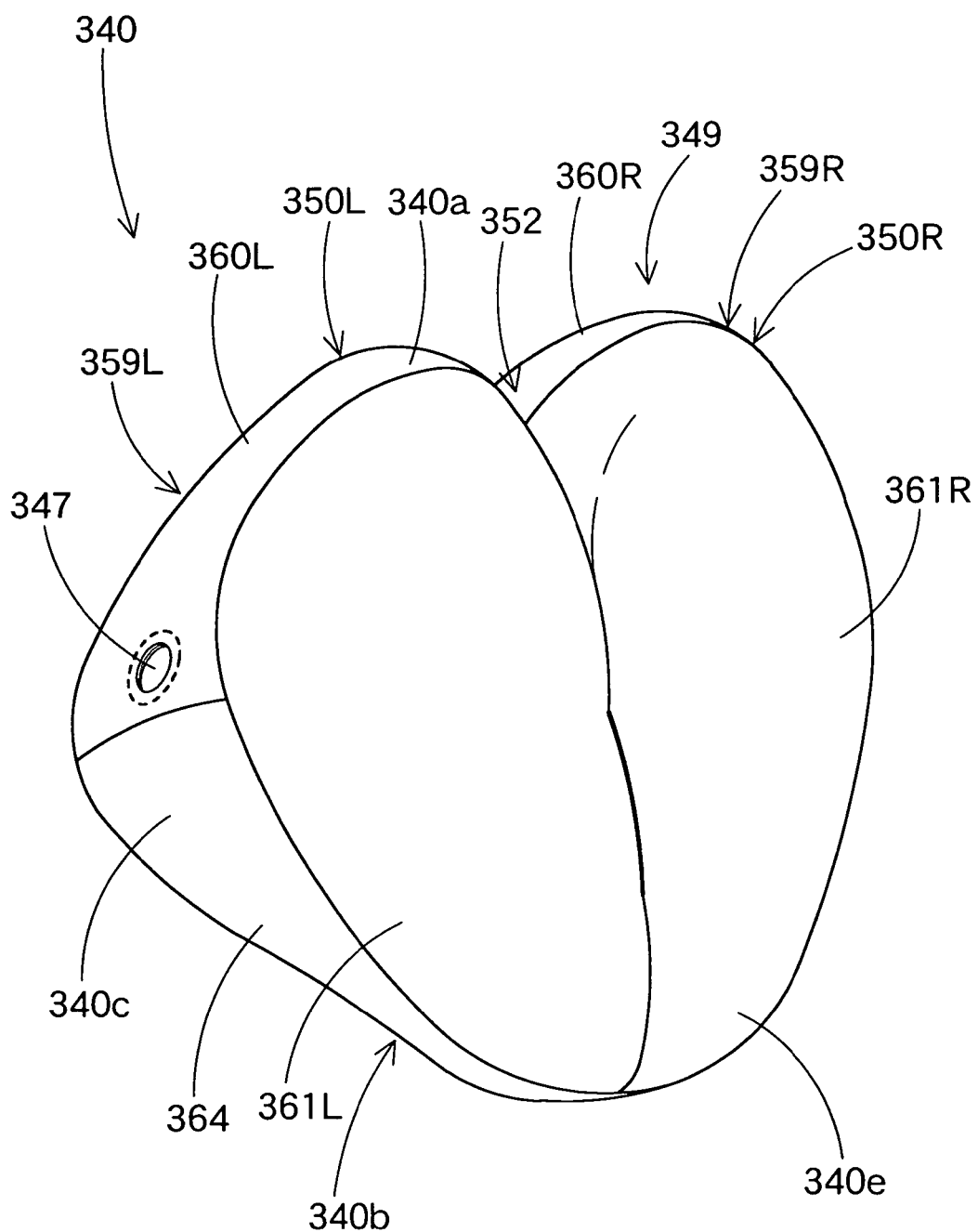
FIG. 42 is a perspective view of the airbag of FIG. 41, as viewed from rearward.
Figure 43:
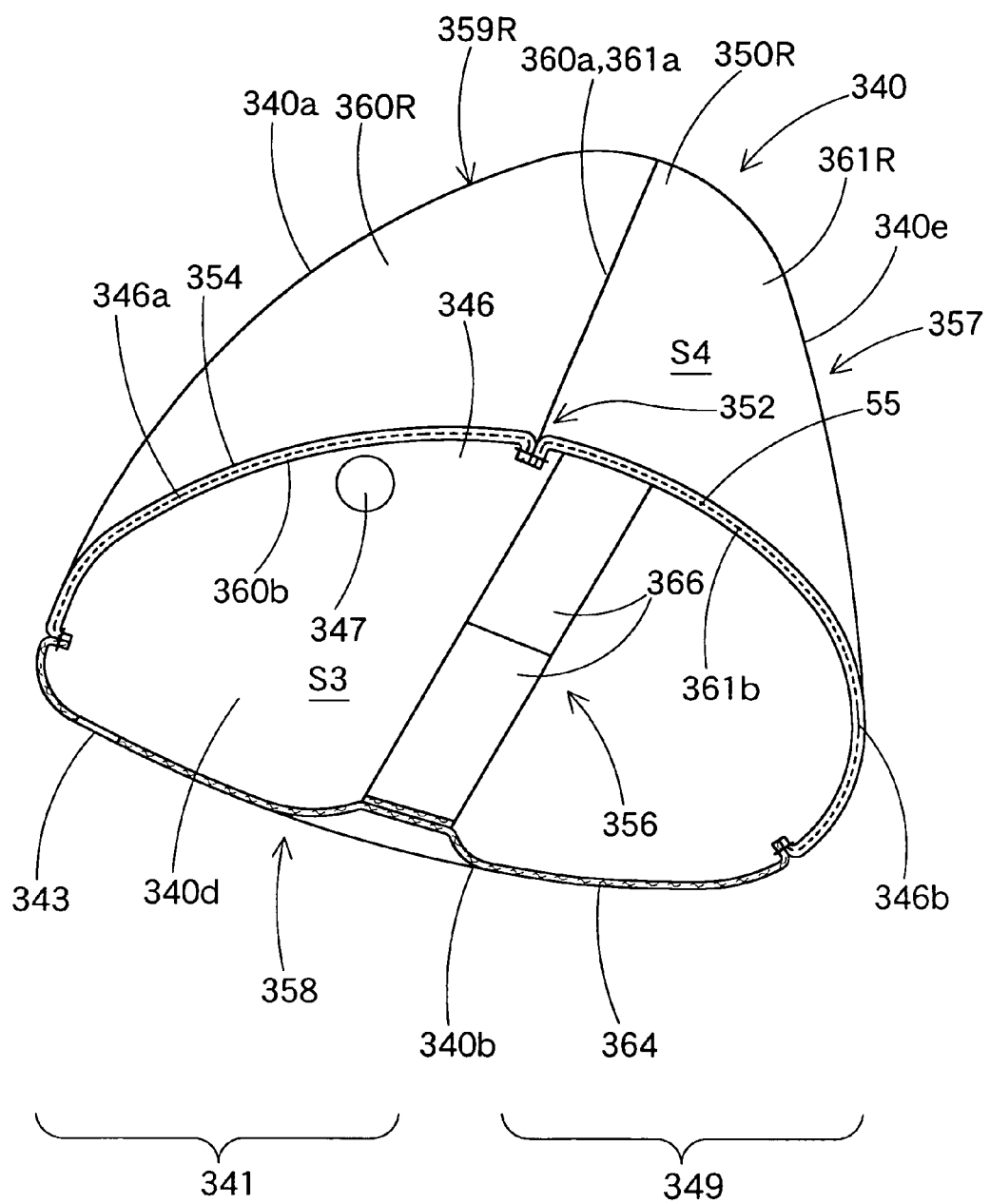
FIG. 43 is a sectional view of the airbag of FIG. 41, taken along front-rear orientation.

Referring to FIGS. 41 to 43, the airbag 340 is formed into a generally square conical shape when completely inflated by itself, and a top of the conical shape is in a front end of the airbag 340. The airbag 340 includes an upper side wall 340*a* deployed in upper side, a lower side wall 340*b* deployed in lower side, left and right side walls 340*c* and 340*d* deployed in left and right sides, and a rear wall 340*e* arranged in a rear side, each upon airbag inflation. The airbag 340 includes a protection portion 349 to be deployed in a rear side to face toward a passenger upon airbag inflation, and a vehicle body side portion 341 to be deployed between a dashboard 1 and a wind shield 4 and forward of the protection portion 349 upon airbag inflation. The vehicle body side portion 341 includes a gas inlet port 343 in the vicinity of transverse center thereof and proximate to a front end of the lower side wall 340*b* of the airbag 340 as completely inflated. Around the inlet port 343 are mounting holes 344, as in the aforedescribed airbags 15, 115 and 215. The airbag 340 is further provided with a tether 356 for keeping the inflated airbag 340 in a predetermined shape.

Figure 45:
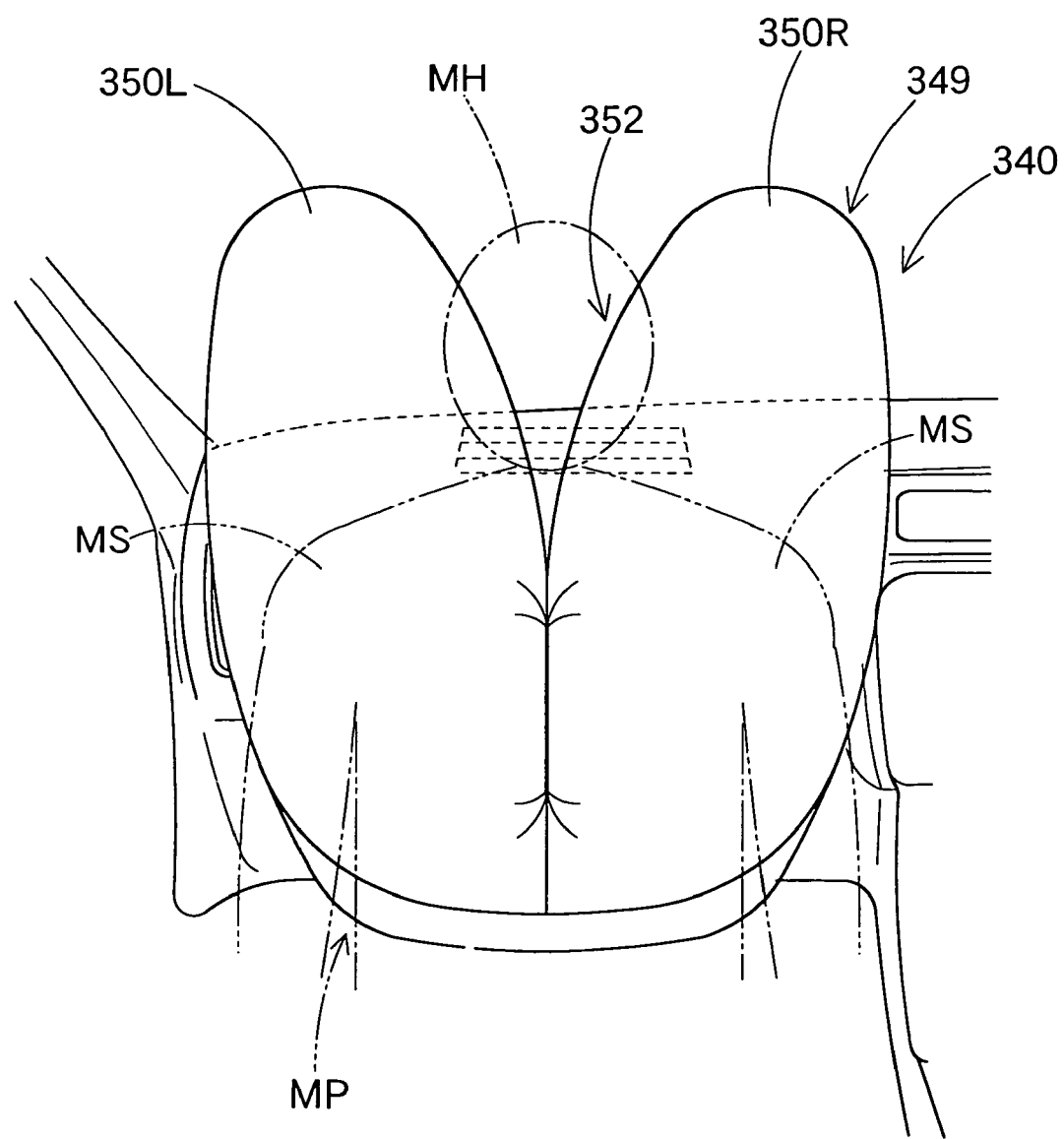
FIG. 45 illustrates the airbag of FIG. 41 in service as viewed from rearward of vehicle, the airbag being completely inflated.

The protection portion 349 includes shoulder restraining portions 350 (350L and 350R) disposed side by side in left-right direction and projecting rearward in such a manner as to extend vertically, and a recess 352 recessed from upper side to rear side between the left and right shoulder restraining portions 350L and 350R. As shown in FIG. 45, the shoulder restraining portions 350L and 350R are connected to each other at lower parts thereof such that a connected lower part in rear side be generally flat plane, and have a generally V-shape, as viewed as a whole from rearward of vehicle. In the illustrated embodiment, rise of the left and right shoulder restraining portions 350L and 350R, and recess of the recess 352 continue forward from the rear side wall 340*e* of the airbag 340, in such a manner as to enter within an area of the upper side wall 340*a*, up to the vicinity of the gas inlet port 343 in the vehicle body side portion 341.

Figure 44:
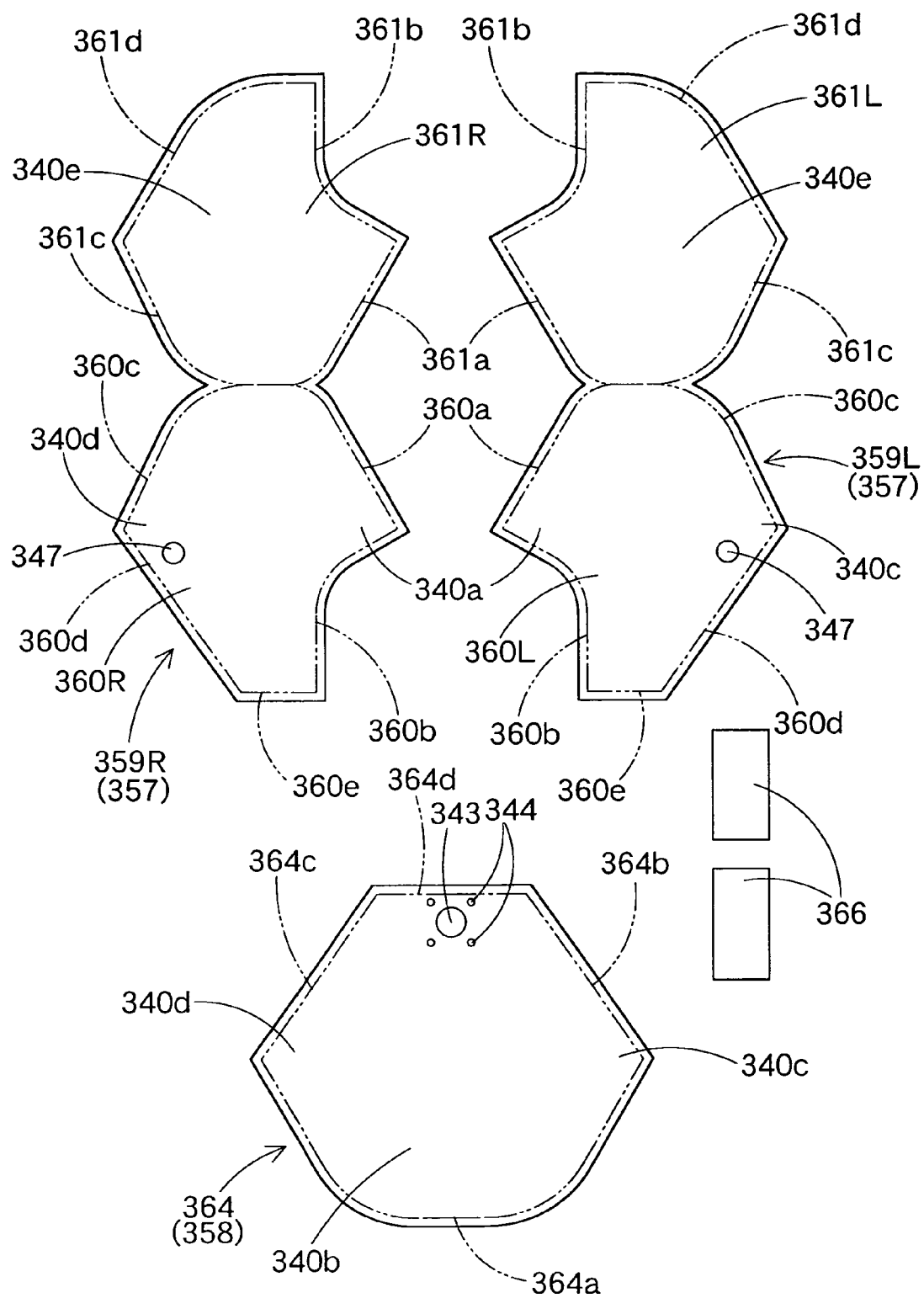
FIG. 44 illustrates constituent parts of the airbag of FIG. 41 by plan views.

The airbag 340 is formed by joining edges of predetermined shaped base cloths. The airbag 340 includes an upper panel 357 constituting the upper and rear side walls 340*a* and 340*e*, and upper parts of the left and right side walls 340*c* and 340*d*, and a lower panel 358 constituting the lower side wall 340*b* and lower parts of the left and right side walls 340*c* and 340*d*. As shown in FIG. 44, the airbag 340 is formed of a pair of first base cloths 359L and 359R, as upper panel base cloths, having the same shapes, a second base cloth 364 constituting the lower panel 358, and two band-shaped tether base cloths 366. The first base cloths 359L and 359R constitute the upper panel 357. Each of the first base cloths 359L and 359R includes an upper portion 360L/360R and a rear portion 361L/361R. The upper portions 360L and 360R mainly constitute the upper side wall 340*a* and upper parts of the left and right side walls 340*c* and 340*d*, of the airbag 340 as completely inflated. The rear portions 361L and 361R mainly constitute the rear side wall 340*e* of the airbag 340 as completely inflated. Each of the first base cloths 359L and 359R has an elongate shape in which the upper portion 360 and the lower portion 361 are connected to each other at a position to be the vicinity of top of the inflated airbag 340, and the two base cloths 359L and 359R show lateral symmetry. The second base cloth 364 constitutes the lower side wall 340*b* and lower parts of the left and right side walls 340*c* and 340*d*, of the airbag 340 as completely inflated, and has a generally hexagonal shape provided with a gas inlet port 343 in a front end thereof. The first and second base cloths 359L, 359R and 364, and the tether base cloths 366 are made from flexible woven fabric of polyester, polyamide or the like. The woven fabric is not coated by coating agent such as silicone, or the like.

Below the recess 352 of the protection portion 349 inside the airbag 340 is a communicating portion or communication port 346 communicating the shoulder restraining portions 350L and 350R in left-right direction. The communication port 346 is defined by sewn portions which sew up corresponding portions in the upper portions 360L and 360R and rear portions 361L and 360R of the first base cloths 359L and 359R, and by the second base cloth 364.

More specifically, referring to FIG. 43, a front upper edge 346*a* of an opening plane of the communication port 346 is defined by a sewn portion 354 formed by sewing up lower inner edges 360*b* of the upper portions 360L and 360R of the first base cloths 359L and 359R, whereas a rear upper edge 346*b* of the opening plane is defined by a sewn portion 355 formed by sewing up lower inner edges 361*b* of the rear portions 361L and 361R of the first base cloths 359L and 359R. The communication port 346 is disposed to range from lower side of the protection portion 349 to lower side of the vehicle body side portion 341 in the airbag 340 as completely inflated, and its opening plane is arranged in generally transverse center of the airbag 340 in such a manner as to extend along generally front-rear orientation, when the airbag 340 is completely inflated. As in the aforedescribed airbag 15, an opening area S3 of the communication port 343 in a section taken along front-rear direction generally at the center of the gas inlet port 343, in an completely inflated condition of the airbag 340, is predetermined ⅕ or greater of a projected area S4 of a side view of the whole airbag 340 as completely inflated. In the illustrated embodiment, the opening area S3 of the communication port 346 is generally half of the projected area S4 of the completely inflated airbag 340. In the fourth embodiment, too, in order to protect a passenger's head softly, the opening area S3 of the communication port 346 is desirably less than ⅘ of the projected area S4 of the completely inflated airbag 340.

Each of the left and right side walls 340*c* and 340*d* is provided with a vent hole 347. The tether 356 is formed into a generally band shape, in the illustrated embodiment. One end of the tether 356 is connected to generally transverse and longitudinal center of the lower side wall 340*b* of the airbag 340, whereas another end is connected to the vicinity of top of the recess 352 as viewed from interior of the airbag 340, so that the tether 356 is arranged inside the inflated airbag 340 in such a manner as to extend along generally front-rear orientation.

Manufacturing of the airbag 340 according to the fourth embodiment is now described. Firstly, the first base cloths 359L and 359R are lapped with each other, and the lower inner edges 361*b* of the rear portions 361L and 361R are sewn up with sewing yarn. At the same time, an end of one of the tether base cloths 366 is sewn to the vicinity of the top of the lower inner edge 361*b*. An end of another tether base cloth 366 is sewn to the center vicinity of the second base cloth 364 with sewing yarn. Subsequently, the lower inner edges 360*b* of the upper portions 360L and 360R in the first base cloths 359L and 359R are sewn up with sewing yarn. Thereafter, the lapped first base cloths 359L and 359R are opened by separating outer edges thereof, and then folded back at the vicinity of joint of the upper portions 360 and 361, such that the upper portions 360 lap the rear portions 361. Then, an upper inner edge 361*a* of the rear portion 361L/361R and an adjacent upper inner edge 360*a* of the upper portion 360L/360R are sewn up with sewing yarn, respectively. Thereafter, in each of left and right sides, an upper outer edge 360*c* of the upper portion 360L/360R and an adjacent upper outer edge 361*c* of the rear portion 361L/361R are sewn up with sewing yarn.

Thereafter, the first base cloths 359L and 359R are developed by separating remaining unsewn outer edges 360*d*, 360*e* and 361*d* from one another, and the second base cloth 364 is lapped over the first base cloths 359L and 359R. At this time, an outer contour of this developed first base cloths 359L and 359R is the same as an outer contour of the second base cloth 364. Subsequently, lower outer edges 361*d* of the rear portions 361L and 361R in the first base cloths 359L and 359R are sewn to a rear edge 364*a* of the second base cloth 364 with sewing yarn, whereas each of lower outer edges 360*d* of the upper portions 360L and 360R in the first base cloths 359L and 359R is sewn to left/right edge 364*b*/364*c* of the second base cloth 364 with sewing yarn. Thereafter, front edges 360*e* of the upper portions 360L and 360R in the first base cloths 359L and 359R are sewn to a front edge 364*d* of the second base cloth 364 with sewing yarn. Then the first base cloths 359L and 359R and the second base cloth 364 are reversed inside out from the gas inlet port 343, such that stitch allowance may not appear on surface. If then another ends of the tether base cloths 366 are taken out from the gas inlet port 343 and sewn to each other in edges thereof, the airbag 340 is completed.

In the airbag 340 thus constructed, too, upon airbag inflation, the opening area S3 of the communication port 346, which communicates the left and right shoulder restraining portions 350L and 350R in left-right direction, is predetermined ⅕ or greater (generally ½, in the foregoing embodiment) of the projected area S4 of a side view of the airbag 340 as completely inflated. Accordingly, the left and right shoulder restraining portions 350L and 350R inflate generally evenly, so that the airbag 340 protects an approaching passenger properly. Thus the second object of the present invention is attained.

In the airbag 340, too, the protection portion 349 includes the shoulder restraining portions 350L and 350R and the recess 352 therebetween. With this construction, when the inflated airbag 340 is thrown against a passenger MP, the left and right shoulder restraining portions 350L and 350R projecting rearward firstly bump against the vicinities of left and right shoulders MS of the passenger MP, as shown in FIG. 46. Thereafter, a head MH of the passenger MP whose shoulders MS are restrained by the shoulder restraining portions 350L and 350R enters into the recess 352 provided between the shoulder restraining portions 350L and 350R, and then is restrained and suppressed from moving forward. Accordingly, the airbag 340 receives the head MH softly while suppressing reaction force applied thereto. Moreover, in the airbag 340, too, the opening area S3 of the communication port 346, which constitutes the recess 352, or is located below the recess 352, is predetermined ⅕ or greater (generally ½, in the foregoing embodiment) of the projected area S4 of a side view of the airbag 340 as completely inflated. Accordingly, a lower portion of the recess 352 in the protection portion 349 has good cushioning property. With this construction, even if a moving head MH of a passenger MP bumps against the lower portion of the recess 352 in the protection portion 349, this lower portion of the recess 352 protects the head MH properly. Furthermore, in the airbag 340, too, the recess 352 is continuously disposed generally along vertical orientation from top side of the protection portion 349, between the shoulder restraining portions 350L and 350R, as shown in FIG. 45. Accordingly, even if physique or seating posture of the passenger MP changes a position of head MH in front-rear orientation, the airbag 340 restrains the head MH while having the head MH enter in the recess 352. Therefore, the airbag 340 is capable of protecting the head MH softly while suppressing reaction force applied thereto.

In addition, in the airbag 340 according to the fourth embodiment, edges (the upper edges 346*a* and 346*b*) of an opening plane of the communication port 346 are defined by the sewn portions 354 and 355 sewing up the edges of the first base cloths 359. Accordingly, an opening area of the communication port 346 is easily changed by changing length of the sewn portions 354 and 355 (ratio of the upper inner edge 360*a*/361*a* and the lower inner edge 360*b*/361*b* in the upper and rear portions 360 and 361 in the first base cloths 359, length of those edges, or in other words, degree of recess of the lower inner edges 360*b* and 361*b*). As a result, without changing an outer contour of the airbag 340, a shape of the recess 352 is changed easily, to a deeper shape or shallower shape.

Figure 52:
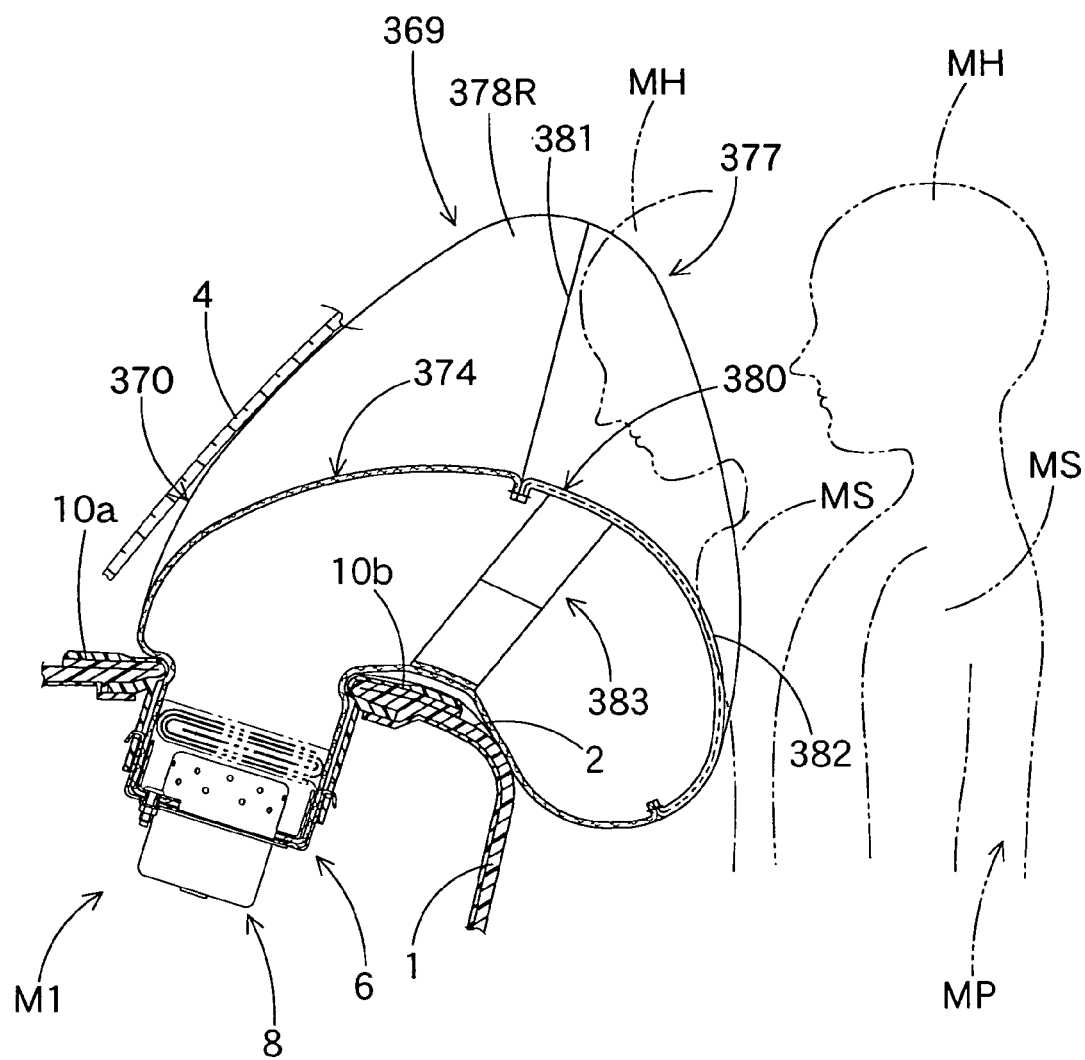
FIG. 52 schematically illustrates the airbag of FIG. 51 as viewed from side of vehicle.

Now described is a fifth embodiment of the present invention for attaining the second object of the present invention. As shown in FIG. 52, an airbag 369 according to the fifth embodiment is used for an airbag device M1 for front passenger's seat, which is a top-mount type, as the airbags 15, 115 and 340. The airbag device M1 for front passenger's seat for which the airbag 369 is used has a similar construction to the aforedescribed airbag device M1, and therefore, its description will be omitted by assigning common reference numerals to common members.

Figure 47:
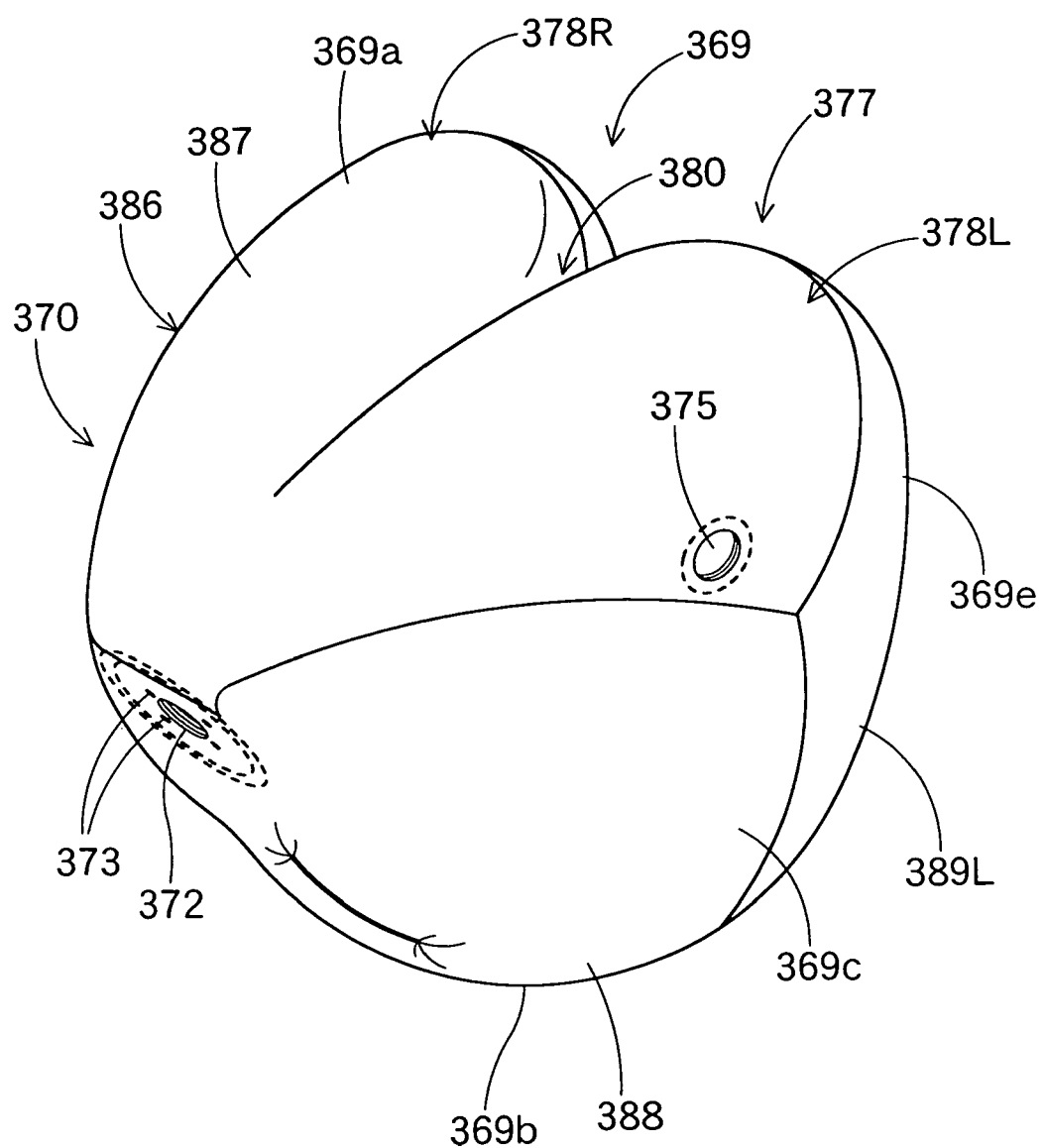
FIG. 47 is a perspective view of an airbag according to a fifth embodiment of the present invention as inflated by itself and viewed from forward.
Figure 48:
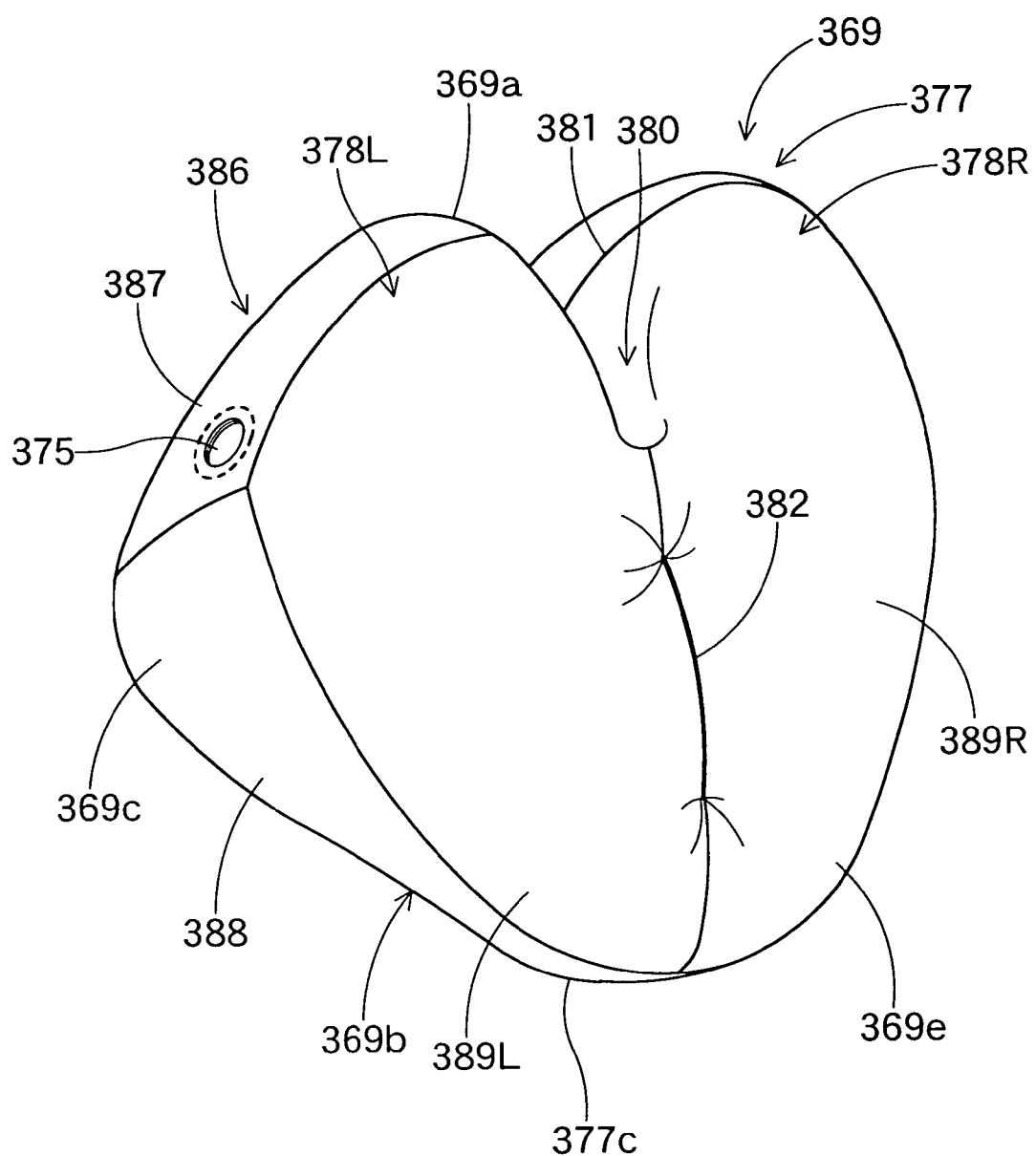
FIG. 48 is a perspective view of the airbag of FIG. 47 as viewed from rearward.
Figure 49:
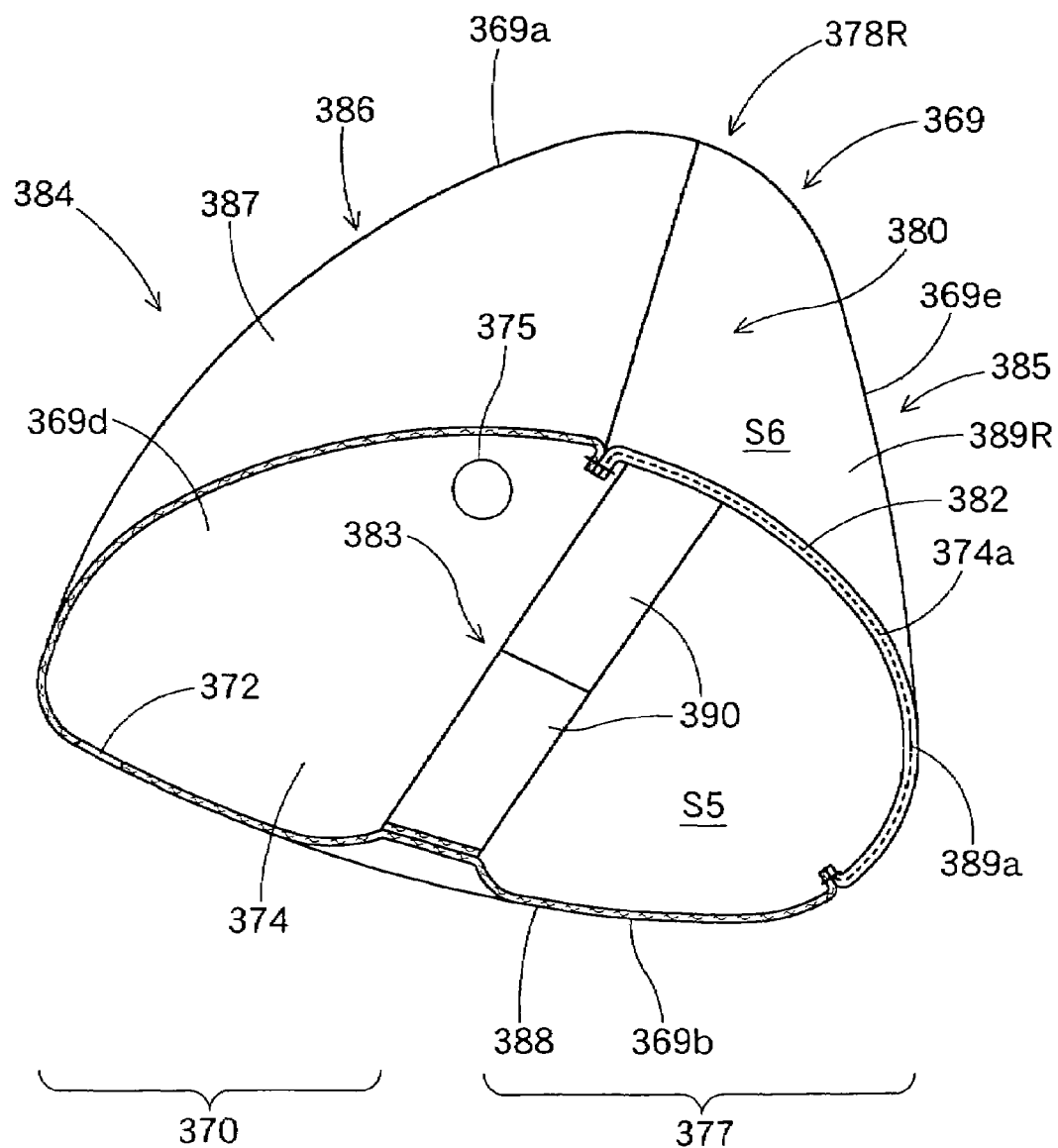
FIG. 49 is a sectional view of the airbag of FIG. 47 taken along front-rear orientation.

Referring to FIGS. 47 to 49, the airbag 369 is formed into a generally square conical shape when completely inflated by itself, and a top of the conical shape is in a front end of the airbag 369. The airbag 369 includes an upper side wall 369*a* deployed in upper side, a lower side wall 369*b* deployed in lower side, left and right side walls 369*c* and 369*d* deployed in left and right sides, and a rear side wall 369*e* arranged in a rear side, each upon airbag inflation. The airbag 369 includes a protection portion 377 to be deployed in a rear side to face toward a passenger upon airbag inflation, and a vehicle body side portion 370 to be deployed between a dashboard 1 and a wind shield 4 and forward of the protection portion 377 upon airbag inflation. The vehicle body side portion 370 includes a gas inlet port 372 in the vicinity of transverse center thereof proximate to a front end of the lower side wall 369*b* of the airbag 369 as completely inflated. Around the inlet port 372 are mounting holes 373, as in the aforedescribed airbags 15, 115, 215 and 340. The airbag 369 is also provided with a tether 383 for keeping the inflated airbag 369 in a predetermined shape.

The protection portion 377 includes two shoulder restraining portions 378L and 378R, and a recess 380 located between the left and right shoulder restraining portions 378L and 378R, as in the protection portion 349 of the aforedescribed airbag 340. As in the airbag 340, the shoulder restraining portions 378L and 378R are connected to each other such that a connected lower part in rear side be generally flat plane, and have a generally V-shape, as viewed as a whole from rearward of vehicle. In the protection portion 377, too, rise of the left and right shoulder restraining portions 378L and 378R, and recess of the recess 380 continue forward from the rear side wall 369*e* of the airbag 369, in such a manner as to enter within an area of the upper side walls 369a, up to the vicinity of the gas inlet port 372 in the vehicle body side wall 370.

Figure 50:
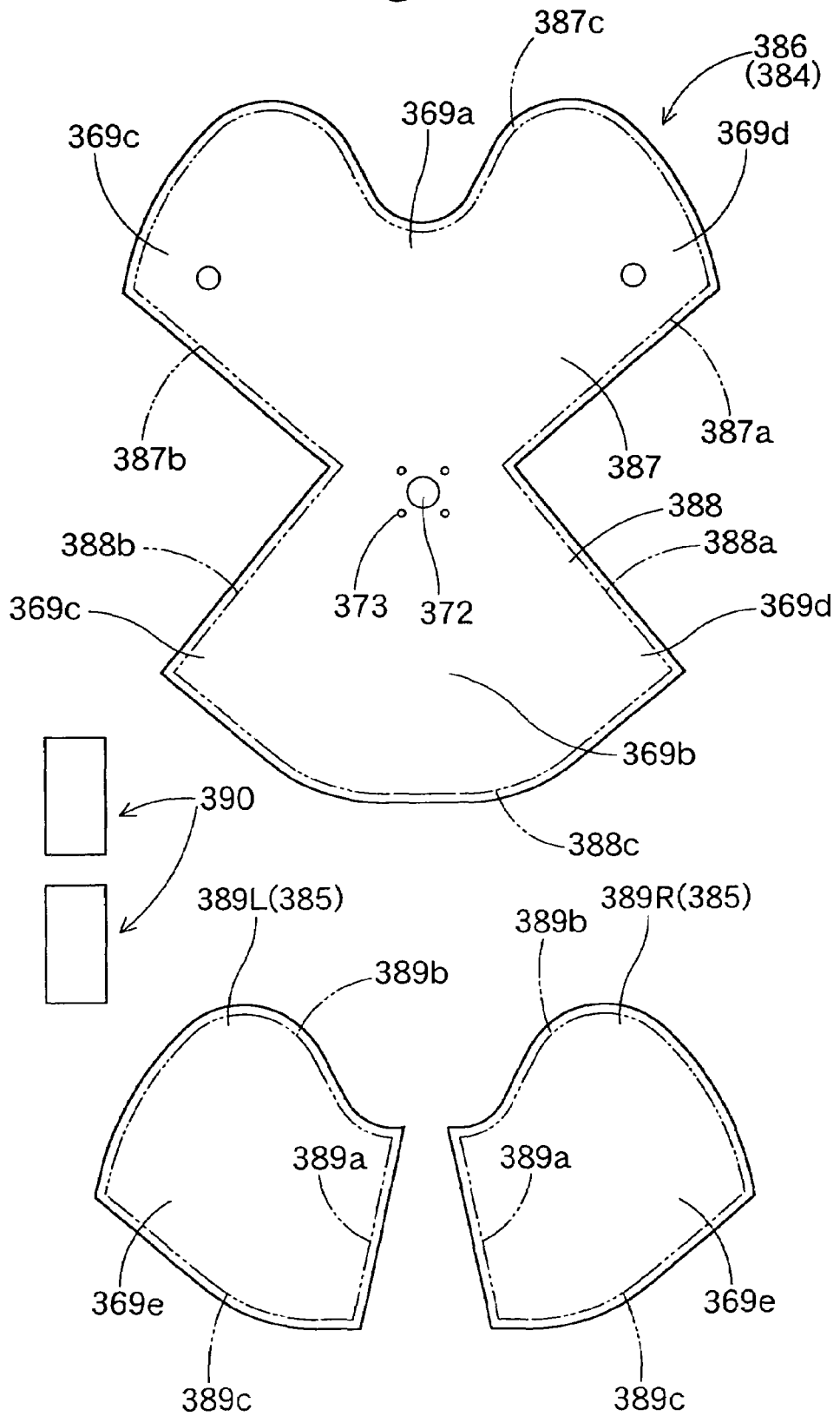
FIG. 50 illustrates constituent parts of the airbag of FIG. 47 by plan views.
Figure 51:
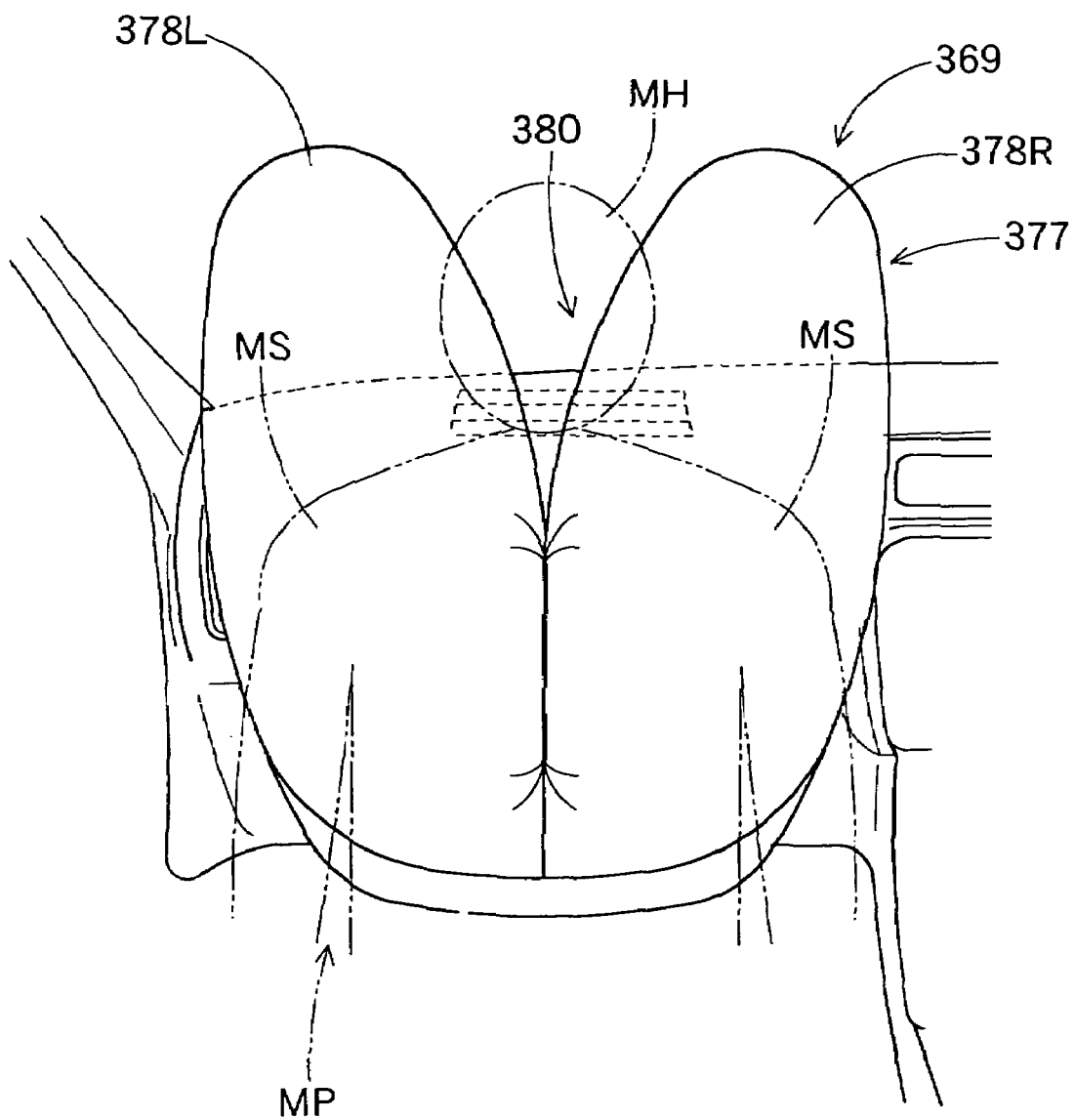
FIG. 51 illustrates the airbag of FIG. 47 in service as viewed from rearward of vehicle, the airbag being completely inflated.

The airbag 369 is formed by joining edges of predetermined shaped base cloths. The airbag 369 includes a front panel 384 constituting the upper, lower, left and right side walls 369a, 369b, 369c and 369d, and a rear panel 385 constituting the rear side wall 369e. As shown in FIG. 50, the airbag 369 is formed of a first base cloth 386 constituting the front panel 384, a pair of second base cloths 389L and 389R having the same shapes, as rear panel base cloths, and two band-shaped tether base cloths 390. The second base cloths 389L and 389R constitute the rear panel 385. The first base cloth 386 includes an upper portion 387 and a lower portion 388. The upper portion 387 mainly constitutes the upper side wall 369a and upper parts of the left and right side walls 369c and 369d, of the airbag 369 as completely inflated, and has a generally fan-shape converging toward the gas inlet port 372. An upper edge 387c of the upper portion 387 is so curved that left and right parts of the upper portion 387 project rearward. The upper edge 387c vicinity defines the top and rear edge of the airbag 369 as inflated. The rear portion 388 mainly constitutes the lower side wall 369b, and lower parts of the left and right side walls 369c and 369d, of the airbag 369 as completely inflated, and has a generally fan-shape converging toward a front end thereof, or toward the gas inlet port 372. The first base cloth 386 is formed into such a shape as the upper portion 387 and the lower portion 388 are connected to each other at a position to be front end vicinity of the inflated airbag 369. The second base cloths 389L and 389R constitute the rear side wall 369e of the airbag 369 as completely inflated. Each of the second base cloths 389L and 389R has such a curved shape as, in an upper edge 389b, having transverse center projected upward and having a portion proximate to an inner edge 389a recessed. The first and second base cloths 386, 389L and 389R, and tether base cloths 390 are made of flexible woven fabric of polyester, polyamide or the like. The woven fabric is not coated by coating agent such as silicone, or the like.

Below the recess 380 of the protection portion 377 inside the airbag 369 is a communicating portion or communication port 374 that communicates the shoulder restraining portions 378L and 378R in left-right direction. Referring to FIGS. 49 and 50, upper edge of opening plane of the communication port 374 is defined by the upper portion 387 of the first base cloth 386, and by a sewn portion 382 which sews up the inner edges 389a of the second base cloths 389L and 389R, whereas lower edge of the opening plane is defined by the lower portion 388 of the first base cloth 386. The communication port 374 is disposed to range from lower front end of the protection portion 377 to the vehicle body side portion 370 in the airbag 369 as completely inflated, and its opening plane is arranged in generally transverse center of the airbag 369 as completely inflated in such a manner as to extend along generally front-rear orientation. As in the aforedescribed airbags 15 and 340, an opening area S5 of the communication port 374 in a section taken along front-rear direction generally at the center of the gas inlet port 372, in an completely inflated condition of the airbag 369, is predetermined ⅕ or greater of a projected area S6 of a side view of the whole airbag 369 as completely inflated, as shown in FIG. 49. In the illustrated embodiment, the opening area S5 of the communication port 374 is generally half of the projected area S6 of the completely inflated airbag 369. In the fifth embodiment, too, in order to protect a passenger's head softly, the opening area S5 of the communication port 374 is desirably less than ⅘ of the projected area S6 of the completely inflated airbag 369.

Each of the left and right side walls 369c and 369d is provided with a vent hole 375. The tether 383 is formed into a generally band shape, in the illustrated embodiment. One end of the tether 383 is connected to the vicinity of top and transverse center of the rear side wall 369e, whereas another end is connected to generally transverse and longitudinal center of the lower side wall 369b, so that the tether 383 is arranged inside the inflated airbag 369 in such a manner as to extend along generally front-rear orientation.

Manufacturing of the airbag 369 according to the fifth embodiment is now described. Firstly, the second base cloths 389L and 389R are lapped with each other, and the inner edges 389a are sewn up with sewing yarn. At the same time, an end of one of the tether base cloths 390 is sewn to the top vicinity of the inner edge 389a. Meanwhile, an end of another tether base cloth 390 is sewn to the center vicinity of the lower portion 388 of the first base cloth 386 with sewing yarn. Subsequently, the first base cloth 386 is folded back in a front end vicinity of the inflated airbag 369, and adjacent left edges 387a and 388a, and right edges 387b and 388b in the upper and lower portions 387 and 388 are sewn up with sewing yarn, respectively. Thereafter, the first base cloth 386 is developed by separating remaining unsewn edges 387c and 388c from each other, and the second base cloths 389L and 389R in a developed state is lapped over the first base cloth 386. At this time, a shape of this developed first base cloth 386 is the same as that of the developed second base cloths 389L and 389R. Subsequently, an upper edge 387c of the upper portion 387 in the first base cloth 386 is sewn to upper edges 389b of the second base cloths 389L and 389R with sewing yarn, whereas a rear edge 388c of the lower portion 388 in the first base cloth 386 is sewn to lower edges 389c of the second base cloths 389L and 389R with sewing yarn. Thereafter, the first base cloth 386 and the second base cloths 389L and 389R are reversed inside out from the gas inlet port 372, such that stitch allowance may not appear on surface. If then another ends of the tether base cloths 390 are taken out from the gas inlet port 372 and sewn to each other in edges thereof, the airbag 369 is completed.

In the airbag 369 of the fifth embodiment, too, upon airbag inflation, the opening area S5 of the communication port 374, which communicates the left and right shoulder restraining portions 378L and 378R in left-right direction, is predetermined ⅕ or greater (generally ½, in the foregoing embodiment) of the projected area S6 of a side view of the airbag 369 as completely inflated, as in the aforedescribed airbags 15 and 340. Accordingly, the left and right shoulder restraining portions 378L and 378R inflate generally evenly, so that the airbag 369 protects an approaching passenger properly. Thus the second object of the present invention is attained.

In the airbag 369, too, the protection portion 377 includes the shoulder restraining portions 378L and 378R and the recess 380 therebetween. With this construction, when the inflated airbag 369 is thrown against a passenger MP, the left and right shoulder restraining portions 378L and 378R projecting rearward firstly bump against the vicinities of left and right shoulders MS of the passenger MP, as shown in FIG. 52. Thereafter, a head MH of the passenger MP whose shoulders MS are restrained by the shoulder restraining portions 378L and 378R enters into the recess 380 provided between the shoulder restraining portions 378L and 378R, and then is restrained and suppressed from moving forward. Accordingly, the airbag 369 receives the head MH softly while suppressing reaction force applied thereto. Moreover, in the airbag 369, too, the opening area S5 of the communication port 374, which constitutes the recess 380, or is located below the recess 380, is predetermined ⅕ or greater (generally ½, in the foregoing embodiment) of the projected area S6 of a side view of the airbag 369 as completely inflated. Accordingly, a lower portion of the recess 380 in the protection portion 377 has good cushioning property. With this construction, even if a moving head MH of a passenger MP bumps against the lower portion of the recess 380 in the protection portion 377, this lower portion of the recess 380 protects the head MH properly. Furthermore, in the airbag 369, too, the recess 380 is continuously disposed generally vertically from top side of the protection portion 377, between the shoulder restraining portions 378L and 378R, as shown in FIG. 52. Accordingly, even if physique or seating posture of the passenger MP changes a position of head MH in front-rear orientation, the airbag 369 restrains the head MH while having the head MH enter in the recess 380. Therefore, the airbag 369 is capable of protecting the head MH softly while suppressing reaction force applied thereto.

In addition, in the airbag 369 according to the fifth embodiment, too, the rear edge 374a in upper inner edge of an opening plane of the communication port 374 is defined by the sewn portion 382 sewing up edges of the second base cloths 389L and 389R. Accordingly, an opening area of the communication port 374 is easily changed by changing length of the sewn portion 382, i.e., length of each of the inner edges 389a in the second base cloths 389L and 389R. As a result, without changing an outer contour of the airbag 369, a shape of the recess 380 is changed easily, to a deeper shape or shallower shape.

What is claimed is:

1. An airbag for front passenger seat mountable on a vehicle, wherein the airbag is folded and housed in a top face of an instrument panel in front of a front passenger seat, and upon inflow of inflation gas, the airbag protrudes upward and deploys rearward of the vehicle in to occupy a space between the top face of an instrument panel and a windshield located above the instrument panel, and wherein the airbag, when completely inflated, is formed into a generally square conical shape whose top is located in a front end, the airbag comprising:

a left side wall and a right side wall each arranged generally along front-rear orientation in left and right sides, an upper side wall and a lower side wall each arranged generally along left-right orientation in upper and lower sides, and a rear side wall arranged generally along left-right orientation to confront a passenger, in such a manner as to connect the upper side wall and the lower side wall;

an inlet port for introducing inflation gas, in the front end vicinity of the airbag as completely inflated; and a protection portion contactable with a front seat passenger, in a rear side of the airbag as completely inflated, the protection portion including at a center in a transverse direction a recess that recesses forward at least above a vertical center of the airbag as fully inflated, wherein the recess is configured such that, in a sectional view taken along front-rear direction at a center in a transverse direction of the airbag as fully inflated, a tangent line of a region of a rear plane of the recess having a small curvature is slanted so that an upper end thereof is located forward and a lower end thereof located rearward.

2. The airbag of claim 1 wherein a point of contact of the tangent line and the rear plane of the recess is located rearward of a rear face of the instrument panel.

3. The airbag of claim 1 wherein a leading end of the recess is located at the vicinity of a center in a transverse direction of the airbag is comprised of a seam of base cloths of the airbag that couples peripheral edges of the base cloths.

4. The airbag of claim 1 wherein the recess is configured such that the region of the rear plane of the recess having a small curvature is located above a first horizontal plane that passes through a center of the gas inlet port in a front-rear direction when the airbag is fully deployed.

5. The airbag of claim 4 wherein the recess is configured such that the region of the rear plane of the recess having a small curvature is located above a second horizontal plane that passes through a center in a front-rear direction of an opening plane of an opening formed on an instrument panel for emergence of the airbag when the airbag is fully deployed.

6. The airbag of claim 1 wherein:
the protection portion includes shoulder restraining portions located on a left and right of the recess to project continuously from an upper part to a rear part of the airbag; and
the shoulder restraining portions are connected and communicated together only by a communication port located proximate the inlet port.

7. The airbag of claim 1 wherein the recess is configured to extend to a lower side of the vertical center of the airbag as fully inflated.

8. The airbag of claim 7 wherein the recess is configured such that, in a sectional view taken along a front-rear direction at the center in a transverse direction of the airbag as fully inflated, the rear plane of the recess is slanted so that an upper region thereof is located forward and a lower region thereof located rearward in a major part thereof except upper and lower ends.

9. The airbag of claim 1 wherein the airbag is configured such that a clearance formed between the tangent line at the region of the rear plane of the recess having a small curvature and a tangent line parallel to the tangent line and tangent to an upper rear end of the airbag is 100 mm and above at full inflation of the airbag.

10. The airbag of claim 9 wherein the clearance is configured in a range of 100 mm to 200 mm.

11. The airbag of claim 1 wherein the tangent line at the intermediate region in a vertical direction of the rear plane of the recess having a small curvature is slanted at 60° from a horizontal direction.

12. The airbag of claim 1 wherein the recess is configured to recess more deeply at an upper region of the airbag relative to a lower region of the airbag when the airbag is fully inflated.

13. An airbag for a front passenger seat mountable on a vehicle, wherein the airbag is folded and housed in a top face of an instrument panel in front of a front passenger seat, and upon inflow of inflation gas, the airbag protrudes upward and deploys rearward of the vehicle to occupy a space between the top face of instrument panel and a windshield located above the instrument panel, and the airbag, when completely inflated, is formed into a generally square conical shape whose top is located in a front end, the airbag comprising:

a left side wall and a right side wall, each arranged generally along front-rear orientation in left and right sides, an upper side wall and a lower side wall, each arranged generally along left-right orientation in upper and lower sides, and a rear side wall arranged generally along left-right orientation to confront a passenger, in such a manner as to connect the upper side wall and the lower side wall;

an inlet port for introducing inflation gas, in the front end vicinity of the airbag as completely inflated; and a recess that recesses forward and extends vertically at a center in a transverse direction of a rear side of the airbag as fully inflated, the recess including a curved leading end in a sectional view taken along front-rear direction at the center in a transverse direction of the airbag as fully inflated, wherein a portion of the leading end of the recess is located rearward relative to a rear face of the instrument panel and a top of the leading end of the recess that is at a highest level at full airbag inflation is located at a position that is not contactable with the windshield.

14. The airbag of claim 13, wherein a curvature of an upper end region of the leading end of the recess is greater than that of a lower end region of the leading end of the recess.

15. The airbag of claim 13, wherein the top of the leading end of the recess is located rearward relative to the rear face of the instrument panel at full airbag deployment.

16. The airbag of claim 13, wherein the top of the leading end of the recess is located below a top end region of the airbag as fully inflated.

17. The airbag of claim 13, wherein the top of the leading end of the recess is located below a top of a head of an occupant seated in a front passenger seat.

18. The airbag of claim 17, wherein the top of the leading end of the recess is located below a forehead of the occupant.

\* \* \* \* \*